(12) United States Patent
Flytzani-Stephanopoulos et al.

(10) Patent No.: US 8,377,841 B2
(45) Date of Patent: Feb. 19, 2013

(54) CATALYST HAVING METAL IN REDUCED QUANTITY AND REDUCED CLUSTER SIZE

(75) Inventors: Maria Flytzani-Stephanopoulos, Winchester, MA (US); Howard M. Saltsburg, Newton, MA (US); Qi Fu, Albuquerque, NM (US)

(73) Assignee: Tufts University, Medford, MA (US)

(*) Notice: Subject to any disclaimer, the term of this patent is extended or adjusted under 35 U.S.C. 154(b) by 0 days.

(21) Appl. No.: 13/243,173

(22) Filed: Sep. 23, 2011

(65) Prior Publication Data

US 2012/0178616 A1  Jul. 12, 2012

Related U.S. Application Data

(62) Division of application No. 10/534,110, filed as application No. PCT/US03/35562 on Nov. 7, 2003, now Pat. No. 8,053,387.

(60) Provisional application No. 60/424,597, filed on Nov. 7, 2002, provisional application No. 60/484,525, filed on Jul. 2, 2003.

(51) Int. Cl.
*B01J 23/00* (2006.01)
*B01J 23/10* (2006.01)
*B01J 21/04* (2006.01)

(52) U.S. Cl. ........ 502/304; 502/302; 502/303; 502/325; 502/439

(58) Field of Classification Search .......... 502/302, 502/303, 304, 325, 439
See application file for complete search history.

(56) References Cited

PUBLICATIONS

W. Liu and M. Fiytzani-Stephanopoulos. Total oxidation of carbon monoxide over methane over transition metal-fluorite oxide composite particles. J. Catal. 153 (1995) 304-332.*
Bartlett et al. Solution Mining, $2^{nd}$ Edition, Gordon and Breach Science Publishers, (1998) 17-18, 20-22, 39.*

* cited by examiner

*Primary Examiner* — Colleen Dunn
*Assistant Examiner* — Jennifer Smith
(74) *Attorney, Agent, or Firm* — Milstein Zhang & Wu LLC; Joseph B. Milstein

(57) ABSTRACT

The invention contemplates a method of making a catalytic material, and uses of the material. The catalytic material is made by depositing catalytic metals, such as gold or platinum, on substrate materials, such as lanthanum-doped ceria or other oxides. The catalytic metal, which comprises both crystalline and non-crystalline structures, is treated, for example with aqueous basic NaCN solution, to leach away at least some of the crystalline metallic component. The remaining noncrystalline metallic component associated with the substrate exhibits catalytic activity that is substantially similar to the catalyst as prepared. The use of the catalyst in an apparatus such as a reactor or analytic instrument is contemplated, as is the use of the catalyst in efficient, cost-effective reactions, such as removal of carbon monoxide from fuel gases, for example by performing the water gas shift reaction.

25 Claims, 32 Drawing Sheets

CATALYST HAVING METAL IN REDUCED QUANTITY AND REDUCED CLUSTER SIZE

CROSS-REFERENCE TO RELATED APPLICATIONS

This application is a divisional application of, and claims priority to and the benefit of co-pending U.S. patent application Ser. No. 10/534,110, filed May 6, 2005, subsequently issued on Nov. 8, 2011 as U.S. Patent No. 8,053,387, which application is a 371 of PCT application PCT/US2003/35562, filed Nov. 7, 2003, entitled "Catalyst having Metal in Reduced Quantity and Reduced Cluster Size," which claims benefit of U.S. provisional patent application Ser. No. 60/424,597, filed Nov. 7, 2002, entitled "Catalyst having Metal in Reduced Quantity and Reduced Cluster Size," and the benefit of U.S. provisional patent application Ser. No. 60/484,525, filed Jul. 2, 2003, entitled "Active Nonmetallic Au and Pt Species on Ceria-based Water-Gas Shift Catalysts and Other Substrates," all of which applications are incorporated herein by reference in their entirety.

STATEMENT REGARDING FEDERALLY SPONSORED RESEARCH OR DEVELOPMENT

The U.S. Government funded work described in this application under Grant #CTS-9985305 awarded by the National Science Foundation and may have certain rights in the invention.

FIELD OF THE INVENTION

The invention relates to catalysts in general and particularly to a catalyst that is free of microcrystalline metal particles.

BACKGROUND OF THE INVENTION

Fuel cell power generation is currently undergoing rapid development both for stationary and transportation applications. In the transportation sector, fuel cells can augment or replace the internal combustion engines in vehicles such as cars, trucks, and buses, while meeting the most stringent emission regulations. In stationary power generation, residential, commercial, and industrial applications are envisioned. In some cases, the hydrogen feedstock will be obtained from hydrogen-rich fuels by on-board or on-site fuel reforming. Generally, the reformate gas includes hydrogen ($H_2$), carbon monoxide (CO) and carbon dioxide ($CO_2$), water ($H_2O$) and a small amount of methane ($CH_4$). However, the CO component needs to be completely removed upstream of a low-temperature fuel cell, such as the PEM fuel cell, because it poisons the anode catalyst, thus degrading the fuel cell performance. CO is also a criterion pollutant.

The low-temperature water-gas shift reaction (LTS), which is represented by the relation $CO+H_2O \leftrightarrow CO_2+H_2$, is used to convert carbon monoxide with water vapor to hydrogen and $CO_2$. Currently, a selective CO oxidation reactor is envisioned as the last fuel-processing step upstream of the fuel cell anode. A highly active LTS catalyst would obviate the need for the CO oxidation reactor.

Desired catalyst characteristics include high activity and stability over a wider operating temperature window than is currently possible with the commercial LTS catalysts. Catalysts based on cerium oxide (ceria) are promising for this application. Ceria is presently used as a key component of the three-way catalyst in automotive exhausts. Ceria is also a good choice as a support of both noble metal and base metal oxide catalysts. Ceria participates in redox reactions by supplying and removing oxygen. Metal-ceria systems are several orders of magnitude more active than metal/alumina or other oxide supports for a number of redox reactions. Cu-ceria is more stable than other Cu-based LTS catalysts and at least as active as the precious metal-ceria systems, which are well known for their LTS activity in the catalytic converter.

During the past decade, many studies have established that nanosized gold (Au)-on-reducible oxides have a remarkable catalytic activity for many important oxidation reactions, especially low-temperature CO oxidation, the Water Gas Shift (WGS) reaction, hydrocarbon oxidation, NO reduction and the selective oxidation of propylene to propylene oxide. There is presently no consensus as to the cause of the very high activity of nanoparticles of Au-on-reducible oxides. For example, in oxidation/reduction reactions, some researchers have argued that the oxygen at the interface between the metal and the oxide support is important, while others invoke dissociative $O_2$ adsorption (as oxygen atoms) on very small Au particles but not on bulk Au particles to explain the activity. The unique properties of supported nanoscale Au particles have been correlated to a number of variables, including Au particle size, Au-support interface, the state and structure of the support, as well as the pretreatment of catalysts.

There is a need for an inexpensive and efficient catalyst material having good stability in air and in cyclic operation with respect to the low-temperature water-gas shift reaction.

SUMMARY OF THE INVENTION

In overview, a fuel cell consists of two electrodes sandwiched around an electrolyte. Atomic (or molecular) hydrogen fed to the one electrode (anode) gives up electrons to form protons. The protons pass through the electrolyte and combine with oxygen ions formed by the addition of electrons to atomic or molecular oxygen on the other electrode (cathode). The protons and oxygen ions make water. Heat is produced during the process as a result of the conversion of hydrogen and oxygen to water. Electric current flows through the circuit external to the fuel cell during the process. A fuel cell will produce energy in the form of electricity and heat as long as fuel and oxygen are supplied. To produce fuel-cell quality hydrogen, an important step involves the removal of any by-product carbon monoxide, which poisons the fuel cell anode catalyst.

Many people have spent considerable time and effort studying the properties of gold and platinum nanoparticles that are used to catalyze the reaction of carbon monoxide with water to make hydrogen and carbon dioxide. This reaction is known as the "water-gas shift reaction." For this reaction over a cerium oxide catalyst carrying the gold or platinum, metal nanoparticles are not important. Only a tiny amount of the precious metal in non metallic form is needed to create the active catalyst, which is a cost-effective way to produce clean energy from fuel cells. Typically, a loading of 1-10 wt % of gold or other precious metals is used to make an effective catalyst. However, we have discovered that, after stripping the gold or the platinum with a cyanide solution, the catalyst was just as active with a slight amount of the gold remaining—approximately one-tenth the normal amount used.

This discovery shows that metallic nanoparticles are mere 'spectator species' for some reactions, such as the water-gas shift reaction. The phenomenon may be more general, since we show that it also holds for platinum and may also hold true for other metals and metal oxide supports, such as titanium and iron oxide.

In one aspect, the invention relates to a method of preparing a catalyst material. The method comprises the steps of providing a substrate component having a surface; producing on the surface of the substrate component a second component having metallic crystalline particles and a structure lacking crystallinity; and removing selectively from the surface of the substrate component at least some of the metallic crystalline particles, leaving upon the substrate component at least a portion of the structure lacking crystallinity. The portion of the structure lacking crystallinity remaining associated with the substrate component exhibits catalytic activity.

In one embodiment, the catalytic activity of the structure lacking crystallinity remaining upon the substrate is substantially equal to the catalytic activity exhibited by the catalyst material prior to the selective removal of crystalline particles. In one embodiment, the step of providing the substrate component comprises forming the substrate by a gelation/coprecipitation process followed by calcination. In one embodiment, the step of producing on the surface of the substrate component a metallic component comprises applying the metallic component by a process selected from precipitation, co-precipitation, co-gelation, evaporation, a deposition-precipitation process, an impregnation process, adsorption of molecules followed by decomposition, ion implantation, chemical vapor deposition, and physical vapor deposition. In one embodiment, the substrate component comprises a microcrystalline substance. In one embodiment, the substrate component is sintered at a temperature of approximately 400 degrees Centigrade. In one embodiment, the substrate component comprises rare-earth-doped cerium oxide. In one embodiment, the rare earth is lanthanum. In one embodiment, the metallic component comprises an element selected from the group consisting of Au, Pt, Cu, Rh, Pd, Ag, Fe, Mn, Ni, Co, Ru and Ir. In one embodiment, the removal step comprises a process selected from the group consisting of leaching, etching, and dissolving. In one embodiment, the removal step comprises leaching with a solution of NaCN. In one embodiment, the removal step comprises leaching with an aqueous solution of 2 percent NaCN having a pH of at least 11. In one embodiment, the removal step removes at least 10% of the metallic component. In one embodiment, the removal step removes at least 25% of the metallic component. In one embodiment, the removal step removes at least 50% of the metallic component. In one embodiment, the removal step removes at least 90% of the metallic component. In one embodiment, the catalytic activity is exhibited in the performance of the water gas shift reaction. In one embodiment, the substrate comprises a metal oxide. In one embodiment, the substrate comprises a selected one of a zeolite, a carbide, a nitride, a sulfate, and a sulfide. In one embodiment, the substrate comprises a crystalline defect solid that provides oxygen to a reaction.

The invention additionally contemplates a catalyst material prepared according to the method first recited above. In one embodiment, the metal is selected from the group consisting of Au, Pt, Cu, Rh, Pd, Ag, Ni, Co, and Ir. In one embodiment, the substrate component comprises a microcrystalline substance. In one embodiment, the substrate component comprises an oxide or a mixed oxide. In one embodiment, the substrate comprises a selected one of a zeolite, a carbide, a nitride, a sulfate, and a sulfide. In one embodiment, the metallic component is Au and the substrate component is lanthanum-doped cerium oxide. In one embodiment, the Au has a concentration in the range of one atomic percent to one one-hundredth of an atomic percent, wherein the atomic percentage is computed according to the expression [100×grams Au/(atomic mass of Au)]/[grams Au/(atomic mass of Au)+ grams Ce/(atomic mass of Ce)+grams La/(atomic mass of La)], based on a chemical composition of the catalytic material. In one embodiment, the Au has a concentration in the range of one-half of an atomic percent to one-tenth of an atomic percent, wherein the atomic percentage is computed according to the expression [100×grams Au/(atomic mass of Au)]/[grams Au/(atomic mass of Au)+grams Ce/(atomic mass of Ce)+grams La/(atomic mass of La)], based on a chemical composition of the catalytic material. In one embodiment, the Au has a concentration in the range of 0.44 atomic percent to 0.23 atomic percent, wherein the atomic percentage is computed according to the expression [100× grams Au/(atomic mass of Au)]/[grams Au/(atomic mass of Au)+grams Ce/(atomic mass of Ce)+grams La/(atomic mass of La)], based on a chemical composition of the catalytic material. In one embodiment, the catalyst material is a catalyst for the water shift reaction.

The invention yet additionally contemplates a chemical apparatus comprising a catalyst material prepared according to the method first recited above. In one embodiment, the chemical apparatus is a chemical reactor. In one embodiment, the chemical apparatus is an analytical instrument.

In another aspect, the invention features a method of performing a chemical reaction. The method comprises the step of providing a catalytically effective amount of a catalyst material. The catalyst material comprises a substrate component having a surface; and adjacent the surface of the substrate, a metallic residue of a metal deposit, the metal deposit comprising a portion having a structure lacking crystallinity and a portion having crystalline particles, the metallic residue comprising at least some of the structure lacking crystallinity and being the remnant of the metal deposit from which at least some of the crystalline particles having dimensions greater than a nanometer have been selectively removed. The method includes the step of exposing the catalyst material to a selected chemical substance under predetermined conditions of temperature and pressure; whereby the selected chemical substance undergoes a catalyzed chemical reaction to produce a product. In one embodiment, the catalyst material comprises a metal selected from the group consisting of Au, Pt, Cu, Rh, Pd, Fe, Mn, Ag, Ni, Co, Ru, and Ir.

The invention also contemplates a product prepared according to the method recited immediately above. In one embodiment, the product is hydrogen, and the chemical reaction is the water shift reaction.

In yet a further aspect, the invention relates to a composition of matter, comprising, in combination: a substrate component having a surface, the substrate comprising a selected one of an oxide, a zeolite, a carbide, a nitride, a sulfate, and a sulfide; and a residue of a metal deposit adjacent the surface, the metal deposit comprising a selected one of Au, Pt, Cu, Rh, Fe, Mn, Pd, Ag, Ni, Co, Ru, and Ir, the residue comprising a non-crystalline substance that remains upon selective removal of at least some metallic crystalline particles having dimensions greater than a nanometer from the metal deposit; whereby the combination comprises a composition of matter having catalytic behavior greater than that of the substrate alone.

In still another aspect the invention features a catalyst material having a substrate and a substance adjacent thereto. The catalyst material comprises a purified form of the catalyst material comprising a non-crystalline substance, the purified catalyst material obtained by selective removal of at least some crystalline particles of the metallic substance; whereby the catalyst material is freed of metallic crystalline particles having substantially no catalytic activity, while retaining substantially all of the catalytic activity of the catalyst material.

In one embodiment, the catalytic activity is measured with respect to a rate of reaction per gram of the catalyst material. In one embodiment, the catalytic activity is measured with respect to a rate of reaction per $m^2$ of the catalyst material.

In a further aspect, the invention contemplates an improved catalyst material having a substrate and adjacent thereto a residue of a metal deposit, the metal deposit comprising a portion having a structure lacking crystallinity and a portion having crystalline particles, the residue comprising at least some of the structure lacking crystallinity and being the remnant of the metal deposit from which at least some of the crystalline particles have been removed, wherein the improvement comprises: reduction of a metallic content of the improved catalyst material by the selective removal of at least some crystalline particles of the metallic substance, thereby reducing the amount of metal contained in the catalyst material while retaining substantially all of a catalytic activity exhibited by the catalyst material prior to the selective removal of the crystalline particles.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
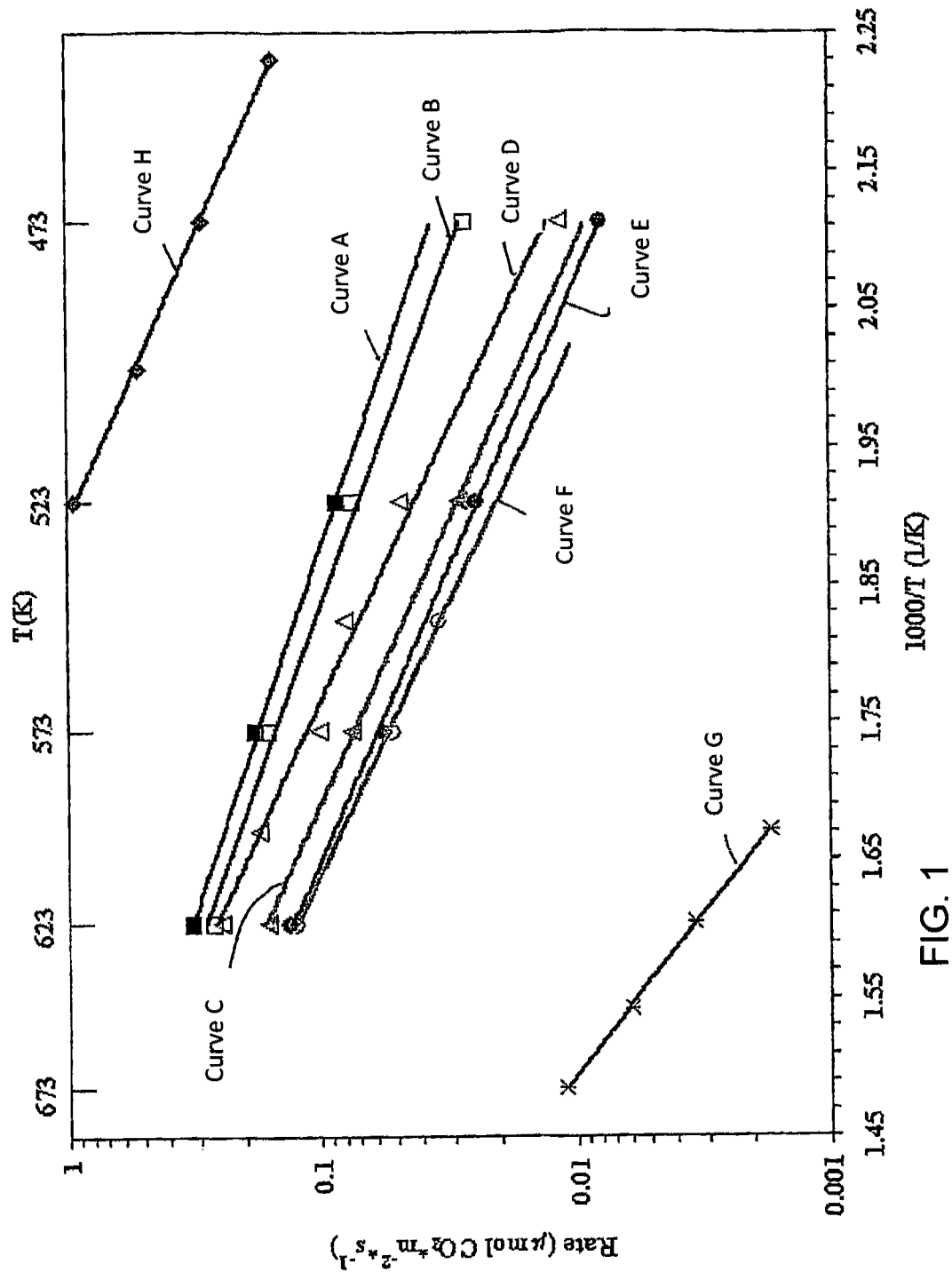
FIG. 1 is a diagram showing Arrhenius-type plots of the WGS reaction rate as measured over the as prepared Au-ceria catalysts, NACN-leached Au-ceria, and the Au-free ceria, according to principles of the invention.

In general terms, the disclosure describes catalysts having active metallic constituents deposited on metal oxide substrates, and subsequently chemically treated to remove therefrom significant amounts of the metallic constituent, including substantially all of the crystalline deposited metal. Deposited active metal remains on or in the substrate in a form or forms that are smaller in size than one nanometer. In one embodiment, the metallic constituent is a structure lacking crystallinity. It is thought that the structure lacking crystallinity contains so few atoms that a crystalline structure electronic metallic character is not observed. The catalysts have been discovered to operate with undiminished efficiency as compared to the deposited metallic constituent that includes nanocrystalline metallic particles on the same substrates. The removal of the majority of the metallic constituent, in some cases as much as 90% thereof, does not compromise the catalytic nature of the material, while providing substantial reductions in cost, especially when the metallic constituent comprises gold, platinum, or other precious metals. In some embodiments, the substrate is a zeolite, carbide, nitride, sulfate, or sulfide.

The invention relates to heterogeneous catalysts for oxidation reactions, and to methods for producing and using the same, in which the metal catalyst is formed in an atomically dispersed condition in a substrate, while maintaining the activity and stability normally associated on such a catalyst with much larger amounts of metal atoms exposed on nanometer (nm) sized metallic particles.

The methods involve the production of a highly defective surface on an oxide (e.g. common catalyst supports such as ceria, titania, alumina, magnesia, iron oxide, zinc oxide, and zirconia) and the incorporation of atomically dispersed metals (as ions, neutral atoms, or clusters of atoms too small to exhibit metallic character) on or in such a surface, followed by removal of significant amounts of the metal that is deposited in nanocrystalline form. The removed metal part is recovered in the process. The methods can be employed with transition metals including Au, Pt, Cu, Rh, Pd, Ag, Fe, Mn, Ni, Co, Ru, and Ir. Methods of preparation of the catalytic materials of the invention include preparing substrate materials by such methods as thermal decomposition, precipitation, and any ceramic preparation technique. Methods of depositing metallic substances, including precipitation or other means of driving metals from solution, co-precipitation with the substrate, co-gelation, evaporation, a process selected from a deposition-precipitation process, an impregnation process, adsorption of molecules followed by decomposition, ion implantation, chemical vapor deposition, and physical vapor deposition can be used to add metal to a substrate.

The incorporation often requires the presence of significantly more metal during preparation to drive the process than is required in the final product. Once prepared, the significant metal excess typically present as nm-size metallic particles can be removed with no change in catalytic activity. This result is unexpected. The residual metal content is only a small fraction of the original formulation. For gold/ceria, an active water gas shift catalyst suitable for hydrogen fuel cell systems, the removal is approximately 90%. In other embodiments, removal of 10%, 25%, or 50% of the metal is contemplated.

The concentration of a catalytic metal denoted Z deposited on a substrate containing metallic elements P and Q may be calculated by the relation:

Concentration of Z in atomic percent=[100×grams Z/(atomic mass of Z)] divided by the sum of [grams Z/(atomic mass of Z)+grams P/(atomic mass of P)+grams Q/(atomic mass of Q)].

In an equivalent expression, one may write

Concentration of Z in atomic percent=[100×moles Z]/[moles Z+moles P+moles Q], or generally, 100×moles catalytic metal/[moles catalytic metal+moles substrate metal(s)].

As an example, the concentration of gold in atomic percent on a substrate comprising cerium and lanthanum is represented as [100×grams Au/(atomic mass of Au)]/[grams Au/(atomic mass of Au)+grams Ce/(atomic mass of Ce)+grams La/(atomic mass of La)]. For gold as a catalyst metal on a substrate comprising cerium and lanthanum, concentrations in the range of 0.01 to 1.0 atomic percent are preferred, and concentrations in the range of 0.1 to 0.5 atomic percent are more preferred.

Use of preparation methods that lead to defective oxide surfaces having defects below a specific density does not permit the removal of the particles while maintaining catalytic activity.

The novelty of this process is significant given the vast literature that describes the role of the nm-sized metal particle and that makes only passing comment on other possible species, which appear not to have been investigated in detail.

Synthesis pathways of the catalysts include the steps of preparation of the composite metal/metal oxide or the preparation of the defective solid surface followed by incorporation of the catalytic metal, followed by the removal of excess metal present in the form of crystalline particles when such crystalline particles are formed in the synthesis process. Thus synthetic processes such as gelation, coprecipitation, impregnation, sputtering, chemical vapor deposition (CVD), and physical vapor deposition (PVD) can be combined appropriately to produce the catalyst.

Some of the advantages of the method of preparation and the resulting catalyst are: significant reduction in the cost of the catalytic metal required; easy wet chemistry for some systems with practical precious metal recovery; and stability and activity under operation conditions essentially those of the high metal loaded catalyst.

Ceria particles with diameter less than 10 nm have increased electronic conductivity, and doping with a rare earth oxide, such as $La_2O_3$, can be used to create oxygen vacancies, and stabilize ceria particles against sintering. We have prepared and examined, by the methods described hereinbelow, nanoscale Metal-(La doped) ceria catalysts using three different techniques: CP, DP, and urea gelation/coprecipitation (UGC), where Metal comprises gold, platinum, copper, and other metals.

Catalyst Preparation

Doped and undoped bulk ceria was prepared by the UGC method, as described in detail in Y. Li, Q. Fu, M. Flytzani-Stephanopoulos, Appl. Catal. B: Environ. 27 (2000) 179, which is incorporated herein by reference in its entirety. The cerium salt used in UGC is $(NH_4)_2Ce(NO_3)_6$. In brief, aqueous metal nitrate solutions were mixed with urea ($H_2N$—$CO$—$NH_2$) and heated to 100° C. under vigorous stirring and addition of deionized water. The resulting gel was boiled and aged for 8 h at 100° C. After aging, the precipitate was filtered and washed with deionized water. Further, the precipitate was dried at 100-120° C. and calcined in static air at 400° C. for 10 hours, or 650° C. for 4 hours. Some samples were calcined at 800° C. for 4 hours. A heating rate of 2° C./min to the selected temperature was used. The precipitate was treated by the same procedures in all preparation methods described herein.

A CP method using ammonium carbonate as the precipitant was used to prepare an Au-ceria catalyst, according to preparative methods reported in W. Liu and M. Flytzani-Stephanopoulos, J. Catal. 53 (1995) 304-332, which paper is incorporated herein by reference in its entirety. More recently, under the direction of one of the inventors, Weber studied various preparation methods and conducted a full parametric study of each method in an effort to optimize the activity of this catalyst for CO oxidation, as reported in A. Weber, M. S. Thesis, Department of Chemical Engineering, Tufts University, Medford, Mass., 1999, which document is incorporated herein by reference in its entirety. A DP technique was found the most promising. Both the CP and DP methods were used to prepare materials described herein while the UGC was also used to prepare one Au-ceria sample and Cu-ceria samples for comparison.

CP involves mixing an aqueous solution of $HAuCl_4$, cerium(III) nitrate ($Ce(NO_3)_3$) and lanthanum nitrate ($La(NO_3)_3$) with $(NH_4)_2CO_3$ at 60-70° C., keeping a constant pH value of 8 and aging the precipitate at 60-70° C. for 1 h. For DP, the ceria support was first prepared by UGC and calcined. DP took place by adding the desired amount of $HAuCl_4$ dropwise into an aqueous slurry of the prepared ceria. The pH of the aqueous slurry had already been adjusted to the value of 8 using $(NH_4)_2CO_3$. The resulting precipitate was aged at room temperature (RT) for 1 h. Unlike a previously reported DP method which uses NaOH as the base and excess (about five times) $HAuCl_4$, the present method can deposit the desired gold loading on ceria using the exact amount of $HAuCl_4$ solution. For comparison to Au-ceria samples prepared by CP and DP, one sample containing a large loading (8 at. %) of gold in ceria was prepared by UGC. The solution containing $HAuCl_4$, $(NH_4)_2Ce(NO_3)_6$, $La(NO_3)_2$ and urea, was heated to 80° C. instead of 100° C. Both bulk copper-ceria samples described herein were made by UGC, following the procedure described above for metal-free ceria.

The ceria produced by UGC after calcinations at 400° C. had a mean particle size ~5 nm with a surface area of ~150 $m^2$/g. Gold was then applied onto ceria by deposition-precipitation (DP) according to the procedure outlined above. After several washes and drying, the Au-ceria particles were calcined in air at 400° C. for 10 hours. Most of the Au thus prepared is in the form of metal nanoparticles, ~5 nm avg. size. The deposition step has a negligible effect on the total surface area of ceria. For comparison, we made gold-ceria samples prepared by a single co-precipitation step (CP) according to the procedure described above, and by the UGC technique.

Leaching of gold took place in an aqueous solution of 2% NaCN at room temperature. Sodium hydroxide was added to keep the pH at ~12. This same process is used to extract gold during gold mining. No Ce or La was found in the leachate. The leached samples were washed, dried (120° C., 10 hours) and heated in air (400° C., 2 hours). More than 90% of the gold loading was removed from the ceria by this leaching procedure. Scanning transmission electron microscopy (STEM)/Energy Dispersive X-ray spectroscpopy (EDX) showed no gold particles remaining. Only what appeared to be very fine clusters or atomically dispersed gold was observed. X-ray photoelectron spectroscopy (XPS) identified ionic gold as the major or only gold species present in the leached materials, as is described in more detail below.

Platinum-bearing samples were produced in a similar manner. La-doped ceria powders were prepared by UGC as described above. They were then impregnated with an aqueous solution of $H_2PtCL_6$ of appropriate concentration, whose volume equaled the total pore volume of ceria. The Pt-ceria was prepared by use of the incipient wetness impregnation (IMP) technique. After impregnation, the samples were degassed and dried at room temperature under vacuum. After drying in a vacuum oven at 110° C. for 10 hours, the samples were crushed and calcined in air at 400° C. for 10 hours. Calcined Pt-ceria samples were leached by the same procedure as the gold catalysts. The leached sample is denoted as Pt-CL(IMP, NaCN1). To further reduce the amount of Pt, Pt-CL(IMP, NaCN1) was leached in 2% NaCN solution at 80° C. for 12 hours. The corresponding sample is denoted as Pt-CL(IMP, NaCN2). The properties of Au- and Pt-ceria samples that were prepared and tested are presented in Table I.

All reagents used in catalyst preparation were analytical grade. The samples are denoted as αAu-CL (z), where α is the atomic percent (at. %) gold loading $[100 \times (Au/M_{Au})/(Au/M_{Au}+Ce/M_{Ce}+La/M_{La})]$, the atomic symbol represents grams of the element, the symbol $M_{atomic\ symbol}$ represents the atomic weight, and z is the method of preparation: CP, DP, or UGC. Calcination temperature will be noted only if it differs from 400° C., the typical catalyst calcination temperature used for most samples. The lanthanum doping of ceria is around 10 at. %. Lanthanum-doped ceria samples are denoted as CL.

Catalyst Characterization

The bulk elemental composition of each sample was determined by inductively coupled plasma (ICP) atomic emission spectrometry (Perkin-Elmer, Plasma 40). The total sample surface area was measured by single-point BET $N_2$ adsorption/desorption on a Micromeritics Pulse ChemiSorb 2705. X-ray powder diffraction (XRD) analysis of the samples was performed on a Rigaku 300 X-ray diffractometer with rotating anode generators and a monochromatic detector. Cu K, radiation was used. The crystal size of ceria and gold was calculated from the peak broadening using the Scherrer equation, according to the description of J. W. Niemantsverdriet, Spectroscopy in Catalysis, VCH, New York, N.Y., 1995.

High-resolution transmission electron microscopy (HR-TEM) was used to study the sample morphology. The analyses were performed on a JEOL 2010 instrument with an ultimate point-to-point resolution of 1.9 Å and lattice resolution of 1.4 Å. The TEM was equipped with a X-ray detector for elemental analysis of selected samples areas. The sample powder was suspended in isopropyl alcohol using an ultrasonic bath and deposited on the carbon-coated 200 mesh Cu grid.

A Kratos AXIS Ultra Imaging X-ray photoelectron spectrometer with a resolution of 0.1 eV was used to determine the atomic metal ratios of the surface region and metal oxidation state of selected catalysts. Samples were in powder form and were pressed on a double-side adhesive copper tape. All measurements were carried out at RT without any sample pretreatment. An Al $K_\alpha$ X-ray source was used.

Activity Tests

Water-gas shift reaction tests were performed at atmospheric pressure with 150 mg catalyst powder (50-150 μm size). The catalyst was supported on a quartz frit at the center of a quartz-tube flow reactor (1.0 cm i.d.), which was heated inside an electric furnace. The feed gas mixture in some tests contained 2% CO and 10.7% H$_2$O in helium. In other tests a simulated reformate-type gas was used, containing higher amounts of CO and H$_2$O as well as large amounts of H$_2$ and CO$_2$. The total gas flow rate was 100 cm$^3$/min (NTP). The corresponding contact time for the ceria-based samples was 0.09 g s/cm$^3$ (gas hourly space velocity, GHSV=80,000 h$^{-1}$). All ceria samples were used in the as prepared form without activation. Water was injected into the flowing gas stream by a calibrated syringe pump and vaporized in the heated gas feed line before entering the reactor. A condenser filled with ice was installed at the reactor exit to collect water. The reactant and product gas streams were analyzed using a HP-6890 gas chromatograph equipped with a thermal conductivity detector (TCD). A Carbosphere (Alltech) packed column (6 ft×⅛ in.) was used to separate CO and CO$_2$.

Temperature-programmed Reduction (TPR)

TPR of the as-prepared catalysts in fine powder form was carried out in a Micromeritics Pulse ChemiSorb 2705 instrument. The samples were first oxidized in a 10% O$_2$/He gas mixture (50 cm$^3$/min (NTP)) at 350° C. for 30 min, cooled down to 200° C. and then flushed with pure nitrogen (Grade 5) to RT. The sample holder was then immersed in liquid nitrogen. A 20% H$_2$/N$_2$ gas mixture (50 cm$^3$/min (NTP)) was next introduced over the sample causing a large desorption peak, at the end point of which the liquid N$_2$ was removed and the sample temperature was raised to RT. A second large desorption peak was recorded at that time. Those two peaks appeared with all samples, even for pure ceria, and were identical. They are attributed to desorption of physically adsorbed nitrogen and hydrogen. The sample was then heated at a rate of 5° C./min from RT to 900° C. A cold trap filled with a mixture of isopropanol and liquid nitrogen was placed in the gas line upstream of the TCD to remove the water vapor.

Oxygen Storage Capacity (OSC) Measurements

OSC measurements were carried out in a flow reactor system, equipped with a switching valve for rapid introduction of step changes in gas streams of CO/He, He, and O$_2$/He. Catalyst samples were prepared by cold pressing thin disks from powders and breaking the disks into small pieces. The fragments (0.3 g) were loaded into the (¼) in. quartz reactor tube and supported on a frit. A total gas flow rate of 50 cm$^3$/min (NTP) was used. Certified gas mixtures were used and passed through moisture and oxygen traps before entering the system. The 10% CO/He gas stream passed through a hydrocarbon trap in addition to the above treatments. The steady-state signals of CO, CO$_2$ and O$_2$ were detected by an on-line quadrupole residual gas analyzer (MKS-model RS-1). The reactor tube could be bypassed. Prior to an OSC measurement, the sample was first heated in 10% O$_2$ at 350° C. for 15-20 min. The sample was further purged in helium at 350° C. for half hour to remove oxygen from the system. Then the sample was exposed to 10% CO/He and 10% O$_2$/He step changes at the desired test temperature. In all cases, CO$_2$ production was limited, although CO and O$_2$ were at initial gas levels. Each experiment consists of flowing CO through the by-pass line for 3 min followed by flowing CO through the reactor for 3 min. Then O$_2$ flowed through the by-pass line for 3 min followed by O$_2$ flowing through the reactor for 3 min. A 6 min pulse of He between the CO and O$_2$ step pulses was used to ensure complete removal of gas phase species. The CO flow through the by-pass was used as a blank to stabilize the mass spectrometer, while the by-pass O$_2$ was used to remove any carbon deposited on the filament of the mass spectrometer. Integration of the partial pressure as a function of time was used to accurately determine the amounts of CO$_2$ formed, and CO and O$_2$ consumed during the CO and O$_2$ step pulses.

We now turn to a discussion of the behavior of the catalyst materials as shown and described with respect to FIGS. 1-15. Thereafter, we will discuss the underlying details of the catalyst materials including both the substrate materials and the deposited and leached metal component.

FIG. 1 shows Arrhenius-type plots of the WGS reaction rate as measured over the as prepared Au-ceria catalysts and the Au-free ceria (CL). In FIG. 1, each curve represents a particular specimen, and is identified both by a symbol and the indication "Curve X", where X is a letter that ranges from A to H. In the figure, Curve A is presented using the filled square symbol (■) and denotes 4.4AuCe(La)O$_x$ (CP); Curve B is presented using the open square symbol (□) and denotes 0.7AuCe(La)O$_x$ (CP, leached); Curve C is presented using the filled triangle symbol (▲) and denotes 4.7AuCe(La)O$_x$ (DP); Curve D is presented using the open triangle symbol (Δ) and denotes 0.44AuCe(La)O$_x$ (DP, leached); Curve E is presented using the filled circle symbol (●) and denotes 2.8AuCe(La)O$_x$ (DP); Curve F is presented using the open circle symbol (○) and denotes 0.23AuCe(La)O$_x$ (DP, leached); Curve G is presented using the asterisk symbol (*) and denotes Ce(La)O$_x$; and Curve H is presented using the filled diamond symbol (♦) and denotes the commercial catalyst G-66A (United Catalysts Inc., 42 wt % CuO-47 wt % ZnO-10 wt % Al$_2$O$_3$, 49 m$^2$/g).

The reacting gas mixture simulates a reformate gas composition, such as 11% CO, 7% CO$_2$, 26% H$_2$, 26% H$_2$O, in an inert gas carrier, such as helium (He). See Table VI for sample properties. Activation of catalysts was not necessary. Similar rates of CO$_2$ production (per m$^2$ catalyst surface area) were measured over the parent (4.4 (CP), 4.7 (DP) or 2.8(DP) at % Au) and the corresponding leached (0.7, 0.44 or 0.23 at % Au) ceria catalysts. The apparent activation energy E$_a$ for the reaction is the same for parent and leached catalysts, 47.8±1.5 kJ/mol for the DP and 36.8±0.9 kJ/mol for the CP samples. The rate over the Au-free nanosize CL sample was much lower over the temperature range of interest, with an E$_a$ of 83 kJ/mol. Also shown in FIG. 1 is the rate measured over a commercial Cu—ZnO—Al$_2$O$_3$ (UCI, G-66A) low-temperature WGS catalyst, which contains 42 wt % Cu. Although the rate is greater over this catalyst, the use of the G-66A catalyst in fuel cell applications is contraindicated due to its air sensitivity and narrow operating temperature window. Moreover, a careful activation in H$_2$ is required for Cu/ZnO catalysts. However, the ceria-based WGS catalysts according to the invention require no activation and are not air sensitive.

The data in FIG. 1 show that the reaction pathway on the Au-ceria catalysts is different than that on Au-free ceria. Also, only the Au species present on the leached catalyst are associated with the active sites, because the extra Au present in the parent material does not increase the rate; nor does it change the E$_a$ for the reaction. If we assume complete dispersion of Au in the leached catalysts, we can calculate the turnover frequency (TOF) from the data of FIG. 1. For example, at 300° C., the TOF is 0.65 molecules of CO$_2$/Au atom per second.

Figure 2:
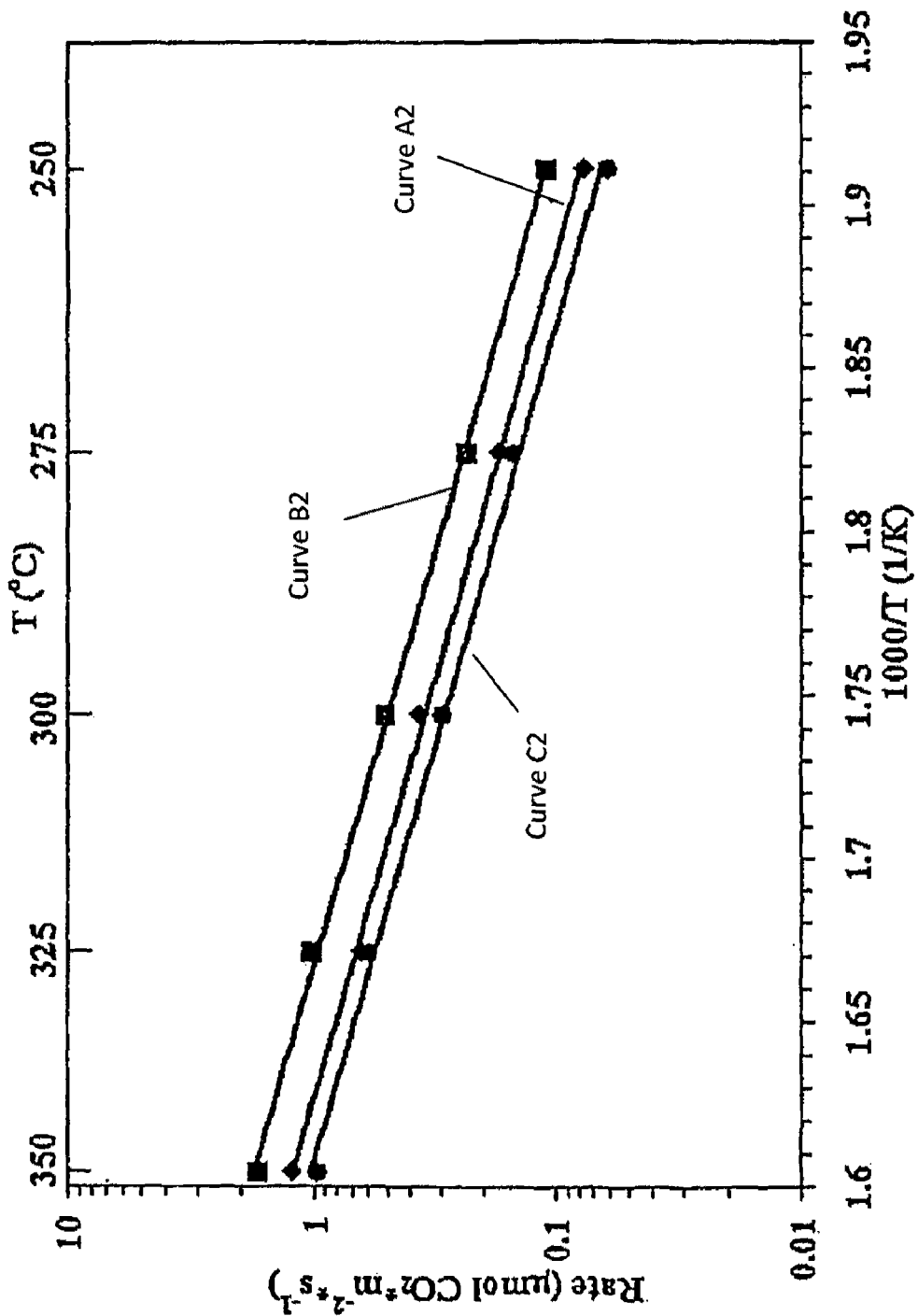
FIG. 2 is a diagram showing Arrhenius-type plots of the WGS reaction rate as measured over the as prepared and leached Pt-ceria catalysts, according to principles of the invention.

FIG. 2 is a diagram depicting the results of kinetic studies of the Pt-ceria catalysts, the E$_a$ over the parent (3.7 at % Pt, sample 3.7% Pt-CL(IMP)) represented by the curve A2 identified by filled diamond symbols, and the leached Pt-ceria (2.7 at % Pt, sample 2.7% Pt-CL(IMP, NaCN1)) represented by the curve B2 identified by filled square symbols, or 1.5 at % Pt, sample 1.5% Pt-CL(IMP, NaCN2)) represented by the curve C2 identified by filled circle symbols, was the same, 74.8±0.6 kJ/mol. The WGS rate over these samples was similar. The isokinetic temperature for the Pt- and Au-ceria (DP) samples is 250° C.

Figure 3:
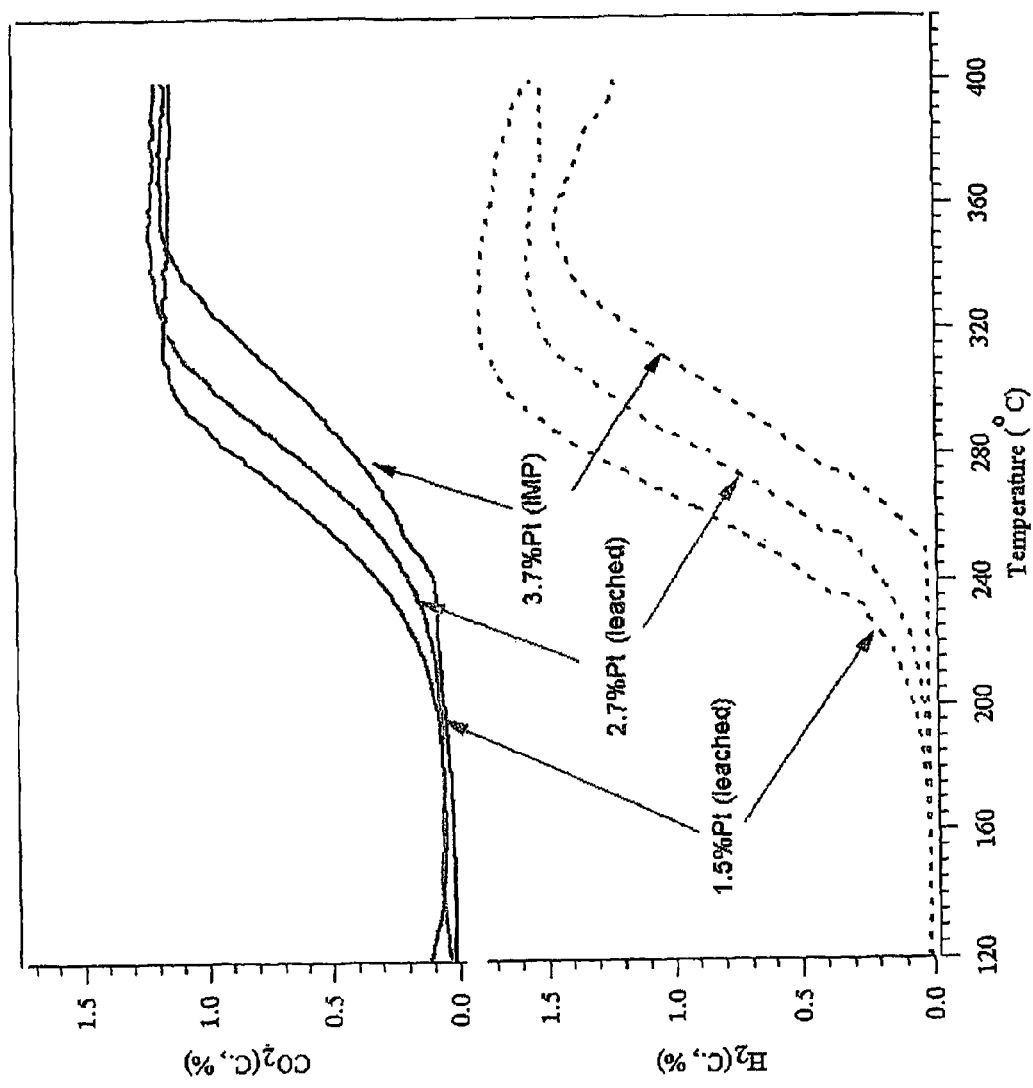
FIG. 3 is a diagram that depicts transient light-off curves for WGS over as prepared and leached Pt-ceria catalysts, which information was collected in temperature-programmed reaction mode, according to principles of the invention.

FIG. 3 is a diagram that depicts transient light-off curves for WGS over the Pt-ceria catalysts, which information was collected in temperature-programmed reaction mode, using as prepared and leached Pt-ceria catalysts in 2% CO-3% $H_2O$—He gas. These profiles were reproduced after cooling down from the high end-point temperature. The light-off temperature was lower for the catalyst containing the lowest amount of Pt (by leaching). Thus, the removed Pt was not important for the reaction, and leaching must have increased the number of active sites.

Figure 4A:
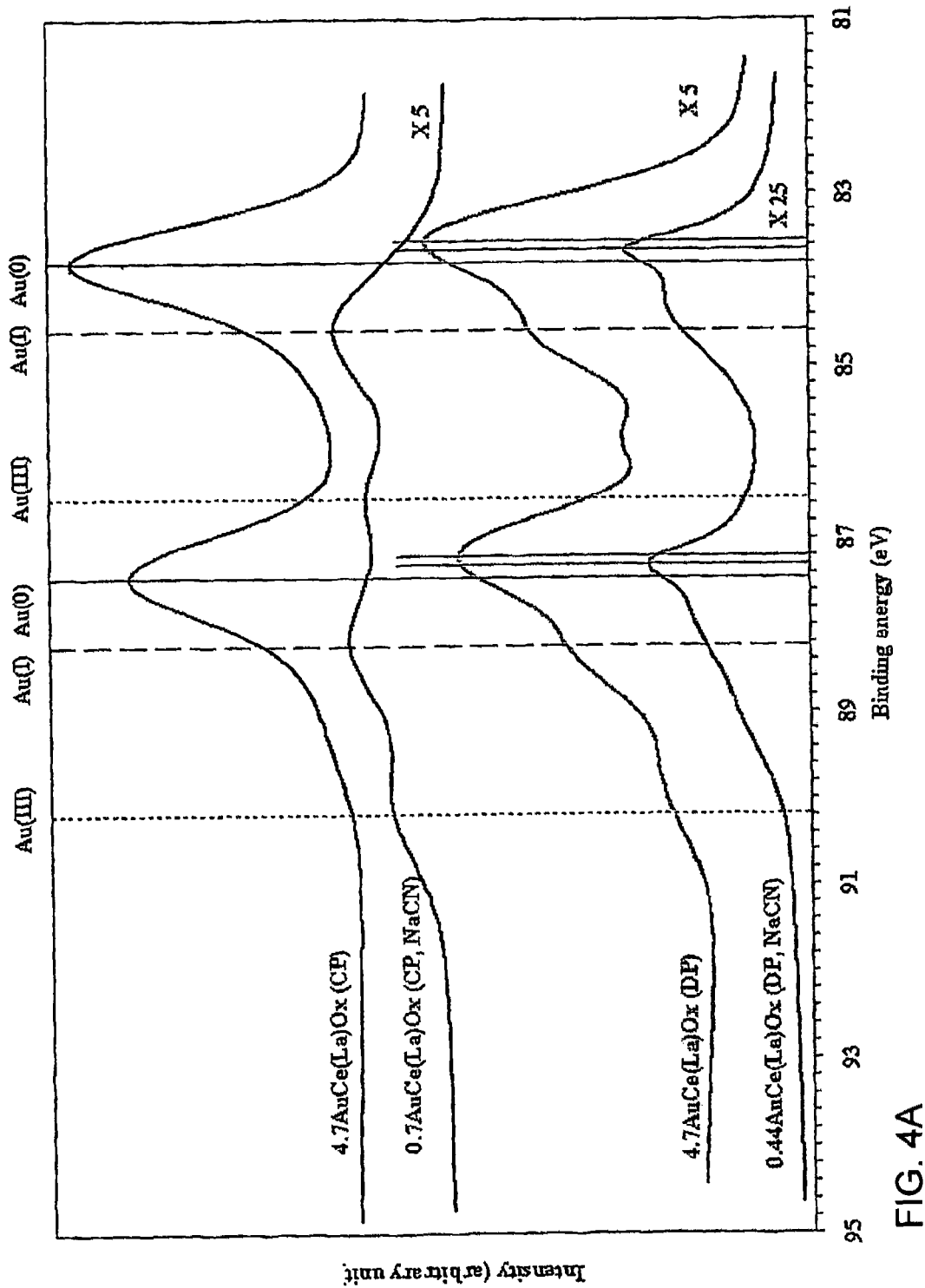
FIG. 4A is a diagram showing oxidation states of Au in both the parent and leached Au-ceria samples as measured by XPS, according to principles of the invention.
Figure 4B:
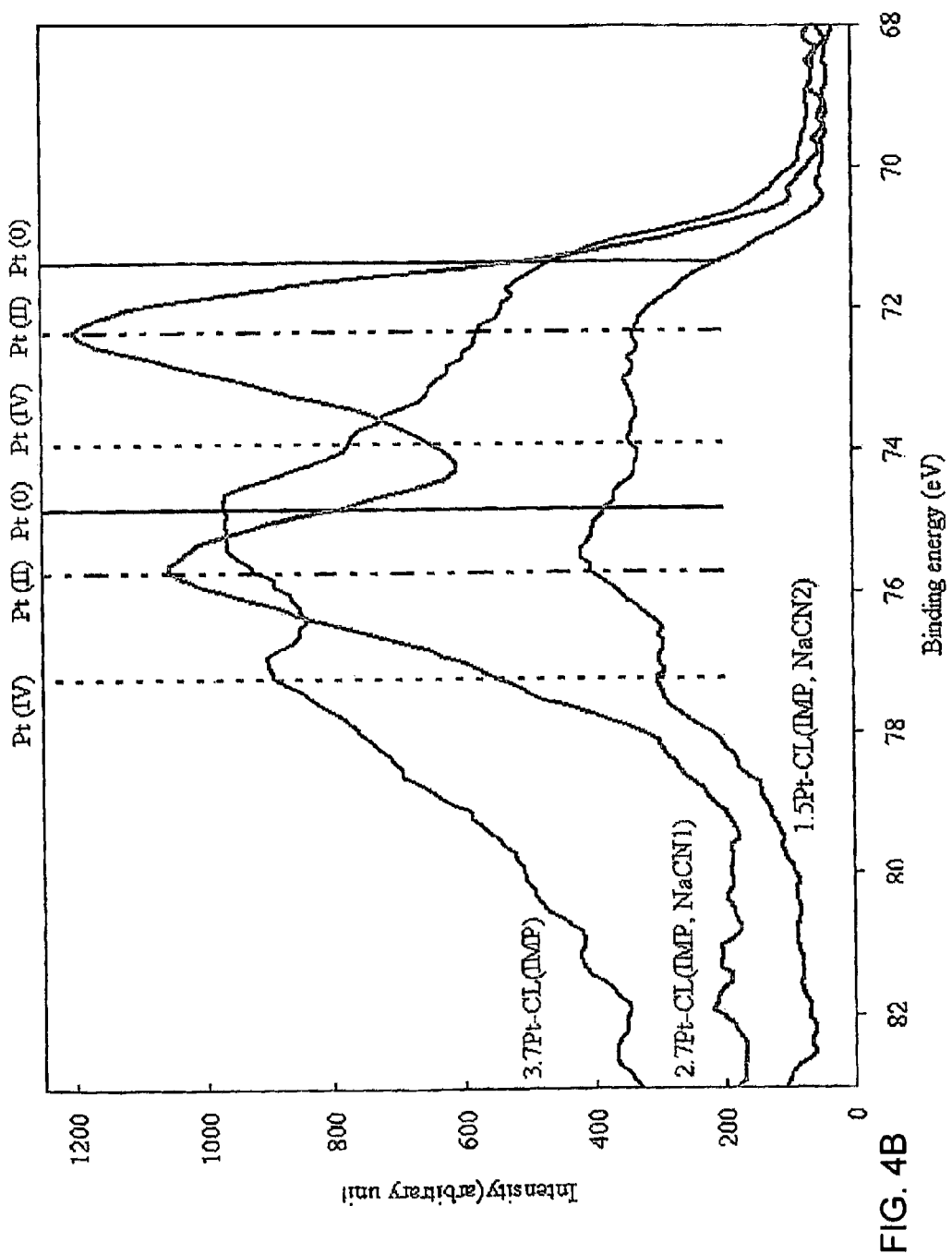
FIG. 4B is a diagram showing oxidation states of Pt in both the parent and leached Pt-ceria samples as measured by XPS, according to principles of the invention.

The oxidation states of Au and Pt in both the parent and leached ceria samples were checked by XPS, as shown in FIG. 4A and FIG. 4B, respectively. Initial and final state effects on the binding energy of Au clusters on ceria are not available in the literature. Generally, final state effects cause a positive shift of the binding energy of metallic nanoparticles as their size is decreased, but below a certain cluster size (~2 nm), initial state effects prevail, causing negative binding energy shifts. Therefore, extensive compensation effects are possible. The observed minor positive energy shift may be due to partially oxidized gold clusters.

The common features in both systems were: (i) the existence of ionic states ($Au^{+1, +3}$ and $Pt^{+2, +4}$) both before and after leaching; and (ii) the complete removal of metallic Au or Pt nanoparticles after the leaching step. No cerium or lanthanum loss took place during the leaching step as verified by ICP analysis of the leachate solutions. The absence of Au or Pt particles on the leached ceria samples was also confirmed by HRTEM. The intensities shown in FIG. 4A cannot be used to compare the amounts of gold between parent and leached samples. In fact, as shown in Table I, the surface metal content of the parent DP and CP samples is grossly underestimated because average metal particle sizes greatly exceed the electron escape depth. The agreement is better for the leached Au-ceria samples. Finally, all Pt-ceria samples show much less Pt on the surface than what is expected on the basis of the ICP analysis and the surface area of each sample. In both Au- and Pt-ceria, diffusion of Au or Pt ions into subsurface layers of ceria is plausible.

Referring to FIG. 4A, the 4.4 at % Au-CL catalyst prepared by CP shows metallic gold (Au) binding energies at 83.8 and 87.4 eV. This sample contains metallic Au particles with a mean size of 12.2 nm (Table I). Leaching removed all metallic gold for sample 0.7% Au-CL. Both $Au^{+1}$ and $Au^{+3}$ were present in the leached sample. The 4.7 at % Au-CL catalyst prepared by DP shows $Au^0$ lines as well as ionic gold. The corresponding leached material shows ionic gold binding energies, as well as a positively shifted (by ~0.1 eV) binding energy of $Au^0$. This shift is within the experimental error of the analysis. Deconvolution of the spectra shows that the zerovalent species amount to only 14% of the total gold present in the leached 0.44 at % Au-CL sample of FIG. 4A.

It may be argued that the oxidic gold observed in our samples is due to the preparation conditions (air calcination at 400° C.), and that during reaction under net reducing conditions, zerovalent gold dominates. This possibility would require further studies. An important observation that we have made here, however, is that the used catalyst, after more than 20 h at reaction conditions cannot be further leached; i.e. even if gold changes oxidation state during reaction, it does not migrate to form metallic particles.

Figure 5:
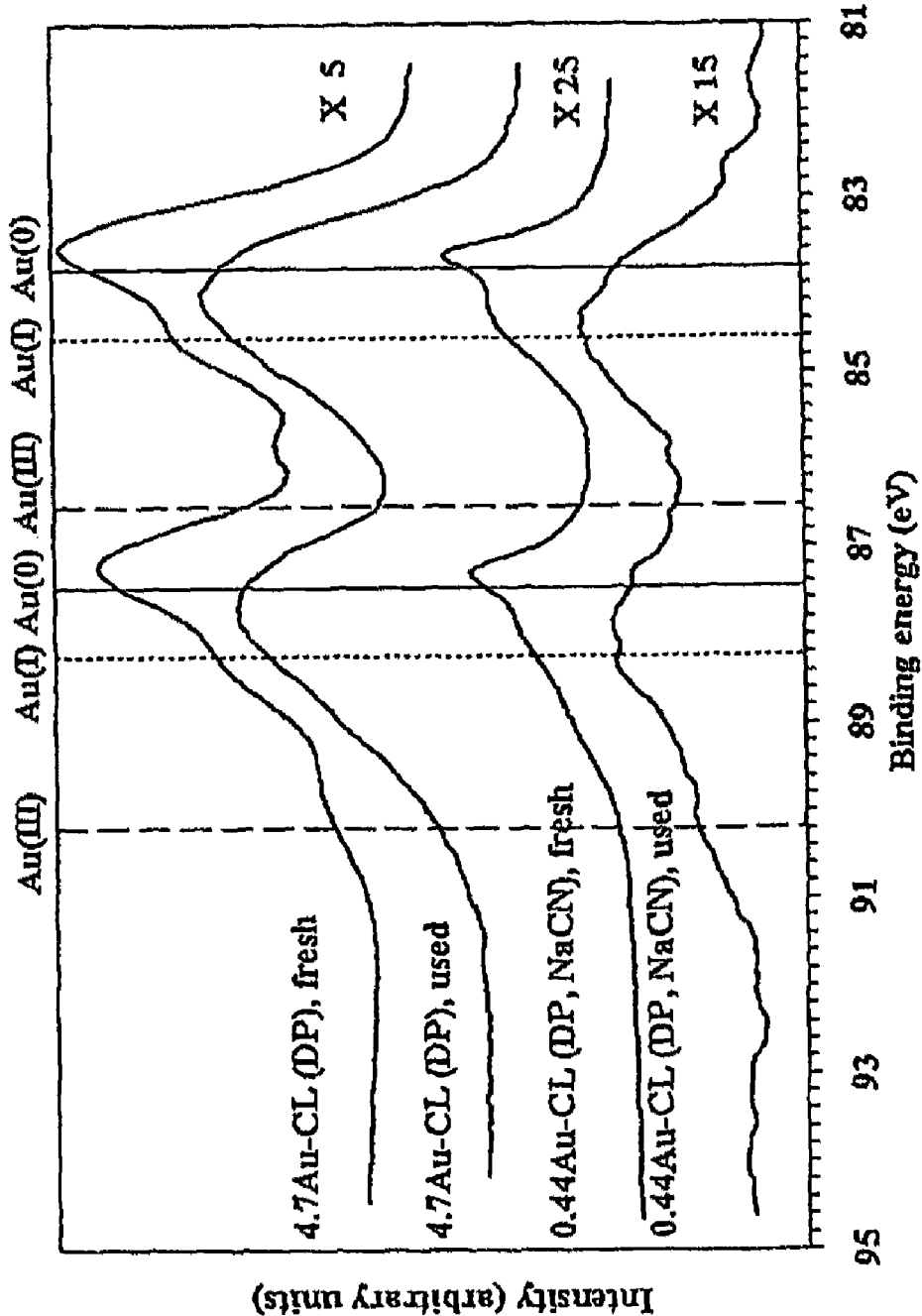
FIG. 5, is a diagram showing oxidation states of Au in a parent and a leached Au-ceria sample as measured by XPS before and after use in the WGS reaction, according to principles of the invention.

As shown in FIG. 5, XPS analysis of Au-ceria catalysts after 15 hours use at temperatures in the range of 250 to 350° C. in the reaction gas mixture of FIG. 1 shows predominance of ionic gold. For comparison, the XPS data for the fresh samples is also shown. The samples were exposed to air prior to being transferred to the XPS chamber. The Au—O—Ce structures are stable under the conditions used in this work. Similar arguments can be made for the Pt-ceria catalysts. For this type of material, surface Pt—O phases strongly associated with ceria have been reported.

The use of dry CO in temperature-programmed reduction (TPR) identified oxygen species of importance to low-temperature WGS on the parent and leached catalysts. Various types of oxygen have been identified on cerium oxide, ranging from weakly bound adsorbed oxygen to surface capping oxygen to lattice oxygen, depending on the operating temperature. A synergistic redox model for Metal/$CeO_2$ has been proposed in which the metal particle participates by providing adsorption sites for CO, while ceria supplies the required oxygen. This simple model does not provide atomic-level understanding and mechanistic resolution of several key questions; most importantly it assigns the CO adsorption sites on metal particles. However, as FIGS. 1 and 3 show, the WGS activity of metal-free (leached) ceria is similar to that of the metal-containing samples.

Figure 6:
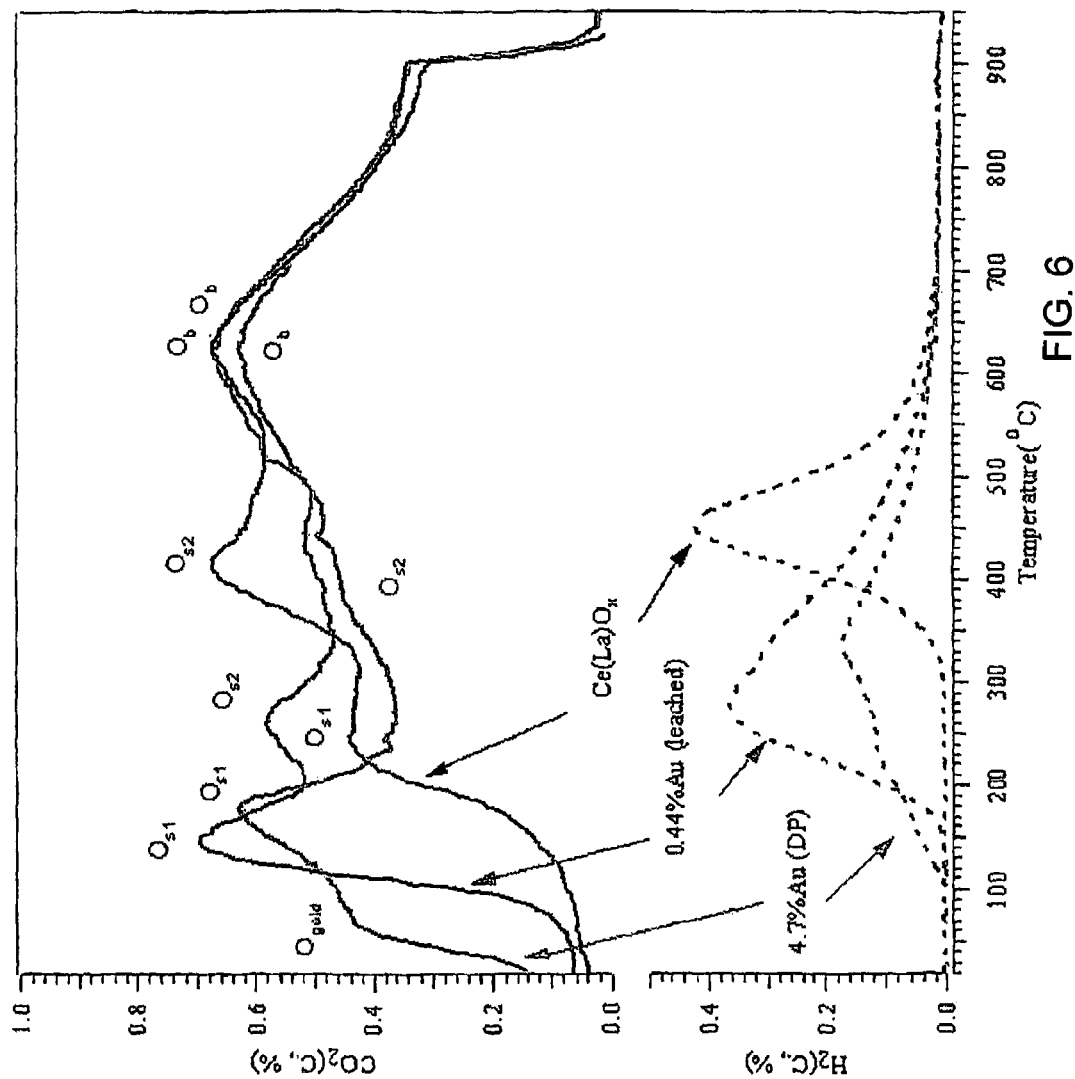
FIG. 6 is a diagram showing CO-TPR of fully oxidized parent and leached Au-ceria samples and the CL material, according to principles of the invention.

CO-TPR of fully oxidized parent and leached Au-ceria (DP) samples and the CL material are shown in FIG. 6. CO-TPR was carried out in a Micromeritics Pulse ChemiSorb 2705 instrument. The samples were first oxidized in a 10% $O_2$/He gas mixture (50 $cm^3$/min (NTP)) at 350° C. for 90 min, cooled down to room temperature and purged with pure helium (Grade 5) for 30 min. A 10% CO/He gas mixture (50 $cm^3$/min (NTP)) was passed over the sample which was heated at 5° C./min to 900° C. The effluent gas was analyzed by mass spectrometry (MKS-model RS-1). The cyclic CO-TPR experiments were conducted only up to 400° C. to avoid structural changes of the catalyst at higher temperatures. The first $CO_2$ peak produced on the parent Au-ceria sample is absent in the leached sample and the Au-free, CL material. This peak is thus assigned to oxygen adsorbed on metallic Au nanoparticles, present only on the parent 4.7% Au-CL sample. The high-temperature oxygen species, $O_b$, is of similar reducibility in all three samples. Thus, the presence of Au does not affect the bulk (lattice) oxygen of ceria. However, the reducibility of the surface oxygen species of ceria, $O_{s1}$ and $O_{s2}$, was greatly increased, as is clearly shown in FIG. 6 for both Au-containing samples. This result correlates well with the dramatically higher WGS activity of the latter compared to that of the CL material shown in FIG. 1.

The appearance of $H_2$ along with $CO_2$ elution during CO-TPR is attributed to surface hydroxyls remaining in ceria even after the oxidation pre-treatment step in dry $O_2$/He mixture at 350° C. Very little $H_2$ was produced when the CO-TPR was repeated after reoxidation at 400° C., and by the fourth cycle, only trace amounts of $H_2$ evolved. The amount of $CO_2$ eluted in all cycles was the same, and its production began and peaked at the same temperatures, as those shown for the first cycle in FIG. 6. A higher amount of $CO_2$ was eluted from the leached catalyst (see area under $O_{s1}$ peak, FIG. 6). This difference may be due to unmasking of sites after leaching away the metallic particles covering them.

One may well ask how gold ions or adatoms interact with ceria to weaken both its $O_{s1}$ and $O_{s2}$ surface oxygens. A distribution of electronic charges between atomic gold or a small cluster of gold atoms and ceria could weaken the Ce—O bond. Evidence from $H_2$-TPR and separate pulse reactor experiments with CO in our lab strongly suggests that gold increases the amount of surface oxygen of ceria. This increase can occur via partial lattice filling of vacant cerium sites with $Au^{8+^+}$, which would create additional oxygen vacancies on the surface of the $Ce^{4+}$—$O_2$ fluorite type oxide.

The identification of Au ions, as seen in FIG. 4A, along with the increased amount of surface oxygen in the leached sample as seen in FIG. 6, argues in favor of lattice substitution. Diffusion of gold ions into ceria takes place during the heating step in the preparation process, as attempts to leach the gold immediately after deposition and before heating failed to produce an active catalyst. The minimum metal loading required for a desired WGS activity may be determined from the ceria surface properties. Assuming uniform monolayer dimensioned metal surface coverage on the CL material [Ce(10% La)$O_x$, 160 m$^2$/g], the coverage was calculated to be 13.5 at. % Au or 15.5 at. % Pt with Au and Pt radius equal to 0.174 nm and 0.139 nm, respectively. As can be seen in Table I and FIGS. 1 and 3, only a small fraction of a monolayer of Au or Pt is present on the leached catalysts, but it correlates well with the concentration of surface oxygen defect sites of ceria.

The importance of the surface defects of ceria as the 'anchoring' sites of Au, and in turn as the active sites for WGS, can be seen in ceria samples annealed at high temperatures, which effectively reduces the number density of these sites. Defects in ceria can be two types, intrinsic and extrinsic. Intrinsic defects are due to the oxygen anion vacancies created upon thermal disorder or the reduction of ceria. The extrinsic defects are due to oxygen anion vacancies created by the charge compensation effect of low valence foreign cations. The concentration of defects can be calculated from the lattice expansion measured by XRD. If we assume that gold only associates with the oxygen defects in ceria, the required Au (or Pt) is 0.13 at % for $CeO_2$, and 0.57 at % for Ce(10% La)$O_x$ (both calcined at 400° C.), and only 0.03 at % for the undoped $CeO_2$ calcined at 800° C. (see Table I). These values will increase if gold or platinum ions substitute in the ceria lattice. The reaction rate measured over 3.4% Au—$CeO_2$ (calcined at 800° C. for 4 h, Table I) was very low, but the activation energy was the same as for the other Au-ceria (DP) materials shown in FIG. 1. Removal of gold from this sample by leaching was essentially complete (see Table I) and the leached sample was inactive for WGS up to 400° C.

We have described a two-step method of preparation of active gold-ceria catalyst by leaching the parent catalyst. The first step of the method involved using a large amount of gold to prepare an active catalyst. The second step involved leaching, which unexpectedly leaves the catalyst activity intact even if most of the gold is removed. We shall refer the method of making catalysts of the invention prepared by the two-step method (i.e., deposition followed by leaching excess gold) as "indirect preparation." As a result of removing gold that does not contribute to the catalytic activity, it is possible to recover gold from the leachate solution, which permits the cost of the catalyst to be reduced as compared to conventional catalysts. However, this approach is complex as it involves two steps. A more direct synthesis (or "direct preparation") of the pure catalyst (or purified form of the catalyst) of the invention would offer appreciable advantages, if such a direct preparation were possible.

We attempted to deposit a similar amount of gold as that found in the leached catalyst to get an active catalyst in one step. In the first attempts when the NaCN leachate (retrieved from 5% Au-CL(DP)) was used at high pH, we failed to deposit gold on the lanthanum-doped ceria (Ce(La)$O_x$) by the DP method.

We then tried to prepare an active catalyst by an impregnation method described below using either a solution of NaAu(CN)$_2$ purchased from Aldrich or NaCN leachate solution. The surface area and bulk composition of these materials are listed in Table II. We designed the process to put 1.2% Au on lanthanum-doped ceria in samples 1, 2, and 4 to 6 and 0.5% Au on lanthanum-doped ceria in sample 3. As can be seen in Table II, gold was successfully deposited on lanthanum-doped ceria by this impregnation method at room temperature. Addition of NaOH did not have any effect. The surface area did not change after impregnation. The color of these materials is dark-gray, indicating the presence of some metallic gold.

The impregnation method used was performed as follows. The substrates, comprising $CeO_2$ or Ce(La)$O_x$, were made by the urea gelation/coprecipitation technique (as described above) with or without being calcined in air at 400° C. for 10 h. The substrates were impregnated with a solution of NaAu(CN)$_2$ or NaCN leachate of appropriate concentration, whose volume of liquid was calculated to equal the total pore volume of the support (the incipient wetness method). A dropper was used to impregnate the support under constant stirring. After impregnation, the samples were degassed in a vacuum desiccator at room temperature to slowly remove the water. The remaining metal salt solution decorates the pores of the support. After drying in the vacuum oven at 110° C. overnight, the samples were then crushed and calcined in air at 400° C. for 2 hours.

Figure 7:
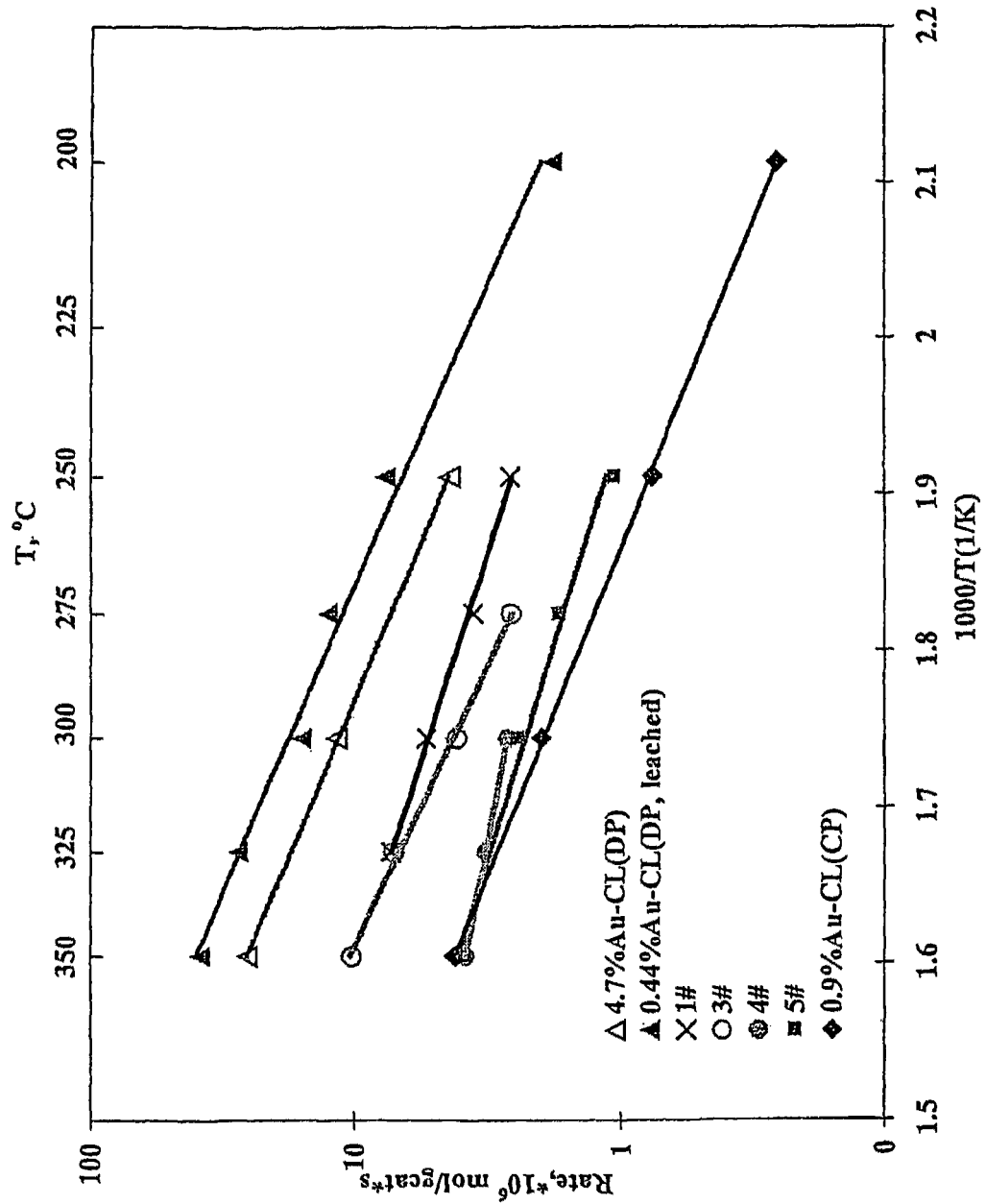
FIG. 7 is a diagram showing WGS rates over lanthanum-doped ceria impregnated with $NaAu(CN)_2$ or NaCN leachate solutions, according to principles of the invention.

FIG. 7 shows the water gas-shift activities of these materials, evaluated in a reformate-type gas composed of 11% CO, 7% $CO_2$, 26% $H_2$, 26% $H_2O$, and balance He. Sample 1 has the best activity, while sample 3 with 0.3% Au is also active. Sample 5, impregnated with NaCN leachate, is somewhat inferior. Although these rates are not as high as the leached and parent samples of 5% Au-CL (DP), they are higher than the rate measured over the usual CP-prepared 1% Au-CL (CP). This suggests that impregnation with NaAu(CN)$_2$ deposits more active gold than CP does. This salt lacks the chloride ions present in HAu$Cl_4$. Chloride residue on the surface is generally considered deleterious.

These results, while positive, do not represent optimization of the various parameters, such as the type of precursor, its conditions of preparation and pre-treatment, variations in pH value, variations in soluble metal species, times, temperatures, and other preparative parameters. We have studied some variations in such preparative parameters, which are described in greater detail below. The precursor [AuIII(CH$_3$)$_2$(acac)] (where acac denotes acetylacetonate, $C_5H_7O_2$) [J. Guzman & B. C. Gates, Angew. Chem. Int. Ed. 42 (2003) 690] would be a good candidate to try as a source of gold. Other precursors for deposition of gold or for deposition of other metals of interest, e.g., platinum, rhodium, palladium, iridium, ruthenium, cobalt, nickel, iron, manganese, copper, will be apparent to those of ordinary skill in the deposition arts. Based on the above findings, it is possible to directly prepare catalysts, such as a low-content gold, active gold-ceria catalyst of the invention without wasting any gold.

In the experiments we have conducted to date, leaching the Au immediately after deposition and before heating failed to produce an active catalyst. Based on this result, we infer that diffusion of Au ions into ceria takes place during the heating step in the preparation process. The temperature required to cause diffusion is not known definitively, but appears to be above 200° C. For example, we have observed that total leaching of Au also takes place on a catalyst calcined in air at 200° C. after deposition. At 200° C., gold hydroxides decompose to form mostly metallic gold. Gold cations are stabilized by the cerium oxide support. The thermal treatment in the reformate gas mixture of 11% CO, 7% $CO_2$, 26% $H_2$, 26% $H_2O$ causes the diffusion of Au ions at lower temperatures. In experiments to date, after heating in this reformate gas up to 225° C., a part of the Au is not leachable. In general, the exact time and temperature heating cycle required for fixing the catalytic metal will depend on the method of preparation and the composition of the substrate material and the catalytic metal used, including the catalytic metal precursor. The method of incorporation of the noncrystalline substance into the substrate can be heating, activation by optical methods, and by other non-thermal techniques.

We have found in previous work that dopants can stabilize the ceria and prevent its sintering. As shown in Table III, the surface area of pure $CeO_2$ calcined at 800° C. only is 25.9 $m^2/g$, while that of La-doped ceria is 43.6 $m^2/g$. Remarkably, the surface area of leached Au-ceria, which contains only 0.44% Au, is 61.1 $m^2/g$, after the 800° C. thermal treatment. Leaching the 800° C. treated Au-ceria sample a second time reduced the Au concentration from 0.44 at % to 0.14 at %. Gold was stabilized in the ceria matrix. Embedded gold, in turn, suppresses the sintering of ceria.

Figure 8:
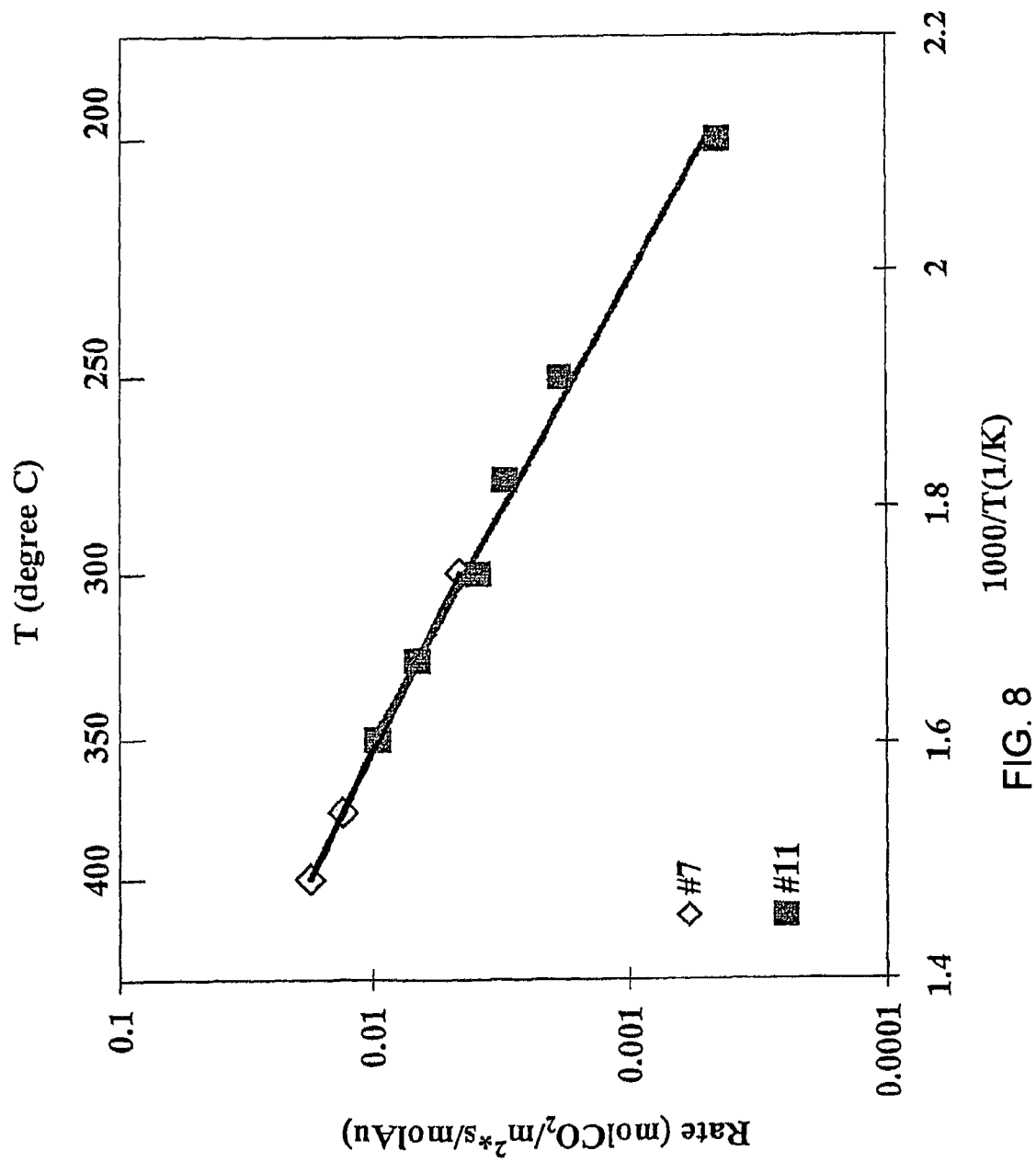
FIG. 8 is a diagram showing the thermal treatment effect on WGS rates, according to principles of the invention.

FIG. 8 shows the effect of thermal treatment on the rate of the WGS reaction as a function of reciprocal absolute temperature. The rates were measured over leached materials, calcined at 400° C. and 800° C. The WGS was performed in a reformate-type gas composed of 11% CO, 7% $CO_2$, 26% $H_2$, 26% $H_2O$, and balance He. The rates were very similar, after normalizing by the surface area and Au content (0.44 at % for the 400° C. calcined material and 0.14 at % for the 800° C. calcined material).

Figure 9:
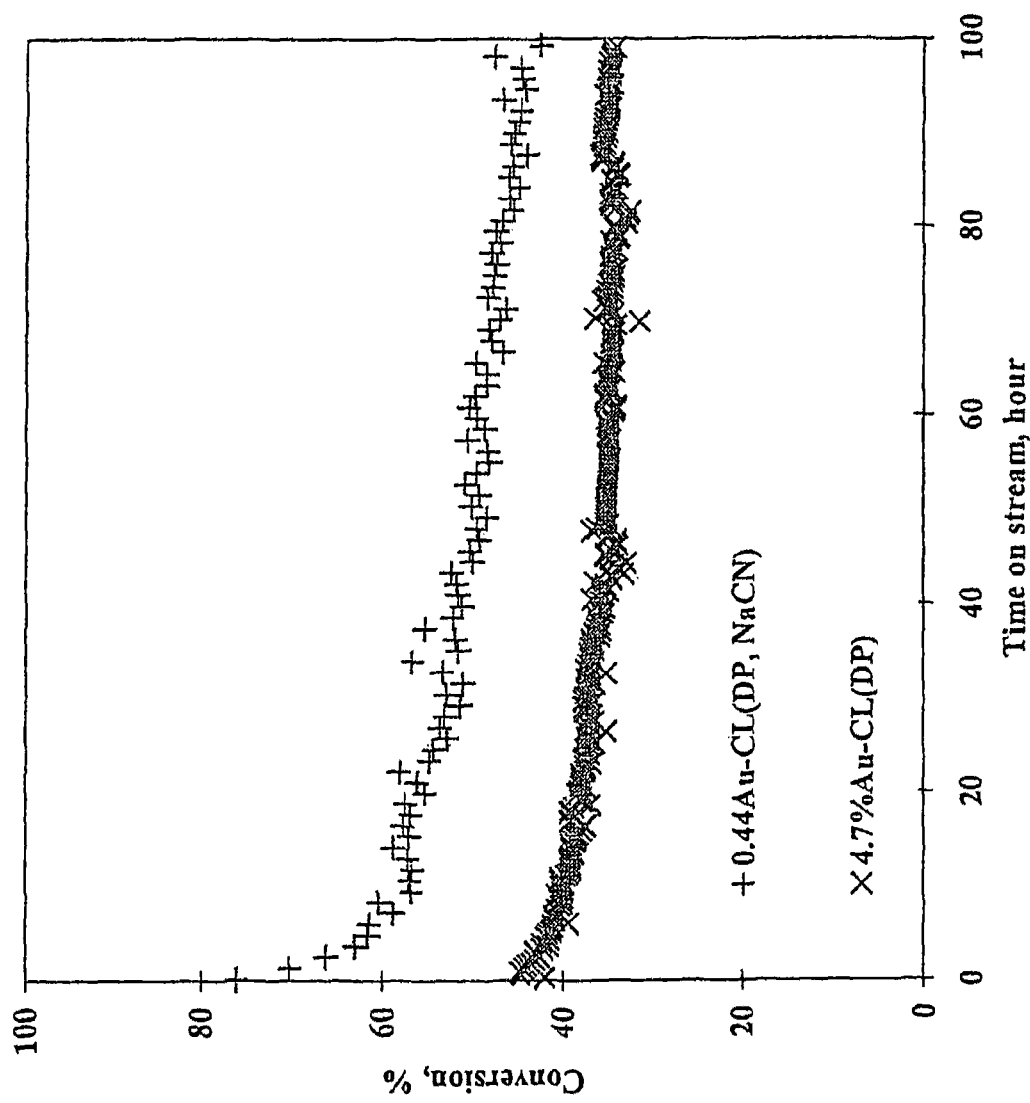
FIG. 9 is a diagram showing the long-term stability of WGS rates measured in a reformate-type gas, according to principles of the invention.

Turning back to material prepared by the "indirect preparation," the long-term stability of leached and parent catalysts, was investigated. After an initial deactivation of less than 20%, the activity remained stable. The WGS rates were measured in a reformate-type gas composed of 5% CO, 15% $CO_2$, 35% $H_2$, and balance He, using the test conditions of temperature T=250° C., and space velocity of 16,000 $h^{-1}$. FIG. 9 is a diagram showing the conversion vs. reciprocal absolute temperature. The change of surface area is presented in Table IV.

Figure 10:
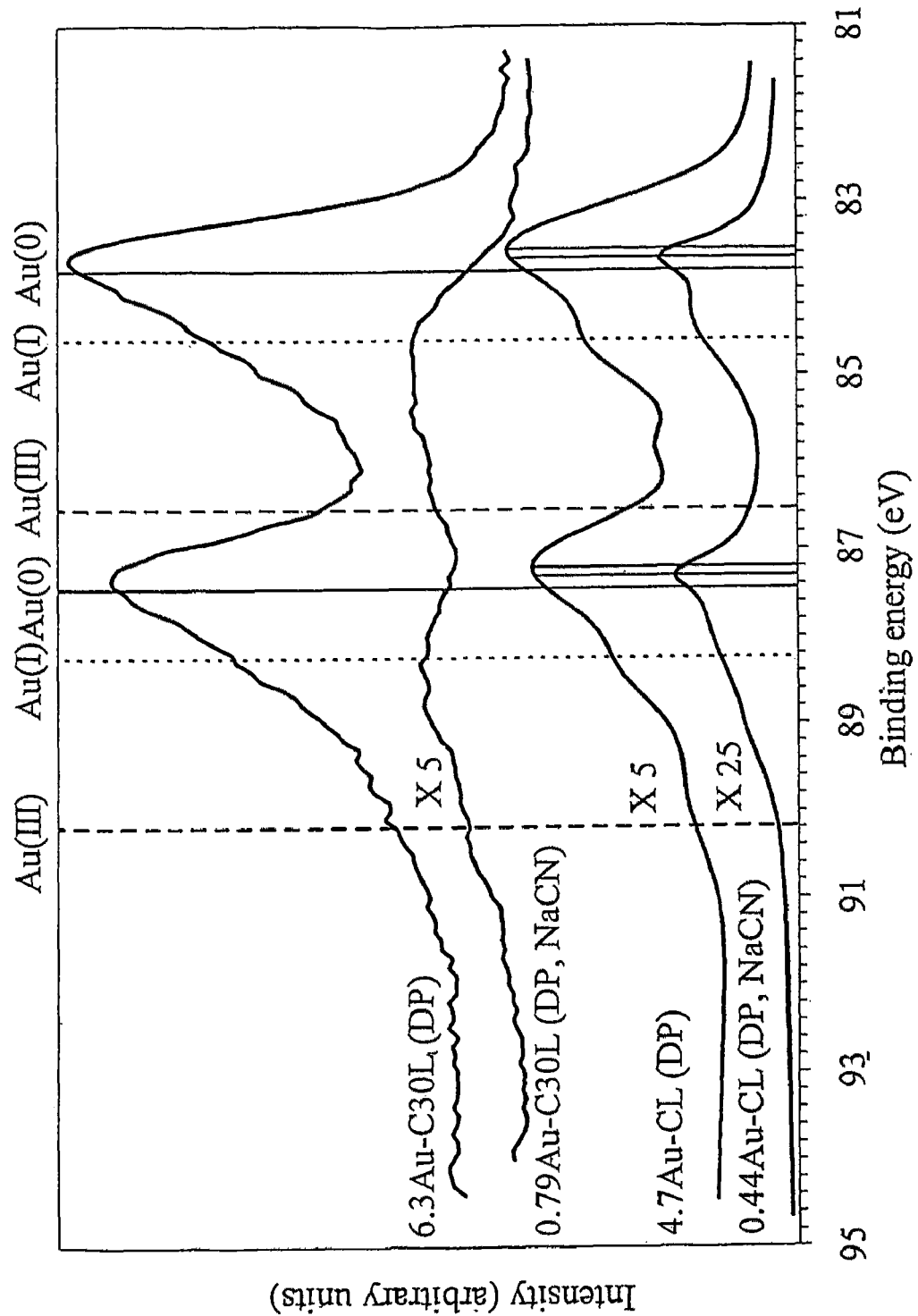
FIG. 10 is a diagram showing x-ray photoelectron spectra (XPS) of as prepared and leached samples Au-ceria, according to principles of the invention.

We have also examined the dopant effect of rare-earth metals in Au lanthanum-doped ceria doped with 10% La or 30% La. Table V lists the physical properties of these materials. The surface area of these materials is similar. FIG. 10 is a diagram showing the binding energies of various gold on lanthanum-doped ceria samples, measured by XPS.

Figure 11:
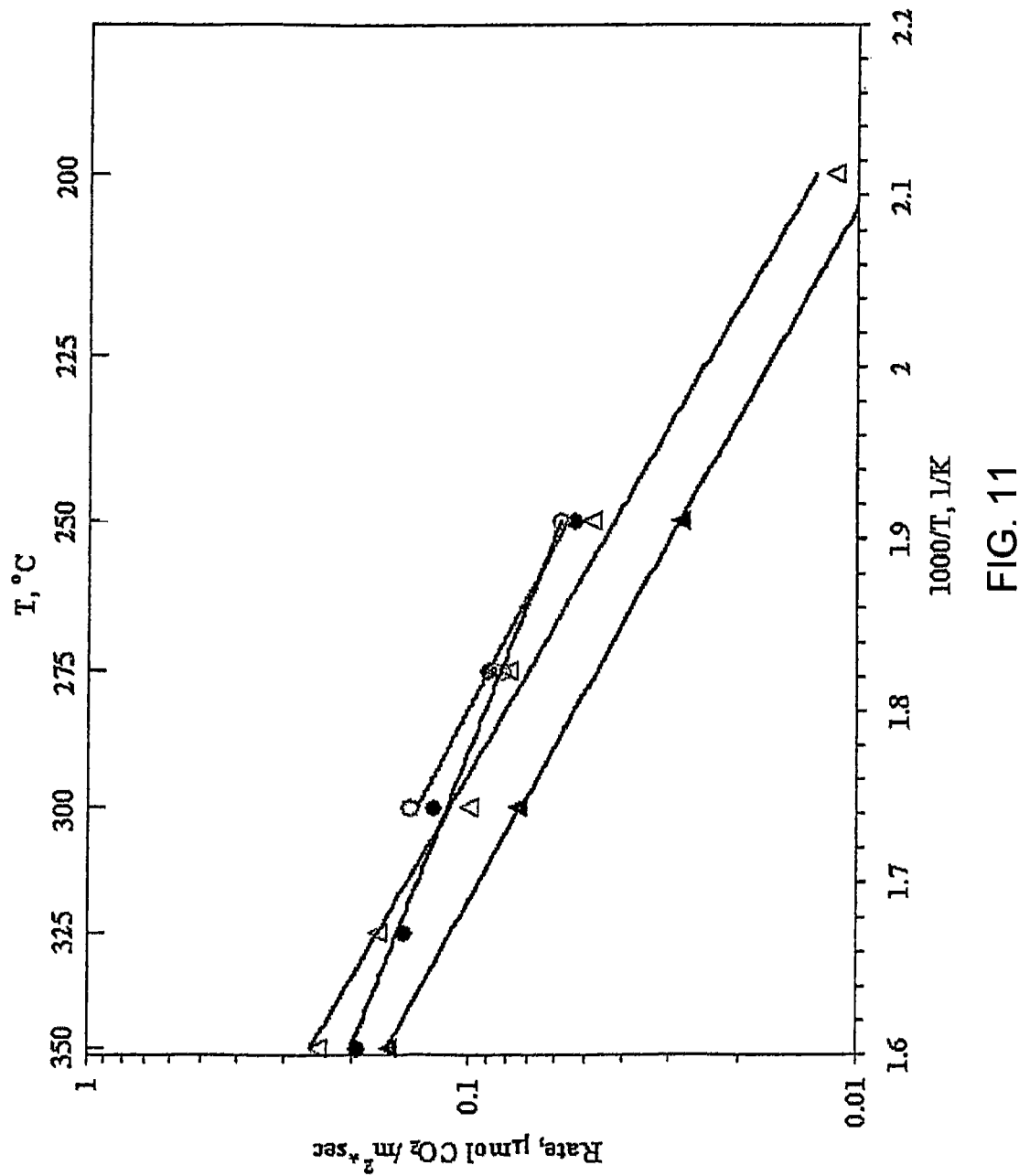
FIG. 11 is a diagram showing the dopant effect on WGS rates measured in a reformate-type gas, according to principles of the invention.

FIG. 11 is a diagram showing the effect of various rare-earth dopant levels on the WGS reaction rate for a series of as-prepared and leached samples, measured in a reformate-type gas composed of 11% CO, 7% $CO_2$, 26% $H_2$, 26% $H_2O$, and balance He. In FIG. 11, the curve identified with solid triangles represents results for 4.7% $AuCe(La)O_x$ (DP); the curve identified with open triangles represents results for 0.44% $AuCe(La)O_x$ (DP, leached); the curve identified with solid circles represents results for 6.3% $AuCe(30La)O_x$ (DP); and the curve identified with open circles represents results for 0.79% $AuCe(30La)O_x$ (DP, leached).

Figure 12:
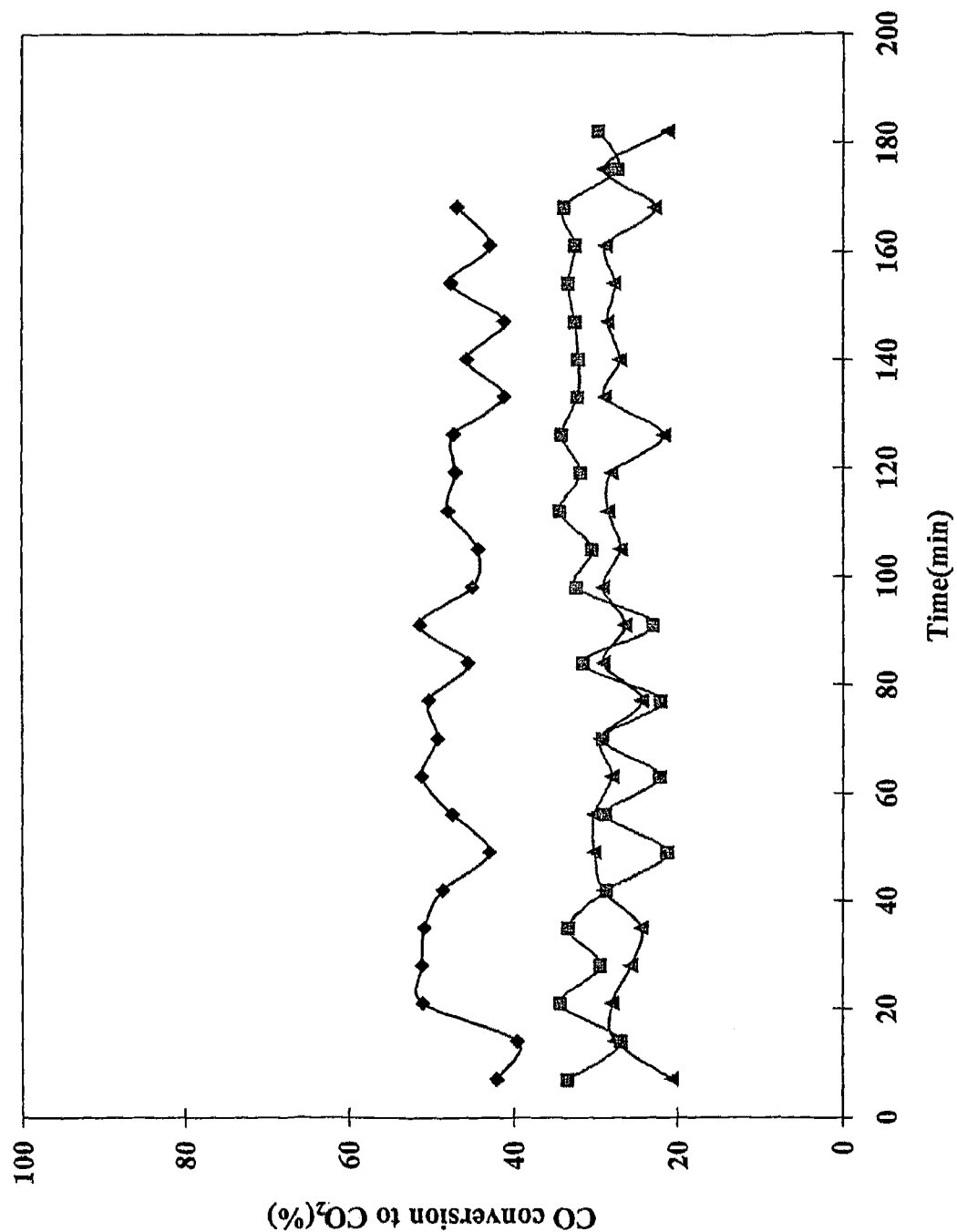
FIG. 12 is a diagram showing the dopant effect on CO conversion measured in a reformate-type gas, according to principles of the invention.

FIG. 12 is a diagram showing the effect of various rare-earth dopant levels on the conversion of CO in a reaction performed in a reformate-type gas composed of 11% CO, 7% $CO_2$, 26% $H_2$, 26% $H_2O$, and balance He with a space velocity of 32,000 $h^{-1}$, and a temperature of T=350° C. As examples, the rare-earth metals gadolinium (Gd) and praseodymium (Pr) were compared to lanthanum (La) as a dopant. In FIG. 12, the curve identified with solid diamonds represents results for 2 at % $Au—Ce(30Gd)O_x$ (DP) having a surface area of 170.6 $m^2/g$; the curve identified with solid squares represents results for 2 at % $Au—Ce(30Pr)O_x$ (DP) having a surface area of 187.8 $m^2/g$; the curve identified with solid triangles represents results for 2 at % $Au—Ce(30La)O_x$ (DP) having a surface area of 175.5 $m^2/g$. The observed results for the Pr-doped sample are comparable to those for the La-doped sample, while the results for the Gd-doped sample are somewhat better than those for the La-doped sample. In general, any lower valence dopant, such as a trivalent lanthanide, divalent alkaline earth, Sc, Y, and the like, will create oxygen vacancies in the lattice of the tetravalent $Ce^{4+}$ $O_2$ oxide, and will thus be beneficial to the process of binding and stabilizing the metal additive in ceria.

Catalysts are used to carry out many different reactions. In particular, the use of gold catalysts of the invention for catalyzing a chemical reaction other than the WGS reaction has been demonstrated. Two catalysts, 4.7Au-CL(DP) and 0.44 Au-CL(DP, NaCN) were selected to examine their activity for the steam reforming of methanol reaction. Pre-mixed methanol and water were injected into the reaction system by a calibrated syringe pump. Before entering the reactor, the reactants were vaporized in a heated gas feed line. Water and methanol were used in a ratio of 3 parts water to one part methanol, measured by liquid volume. The reactions that occur during the steam reforming are given as equations (1), (2) and (3) below:

$$CH_3OH+H_2O \rightarrow CO_2+3H_2 \quad (1)$$

$$CH_3OH \rightarrow CO+2H_2 \quad (2)$$

$$CO+H_2O \rightarrow CO_2+H_2 \quad (3)$$

The equations used to calculate the rate and selectivity are:

Conversion (%)=$100 \times (F_{CO2}+F_{CO})/F_{CH3OH(initial)}$

Rate (mol$CO_2$/gcat×sec)=$F_{CO2}/W_{cat}$

Rate (mol$H_2$/gcat×sec)=$(3 \times F_{CO2}+2 \times F_{CO})/W_{cat}$

Selectivity (%)=$100 \times F_{CO2}(F_{CO2}+F_{CO})$

Figure 13:
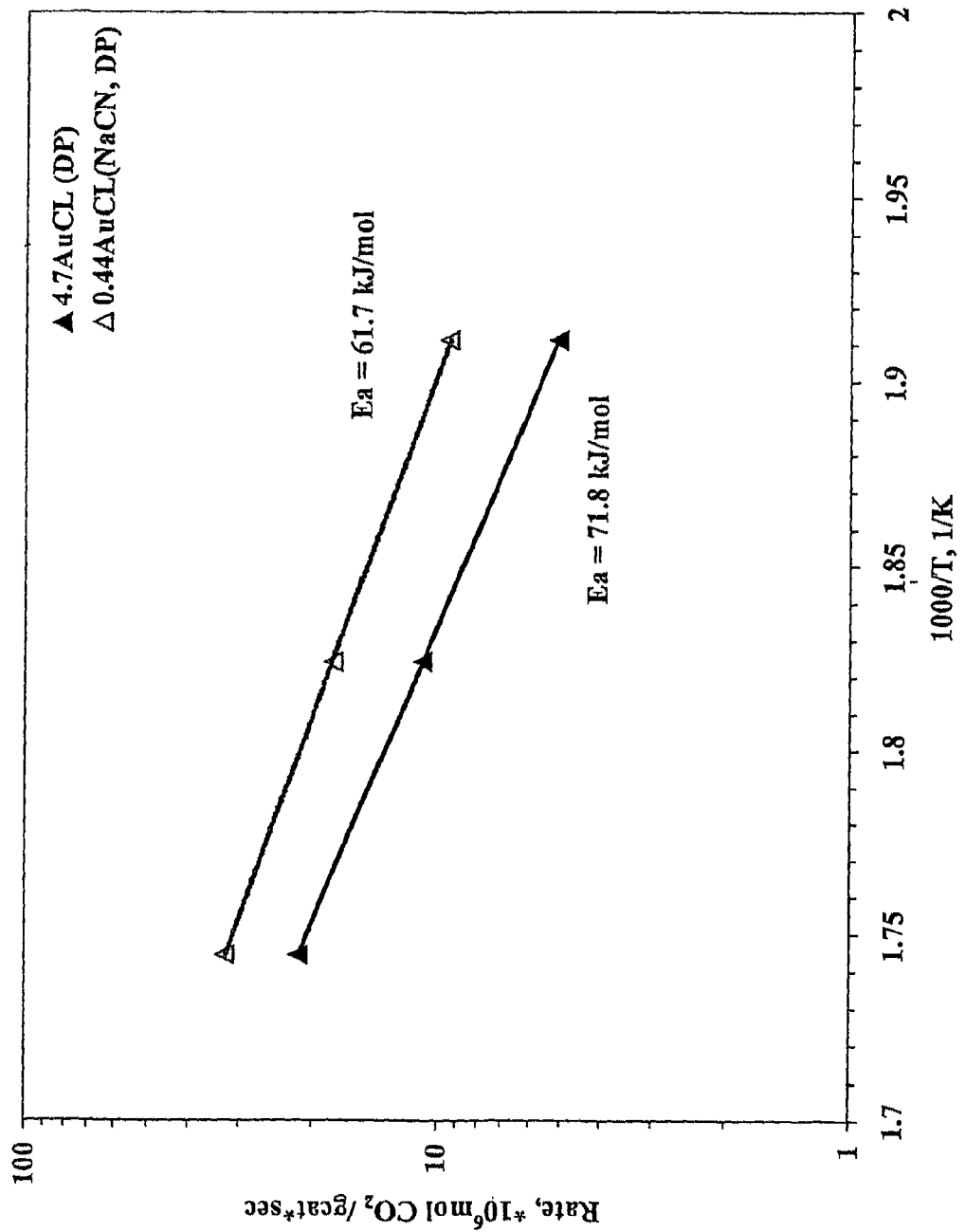
FIG. 13 is a diagram showing reaction rates for steam reforming of methanol over NaCN-leached and as-prepared Au-ceria catalysts, according to principles of the invention.

FIG. 13 is a diagram showing the rates of steam reforming of methanol over as-produced and leached gold-bearing lanthanum-doped ceria catalysts. The reaction rates were measured in a feed gas composed of 10.5% $CH_3OH$, 30.5% $H_2O$ and balance He. In FIG. 13 the curve identified with solid triangles represents results for 4.7 at % $Au—Ce(10La)O_x$ (DP) and the curve identified with open triangles represents results for 0.44 at % $Au—Ce(10La)O_x$ (DP, NaCN). The leached catalyst has a higher rate for steam reforming of methanol than that of the parent catalyst material. A similar phenomenon was found for the WGS reaction using both catalysts. Nonmetallic gold species strongly associated with surface cerium-oxygen groups appear to be responsible for the activity of both water-gas shift and the steam reforming reaction over Au-ceria catalysts. Metal nanoparticles appear not to participate in either reaction.

Figure 14:
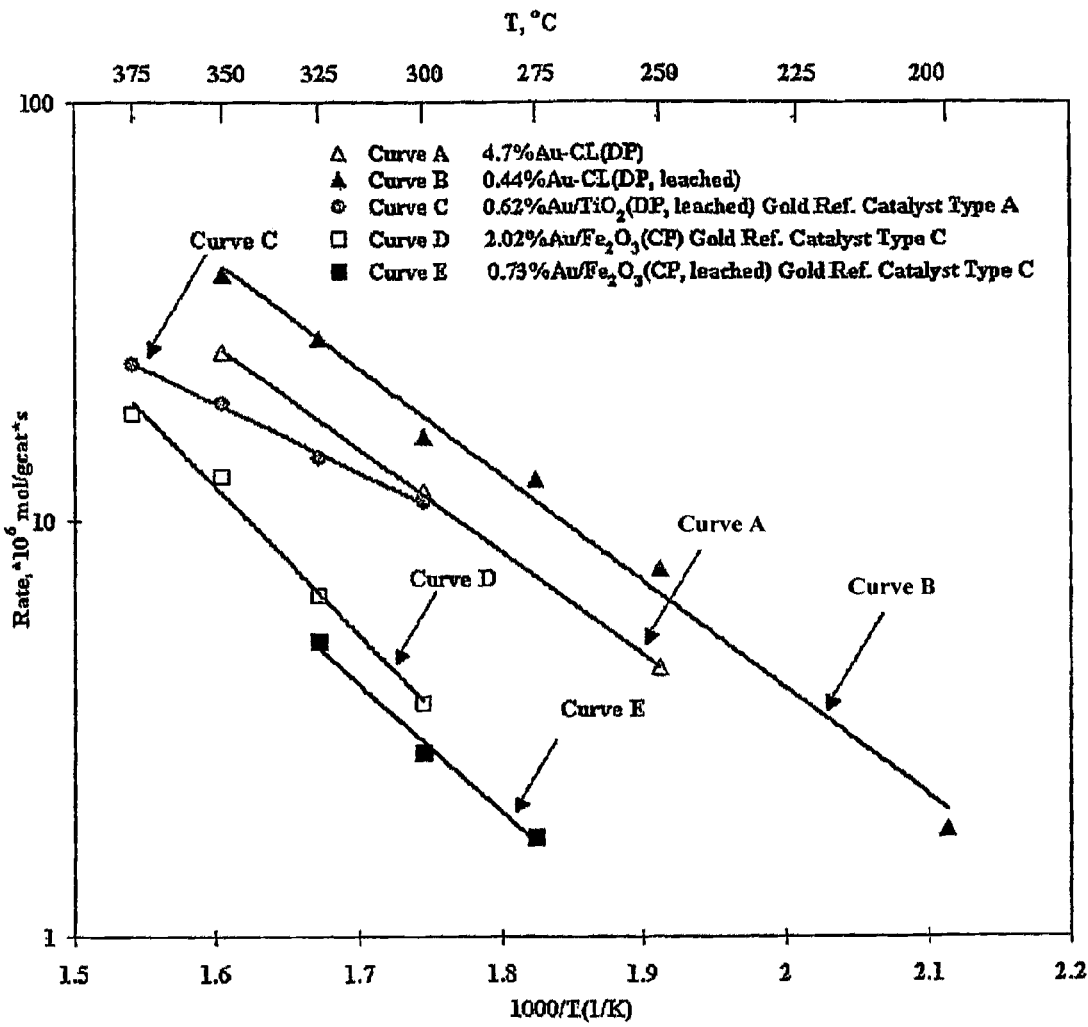
FIG. 14 is a diagram showing Arrhenius-type plots of the WGS reaction rate as measured over gold-bearing catalyst materials prepared on different oxide substrates, according to principles of the invention.

Still further results are shown in FIG. 14, in which results of tests using five gold-bearing catalyst materials are presented. Two of the curves represent results for materials described hereinabove (i.e., Curve A represents measurements on 4.7 at % Au-CL (DP) and Curve B represents measurements on 0.44 at % Au-CL (DP, leached)) and are shown for comparison. Curve C represents measurements made on a leached specimen of a commercially available material known as Gold Reference Catalyst Type A. This material is described in a Gold Reference Catalyst Data Sheet available from the World Gold Council. The material is reported to have the following properties in its commercially available form: Type A 1.5 wt % (0.62 atom %) $Au/TiO_2$ (i.e., gold on $TiO_2$ substrate), prepared by Deposition Precipitation (DP), having 1.51 wt % Au and 0.042 wt % Na (sodium) by ICP elemental analysis, having average gold particle diameter of 3.8 nm with a standard deviation of 1.50 nm as measured by TEM, and having the following catalytic activity measured in a fixed bed flow reactor: −45° C. temperature at 50% conversion for CO oxidation and 43° C. temperature at 50% conversion for $H_2$ oxidation.

In FIG. 14, Curve D represents measurements made on an unmodified specimen of a commercially available material known as Gold Reference Catalyst Type C. This material is a catalyst comprising a substrate of $Fe_2O_3$ and a deposited quantity of gold, namely 5 wt % (2.02 atom %) $Au/Fe_2O_3$. Material of this type is described in a Gold Reference Catalyst Data Sheet available from the World Gold Council. The material is reported to have the following properties in its commercially available form: Type C 5 wt % $Au/Fe_2O_3$ (i.e., gold on $Fe_2O_3$ substrate), prepared by coprecipitation (CP), having 4.48 wt % Au and 0.0190 wt % Na (sodium) by ICP elemental analysis, having average gold particle diameter of 3.7 nm with a standard deviation of 0.93 nm as measured by TEM, and having the following catalytic activity measured in a fixed bed flow reactor: −40° C. temperature at 50% conversion for CO oxidation and 44° C. temperature at 50% conversion for $H_2$ oxidation. Curve E represents measurements made on a leached specimen of Gold Reference Catalyst Type C material, in which the gold content has been reduced to 0.73 at % Au. As may be seen, while the absolute rate of reaction is lower for the gold on $Fe_2O_3$ catalyst as compared to the gold on ceria catalysts, the activation energy (represented by the slope of the curves) appears to be similar for both types of catalysts, whether leached or unleached. The apparent activation energy ($E_a$) of 0.62% $Au/TiO_2$ is much lower.

The 2.02 at % $Au/Fe_2O_3$ was leached with NaCN, using the same method as for Au-ceria. The Au concentration was reduced from 2.02 atom % to 0.73 atom %. However, the rate of the WGS reaction remained almost the same. This shows that the NaCN leaching method is also useful for other supports. It also shows that the activity of low-content Au—$Fe_2O_3$ is similar to the parent catalyst, with almost three times the gold loading.

Figure 15:
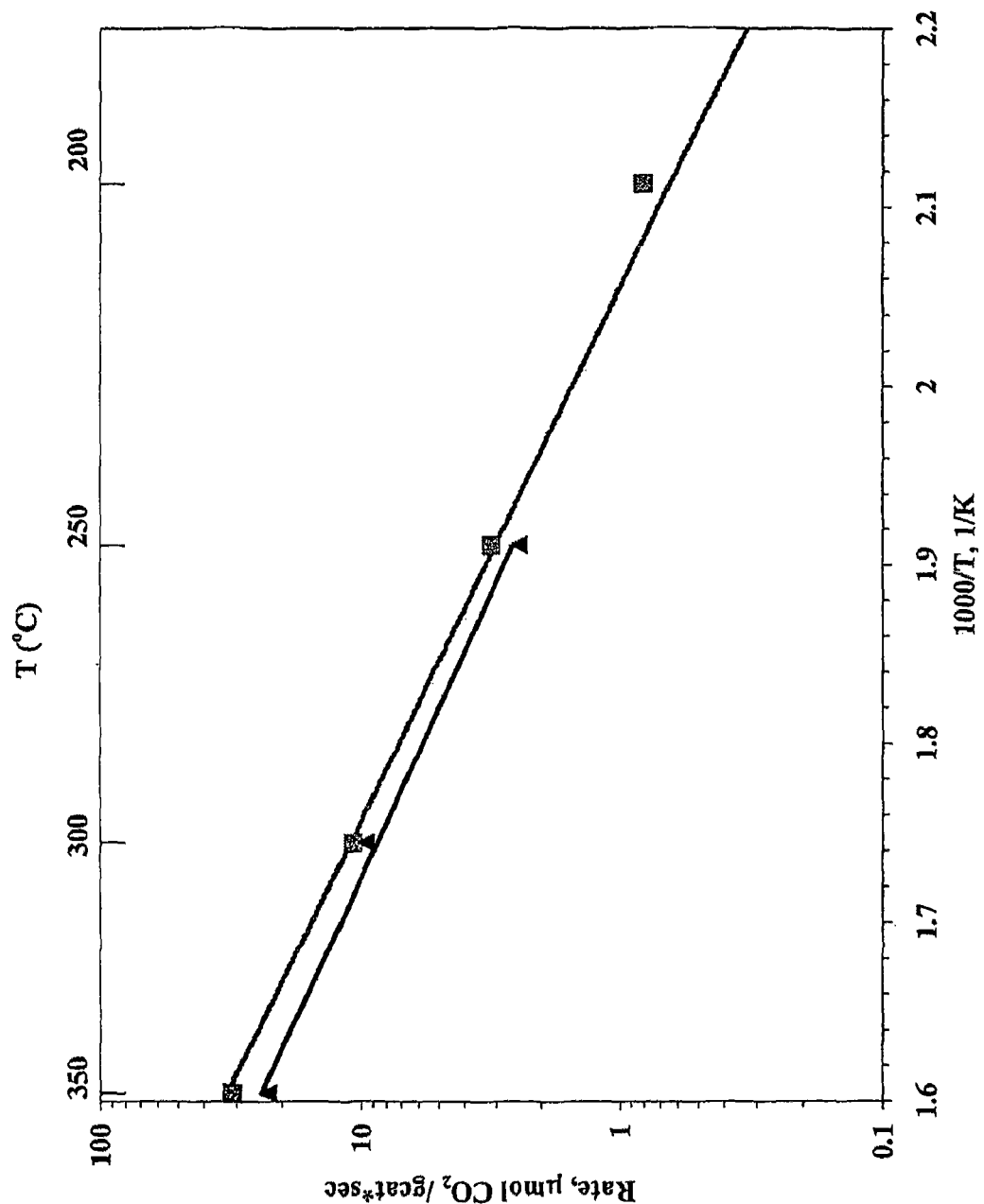
FIG. 15 is a diagram showing WGS rates of acid-leached $Cu-Ce(10La)O_x$ (UGC), measured in a reformate-type gas, according to principles of the invention.

We have also examined copper-containing catalysts, to see if the same kind of indirect preparation process produces an active catalyst. Samples of 10.62 at % Cu—Ce(10La)$O_x$ (UGC) were immersed in 7% $HNO_3$ solution for 24 hours and washed with deionized water. Unlike the NaCN leaching process, Ce and La can be found in the leachate. 6.76 at % Cu remained on the acid-leached sample. The rates of acid-leached and parent Cu-CL(IGC) are very close. The rate of the WDS reaction was measured in a reformate-type gas composed of 11% CO, 7% $CO_2$, 26% $H_2$, 26% $H_2O$, and balance He. In FIG. 15, the curve identified with squares represents results for as-produced 10.62 at % Cu—Ce(10La)$O_x$ (UGC), calcined at 400° C., and the curve identified with triangles represents results for 6.76 at % Cu—Ce(10La)$O_x$ (UGC) after leaching in 7% $HNO_3$.

The following comments appear relevant to the invention. Cyanide is possibly not the only selective solvent for the metals. In some embodiments, other oxides and other metals may show significant activity after metal is removed by other reagents. Residual nonmetallic species may be responsible for the catalytic promotion of other reactions. The technique may be useful for achieving atomic level dispersion of several metals in combination, (e.g., Pt and Au). This can lead to multifunctionality that affects selectivity and/or synergy (to boost activity). This dissolution procedure can be used as a simple screening test for catalytic activity. Residual metal after dissolution suggests activity by embedded nonmetallic species. If metal can be removed, and catalyst activity drops, the metal may be a necessary component for the reaction. This simple procedure impacts the development of rationally designed catalysts.

FIGS. 16-27 show various features of the catalytic materials of the invention, as described in greater detail below.

Catalyst Characterization

Figure 16:
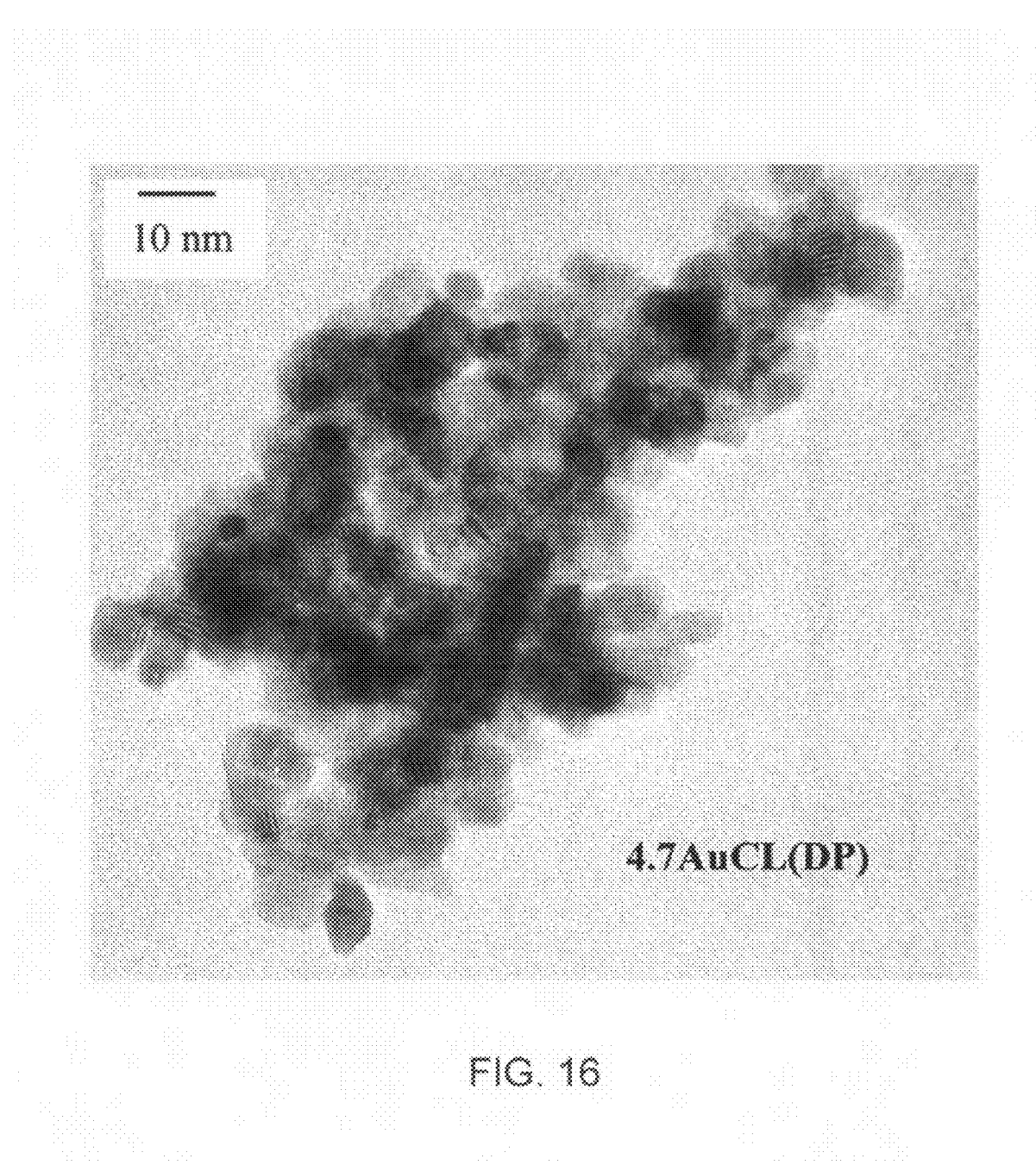
FIG. 16 is a high resolution transmission electron micrograph of 4.7 Au—CL (DP), prepared according to principles of the invention.

Au-ceria samples prepared by different techniques had a different crystal habit. These data were reported in detail in Q. Fu, A. Weber, M. Flytzani-Stephanopoulos, Catal. Lett. 77 (1-3) (2001) 87, and A. Weber, M. S. Thesis, Department of Chemical Engineering, Tufts University, Medford, Mass., 1999, the disclosure of each of which is incorporated by reference herein in its entirety. For example, in samples prepared by CP, ceria has a needle-like and layered bulk structure, while in the DP samples, ceria has a uniform spherical structure, a result of its prior synthesis by the UGC method. A uniform distribution of gold on ceria was found for the DP sample, while the CP sample contained relatively large gold particles with a lower dispersion. This difference between DP and CP methods was also found for gold deposited on several other oxides, for example as reported by M. Haruta, S. Tsubota, T. Kobayashi, J. Kageyama, M. J. Genet, B. Delmon, J. Catal. 144 (1993) 175, the disclosure of which is incorporated by reference herein in its entirety. Metallic gold was present in both DP and CP samples. From HRTEM analysis, as shown in FIG. 16, the gold particles in the DP sample have an average size of 5 nm, while the ceria particles are around 7 nm, which is in good agreement with the particle sizes measured by XRD, as shown in Table VI. See Table VI for sample identification and preparation conditions.

Figure 17:
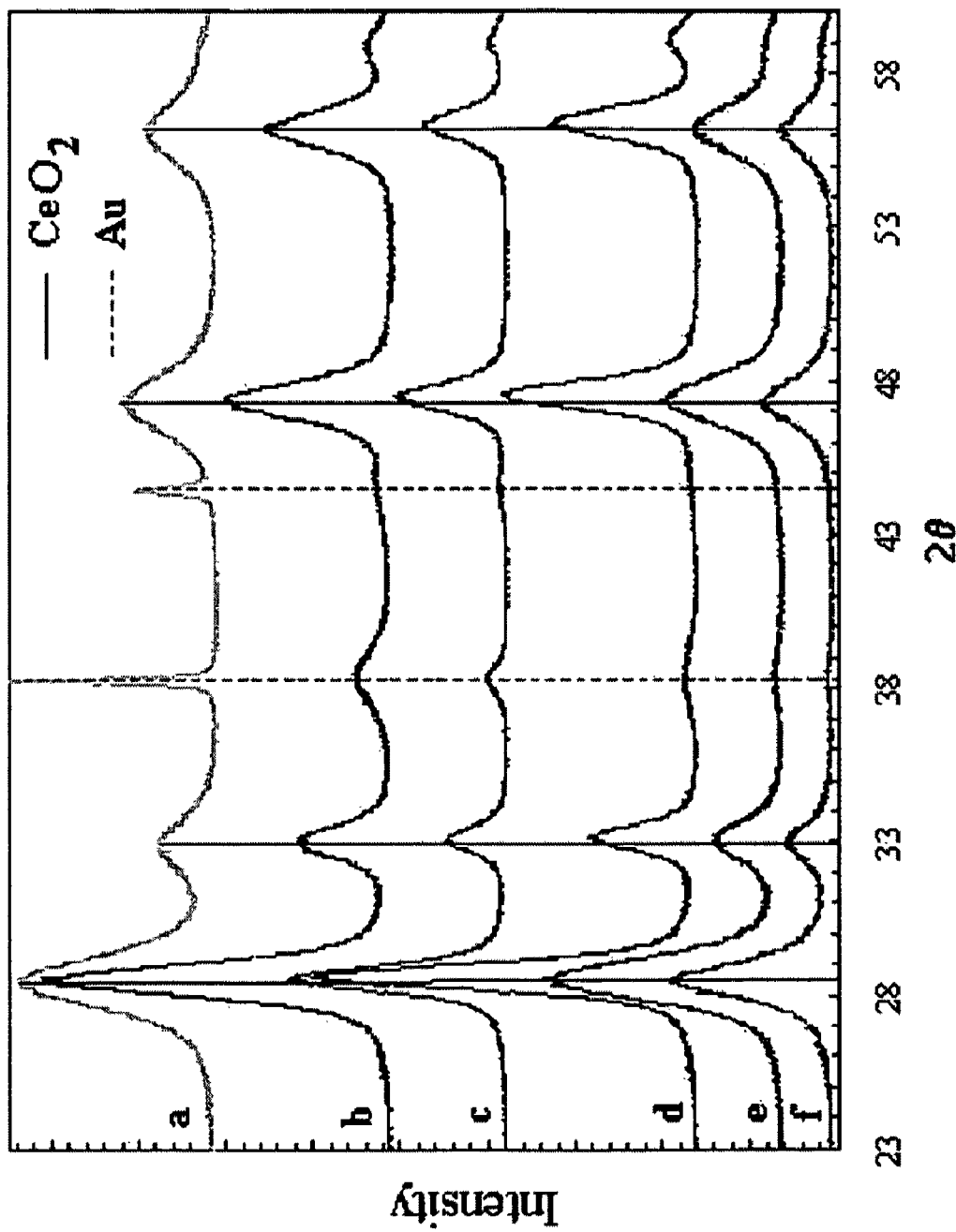
FIG. 17 is a diagram showing x-ray diffraction patterns measured for various Au-ceria samples, prepared according to principles of the invention.

XRD patterns from samples prepared by different methods are shown in FIG. 17. The samples examined include 8Au-CL (UGC) (curve a); 8.3Au-CL (DP) (curve b); 4.7Au-CL (DP) (curve c); 4.7Au-CL (DP) (curve d); 4.5Au-CL (DP) (curve e); and 3.8Au-CL (CP) (curve f). See Table VI for sample identification and preparation conditions. These show the presence of $CeO_2$ and metallic gold crystal phases, which agrees with the STEM/EDX analysis. The distinct fluorite oxide-type diffraction pattern of $CeO_2$ was observed in all samples. Lanthana forms an oxide solid solution with ceria, so there are no separate reflections from La compounds. The addition of La inhibits the crystal growth of ceria made by either the CP or the UGC methods. The average gold and ceria crystallite sizes, determined by XRD using the Scherrer equation, are listed in Table VI. With increasing calcination temperature, the particle size of ceria and gold increased and the specific surface area decreased. Since gold was deposited on the UGC precalcined ceria in the DP samples, the addition of gold should have no effect on the size and structure of ceria. This is what was found, as can be seen in Table VI by comparing the crystallite size of ceria before and after the deposition of gold. However, for the CP and UGC samples, the incorporation of gold or copper during the synthesis step may suppress the growth of ceria crystallites during calcination, as can be seen in Table VI. This effect has also been reported for $Au/Fe_2O_3$. Sze et al. proposed that Au could substitute into the $Fe_2O_3$ unit cell as ions in the +3 state as evidenced by XPS and Mossbauer spectroscopy. Haruta et al. explained that an intermetallic bond is formed between Fe and Au, as supported by the slight solubility Fe in Au and the Au—Fe distance.

In FIG. 17, a small broad peak corresponding to Au(1 1 1), situated at 2θ=38.185 degrees, and a barely visible peak corresponding to Au(2 0 0), situated at 2θ=44.393 degrees, are seen in all samples. This peak is not seen in a sample of 0.9Au-CL (DP), which has a very low gold loading (see Table VI). With increasing gold loading, the gold diffraction peak is more pronounced, but the full width at half peak maximum (FWHM) remains unchanged. Thus, the gold particle size does not increase with loading. This indicates a strong interaction between gold and ceria.

When the 4.7Au-CL (DP) sample was calcined at 650° C., the gold particle size grew to 9.2 nm (see Table VI), which is twice the size of the sample calcined at 400° C. (4.6 nm). Thus, there is a significant effect of calcination temperature on the growth of gold particles. FIG. 17 also shows reflections from sample 8Au-CL (UGC), which was prepared by UGC, as described above. The peaks corresponding to Au(1 1 1) and Au(2 0 0) are large and sharp, with a corresponding average gold particle size of 43 nm (see Table VI). The ceria particle size, however, was very small (4.5 nm), even smaller than that of CL made by the same gelation method at 400° C.

The nature of the active gold site is unclear. Haruta and co-workers have suggested that the active species are small metallic gold particles, and that atoms of the metal particle at the interface with the support are important active sites. In single-crystal studies, Valden et al. found that catalytic activity for the CO oxidation reaction is maximized with gold nanoparticles of ~3.2 nm size. Other groups have suggested that both metallic gold and oxidized gold species are responsible for the catalytic oxidation of CO. Kang and Wan proposed that the most active sites are made of gold hydroxide surrounded by iron oxide. Moreover, Park and Lee suggested that the suppression of the transition from oxidized gold to the less active metallic gold by water is the reason for the substantially higher rates of CO oxidation in wet conditions than in dry conditions, which was also reported by Haruta et al. and by Boccuzzi and Chiorino. While all of these proposed theories are scientifically interesting, no one prior to the present has made catalytic materials lacking metallic particulates according t principles of the invention, nor has the catalytic activity of such materials been demonstrated heretofore.

Figure 18A:
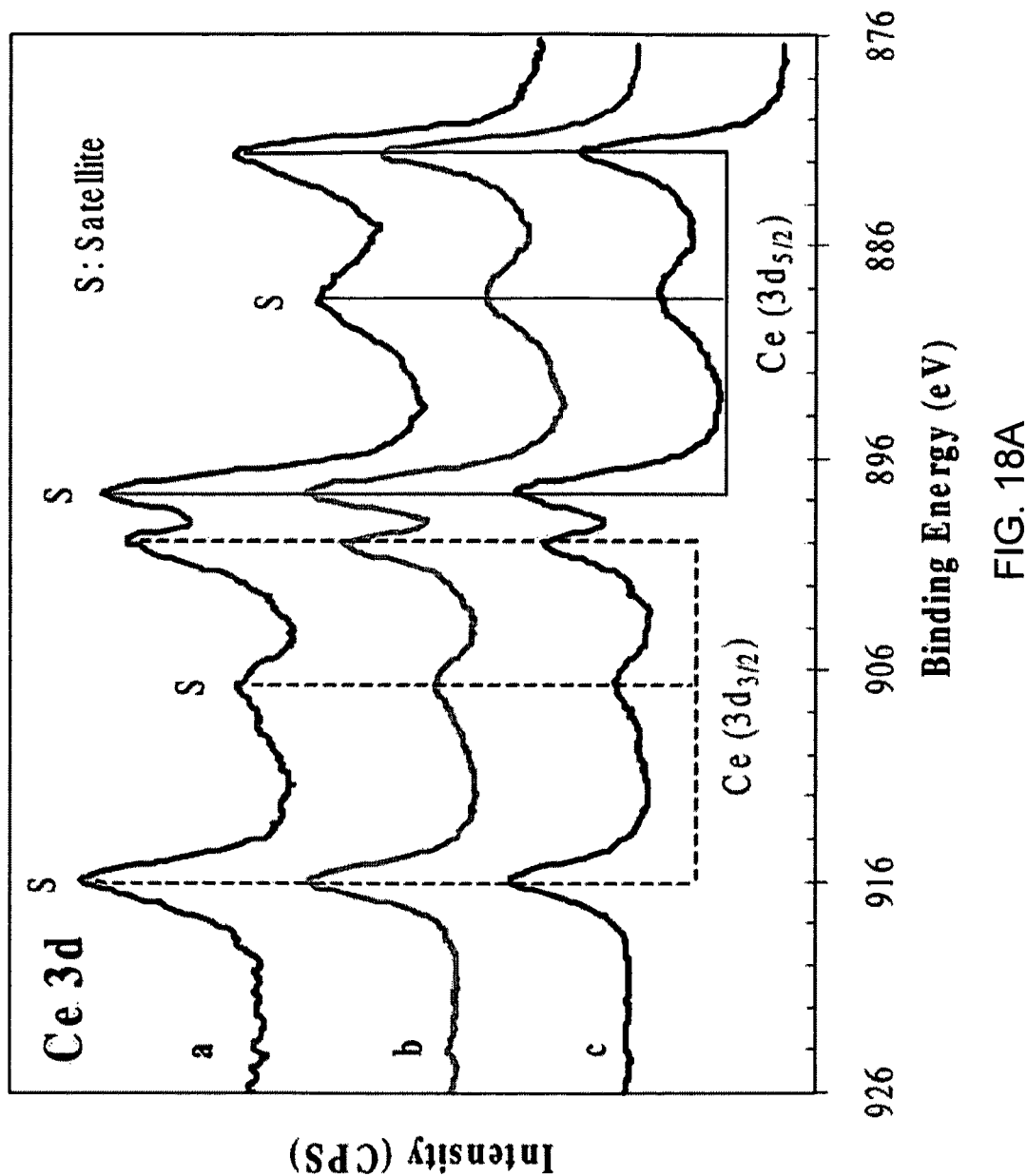
FIG. 18A is a diagram showing binding energies of Ce(3d) electrons for various Au-ceria samples, according to principles of the invention.
Figure 18B:
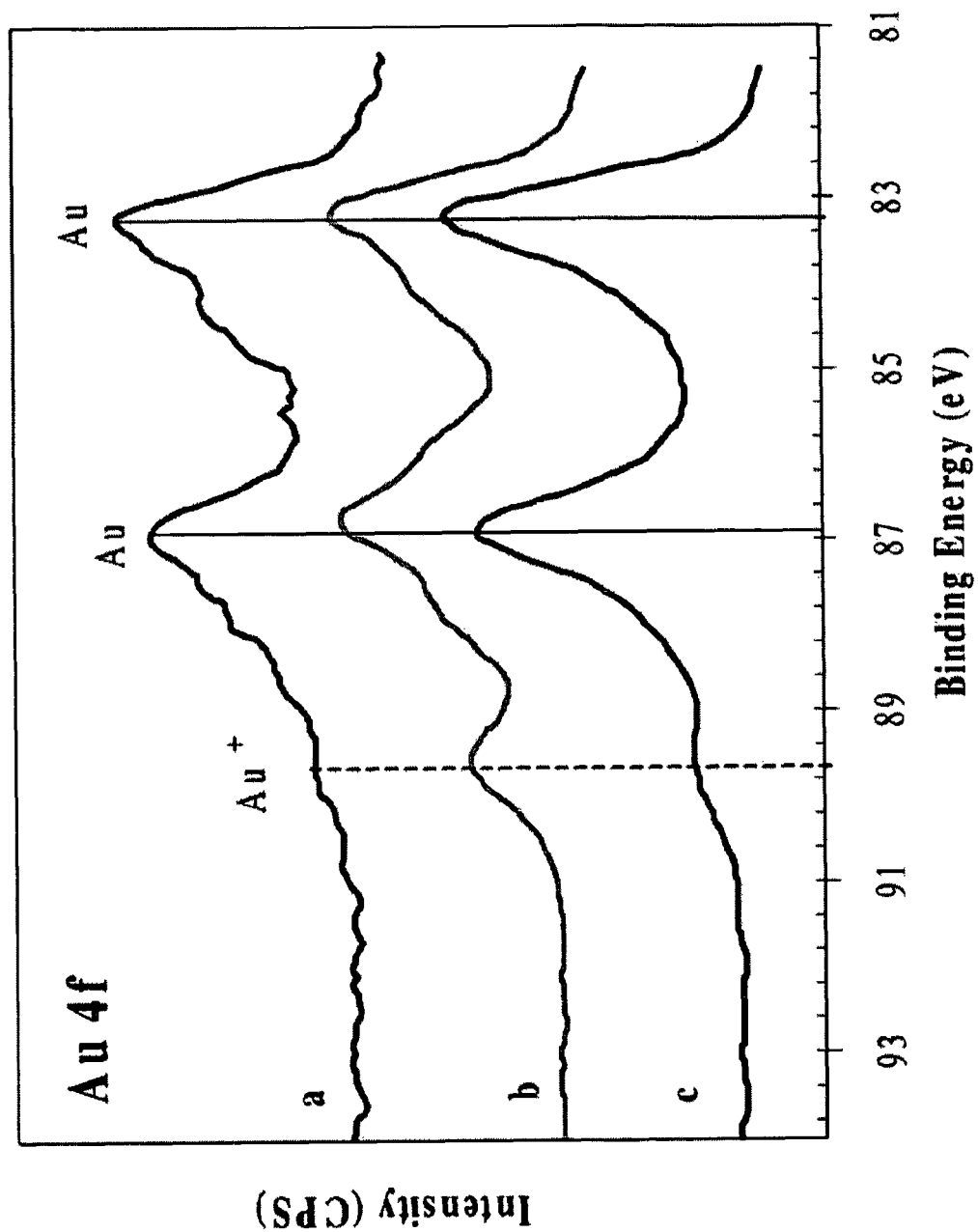
FIG. 18B is a diagram showing binding energies of Au(4f) electrons for various Au-ceria samples, according to principles of the invention.

XPS was used to investigate the metal oxidation state of selected catalysts of this invention. The Au 4f and Ce 3d XP spectra of 4.5Au-CL (DP) (curve a), 8Au-CL (UGC) (curve b), and 3.8Au-CL (CP) (curve c) are shown in FIGS. 18A and 18B, respectively. Since the C is peak from adventitious hydrocarbon present on the samples was found all measurements, it was used as internal standard for the charge correction. Therefore, all the binding energies were adjusted to the C is peak of carbon at 284.6 eV. Ce 3d spectra are similar to the standard $CeO_2$ spectra, showing well resolved $Ce^{4+}$ lines. The gold species identified by the corresponding binding energy are shown in FIG. 18B. We found that while most of gold is metallic after the 400° C. air calcination step, part of gold remains ionic in these catalysts. The samples made by UGC and CP have the most oxidic gold. This might suggest that the gelation or CP method can achieve a stronger metal-support interaction to stabilize gold ions. The catalyst color is indicative of the proportion of metallic gold. The more metallic gold, the darker the catalyst.

Figure 19A:
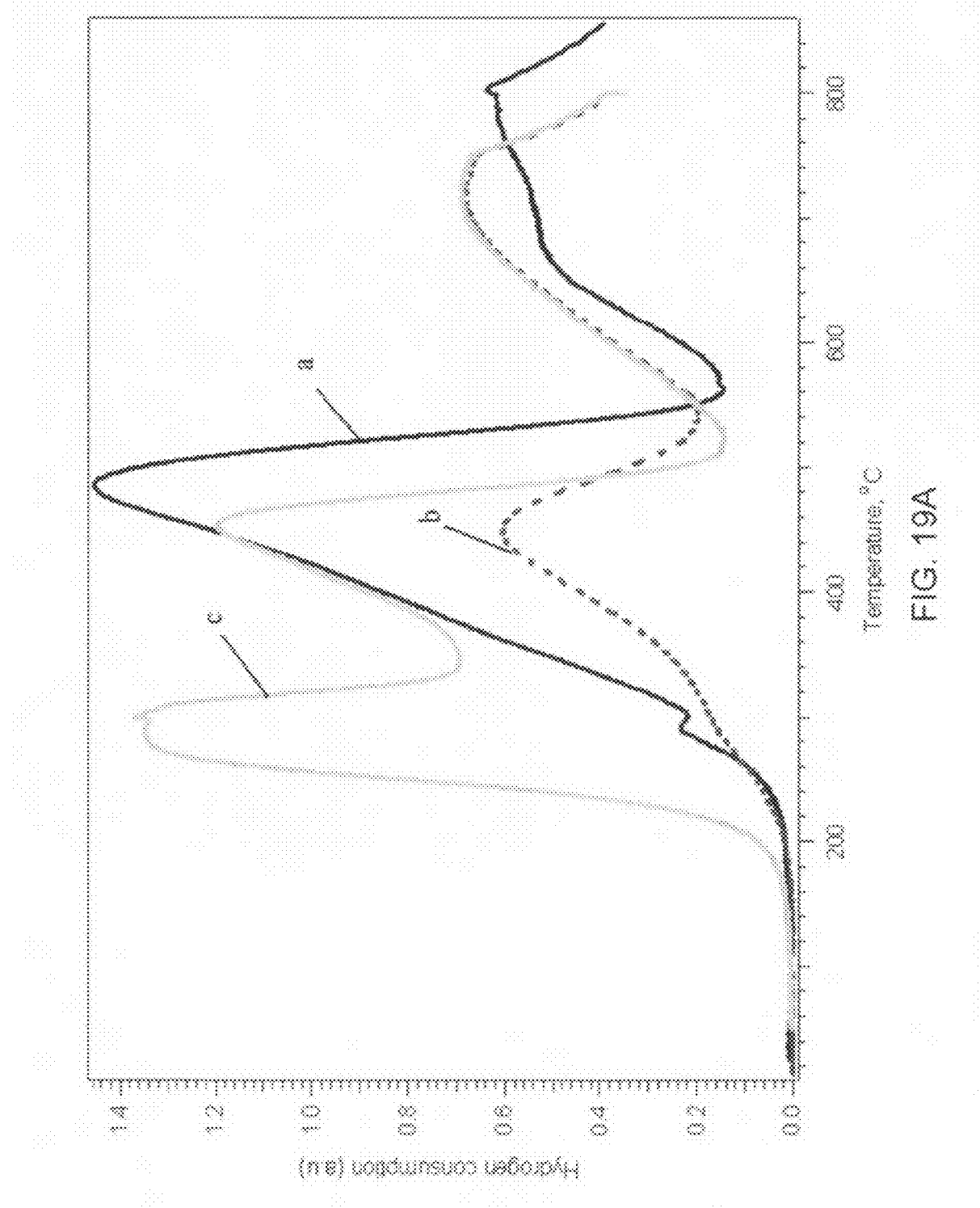
FIG. 19A is a diagram showing hydrogen consumption vs. temperature for ceria-based samples, as measured by $H_2$-TPR profiles, according to principles of the invention.
Figure 19B:
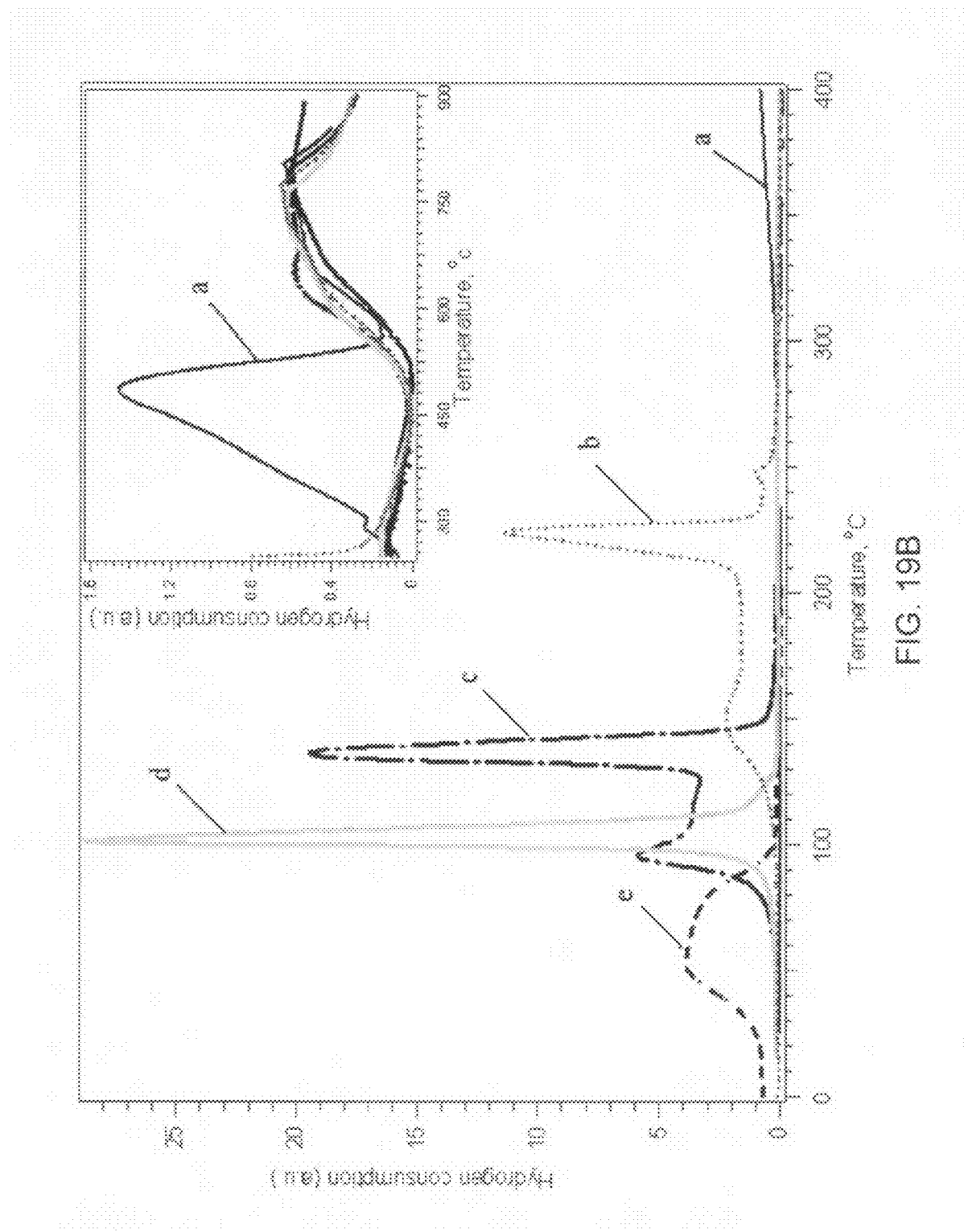
FIG. 19B. is a diagram showing hydrogen consumption vs. temperature for various ceria-based samples, including samples containing Au and Cu, as measured by $H_2$-TPR profiles, according to principles of the invention.

$H_2$-TPR and OSC Measurements $H_2$-TPR using 20% $H_2/N_2$, 50 $cm^3$/min (NTP), with a temperature rate of change of 5° C./min was performed on several CL (UGC or CP), Cu-CL and Au-CL (DP or CP) samples. FIG. 19A shows the hydrogen consumption by some of these materials, including CL (UGC) calcined at 400° C. (curve a), CL (UGC) calcined at 650° C. (curve b), and CL (CP) calcined at 400° C. (curve c). FIG. 19B shows the hydrogen consumption for CL (UGC) (curve a), 5Cu-CL (UGC) (curve b), 10Cu-CL (UGC) (curve c), 8Au-CL (UGC) (curve d), and 4.5Au-CL (DP) (curve e), in which all materials were calcined at 400° C., 10 h. The reduction peak temperature and corresponding hydrogen consumption are listed in Table VII. The key finding from this analysis is that the surface oxygen of ceria is substantially weakened by the presence of gold and copper nanoparticles, its reduction temperature lowered by several hundred degrees. Exactly how much weaker this oxygen becomes depends strongly on the preparation method, type of metal, metal loading, and calcination temperature.

The onset and amount of oxygen reduction for the CL samples depends on the preparation method, as shown in FIG. 19A. CL (UGC) calcined at 400° C., began to reduce at 350° C. with a peak at 487° C., which is assigned to the surface capping oxygen of $CeO_2$. CL (UGC) calcined at 650° C. has the same reduction profile, but a much smaller peak area, attributed to the lower surface area of this sample. Chiang et al. reported that high surface area ceria has a lower reduction enthalpy than that measured for the bulk material. Trovarelli and co-workers have reported that reduction of ceria strongly depends on the ceria crystallite size. CL (CP) calcined at 400° C. shows two reduction peaks for surface oxygen, one at 310° C. and a second at 497° C. The latter is at the same position as for CL made by UGC. The first peak maybe due to the interaction of lanthanum with ceria as reported by Groppi et al. for the ternary $CeO_x/LaO_x/Al_2O_3$ material. This is also supported by the absence of a first reduction peak at 310° C. in the TPR profile (not shown) of undoped ceria made by precipitation with ammonium carbonate (see Table VII). The total hydrogen consumption is larger for the CP sample than for CL made by UGC, which might be due to the different structures formed during preparation by the CP and UGC techniques.

Regardless of the type of ceria or addition of metal, a peak at 700° C. corresponding to reduction of bulk oxygen of $CeO_2$, remains unchanged for all samples. This is similar to the case of Pt metals-on-ceria or on ceria-zirconia oxide solid solutions. Other transition metals and metal oxides on ceria have a similar effect. In previous work, we found a clear reducibility enhancement of ceria by copper in the Cu-ceria system. In this work, we have compared the reducibility of ceria induced by either the presence of gold or copper, as shown in FIG. 19B and Table VII. The reducibility is expressed by the value of "x" in $CeO_x$ in Table VII. It should be noted that for the Cu-containing samples, the amount of hydrogen consumed is for reduction of both $Cu_xO$ and ceria. The 10Cu-CL sample is much more reducible than the 5Cu-CL material. The effect of gold on ceria reducibility is stronger than that of $Cu_xO$. The peaks corresponding to the reduction of surface capping oxygen of ceria in the Au-ceria samples became much sharper and shifted to lower temperatures. The DP sample started to reduce around RT with a peak at 59° C. Reduction on the UGC sample began at 80° C. with a peak at 110° C. The peak area of the former was similar to the peak area of the corresponding Au-free ceria sample, as seen in Table VII. This suggests that most gold is in metallic state in this DP sample. Little additional oxygen is associated with the metallic nanoparticles of gold. However, the $H_2$ consumption by the UGC sample was much higher than for the corresponding CL material, indicating the presence of oxidic gold. This sample comprises large gold nanoparticles, having negligible surface area for adsorption of oxygen. Hence, oxidic gold is present, in agreement also with the XPS results.

$H_2$-TPR has been used in the literature to identify potentially higher oxidation states of gold on supports. Kang and Wan reported that Au/Y-zeolite possessed two reduction peaks (at 125 and 525° C.) and one shoulder peak (at 190° C.). They attributed the first peak to oxygen adsorbed on the surface of metallic gold and the second to reduction of Au(III) located in sodalite cages. Neri et al. reported two separated peaks (125 and 175° C.) for "as-prepared" $Au/Fe_2O_3$ without calcination. However, after oxidation at 300° C., only one peak (165° C.) was observed. It was surmised that the first peak belongs to the reduction of Au oxide or hydroxide, which decomposes in calcination above 300° C.

Figure 20:
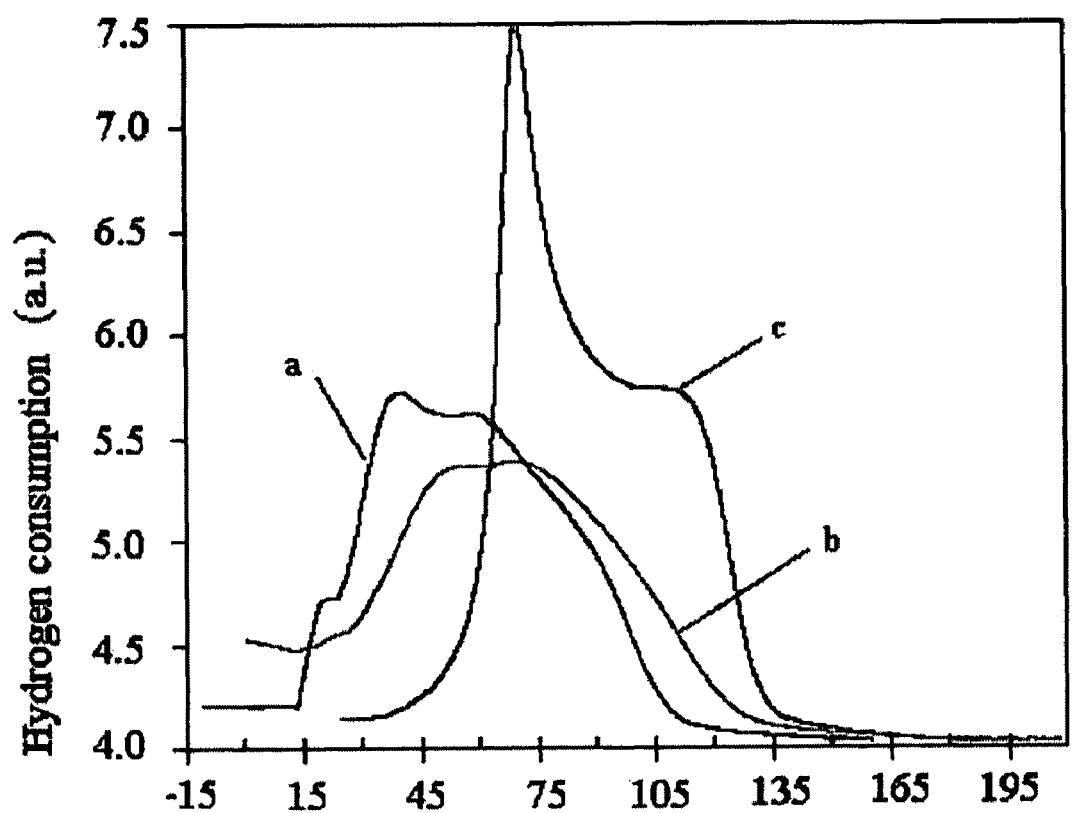
FIG. 20 is a diagram showing hydrogen consumption vs. temperature for various Au-ceria samples, as measured by $H_2$-TPR profiles, according to principles of the invention.

FIG. 20 shows $H_2$-TPR profiles obtained using 20% $H_2/N_2$, 50 cm$^3$/min (NTP), with a temperature rate of change of 5° C./min of Au-ceria catalysts prepared by DP. The samples include 8.3Au-CL (DP) (Curve a), 4.7Au-CL (DP) (Curve b), and 0.9Au-CL (DP) (Curve c). See Table VI for sample identification and preparation conditions.

In FIG. 20 we note that all the profiles show more than one peak; contribution from oxidic gold reduction is possible, although it is masked by the much higher amount of ceria-oxygen. Based on the total hydrogen consumption, only the 0.9Au-CL (DP) (footnote 'b' in Table VII), the 3.8Au-CL (CP) and the 8Au-CL (UGC) samples (Table VII) appear to have an appreciable amount of oxidic gold, if we attribute the excess hydrogen consumption to oxidic gold reduction.

FIG. 20 clearly shows that gold facilitates the reduction of ceria surface oxygen species. With increasing gold loading, the reduction temperature shifted to lower temperatures for the DP samples. For instance, the 8.3Au-CL (DP) sample has two reduction peaks with peak temperatures at 40 and 59° C., while 0.9Au-CL (DP) has two reduction peaks with peak temperatures at 69 and 109° C. The 4.5 and 8.3Au-CL (DP) samples have similar total peak areas, as shown in FIG. 20 and Table VII. However, the 0.9Au-CL (DP) sample shows higher hydrogen consumption, potentially due to oxidic gold presence in this sample, as mentioned above. In general, addition of gold by the DP method drastically increases the oxygen reducibility of ceria.

Since the TPR technique is not as sensitive to surface oxygen titration, the effect of gold loading on the surface oxygen reducibility can be better followed by a step pulse titration technique effect. The use of CO at a constant temperature, to measure the oxygen availability is known in the literature as the "oxygen storage capacity." The procedure involves creating a step change in the gaseous environment and under steady-state conditions monitoring the $CO_2$ produced.

In general, "oxygen storage" results from the change in oxidation state associated with the reversible removal and addition of oxygen:

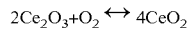

There are several techniques reported for measurements of OSC. Yao and Yu Yao defined OSC as the value of $O_2$ uptake in each step pulse injection following a CO step pulse at equilibrium under the particular set of reaction conditions used. The total oxygen uptake for a series of $O_2$ step pulses following a series of CO injections until a constant breakthrough 95-98% was reached, was the measure of the cumulative oxygen storage capacity (OSCC). In other work, OSC was measured as the $CO_2$ formed during a CO step pulse after oxidation in $O_2$. Sharma et al. recently defined the OSC as the sum of $CO_2$ formed during a CO step pulse and an $O_2$ step pulse after the CO step pulse.

OSC measurements involve a dynamic reaction process. Therefore, OSC is influenced by several operating parameters: pretreatment temperature, temperature during the pulsing experiment, the concentration of gaseous reactant, and the presence of precious metals.

The presence of a precious metal facilitates both the restoration of the surface oxygen anions and their removal by CO at lower temperatures. Increasing the surface area was found to enhance the OSC of ceria-based catalysts. Moreover, decreasing the $CeO_2$ crystallite size leads to greater metal-ceria interaction as shown by both TPR and OSC measurements of the Pt metal-loaded ceria.

Figure 21A:
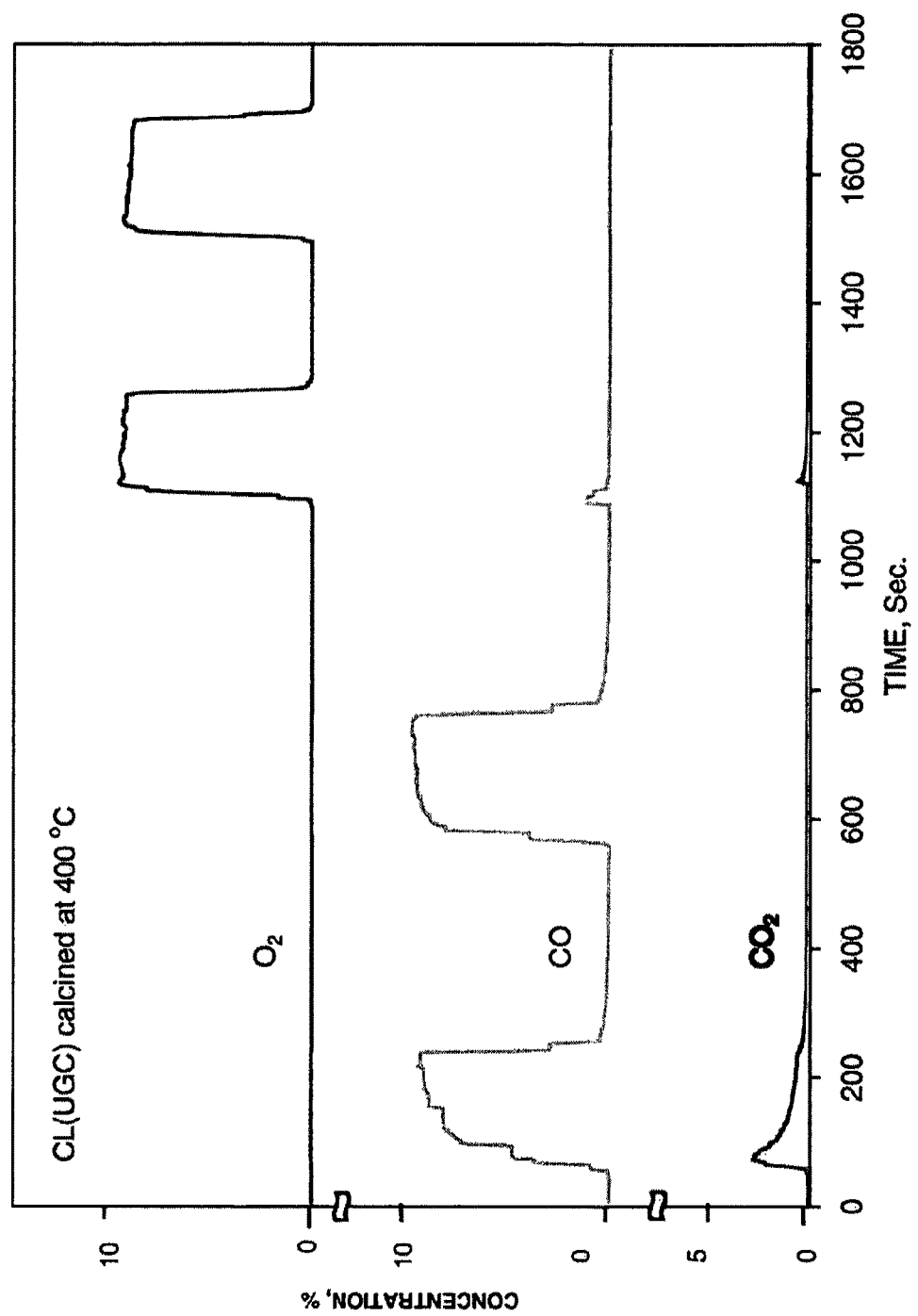
FIG. 21A is a diagram of oxygen storage capacity of gold-free ceria-based material as measured by a step pulse measurement technique, according to principles of the invention.
Figure 21B:
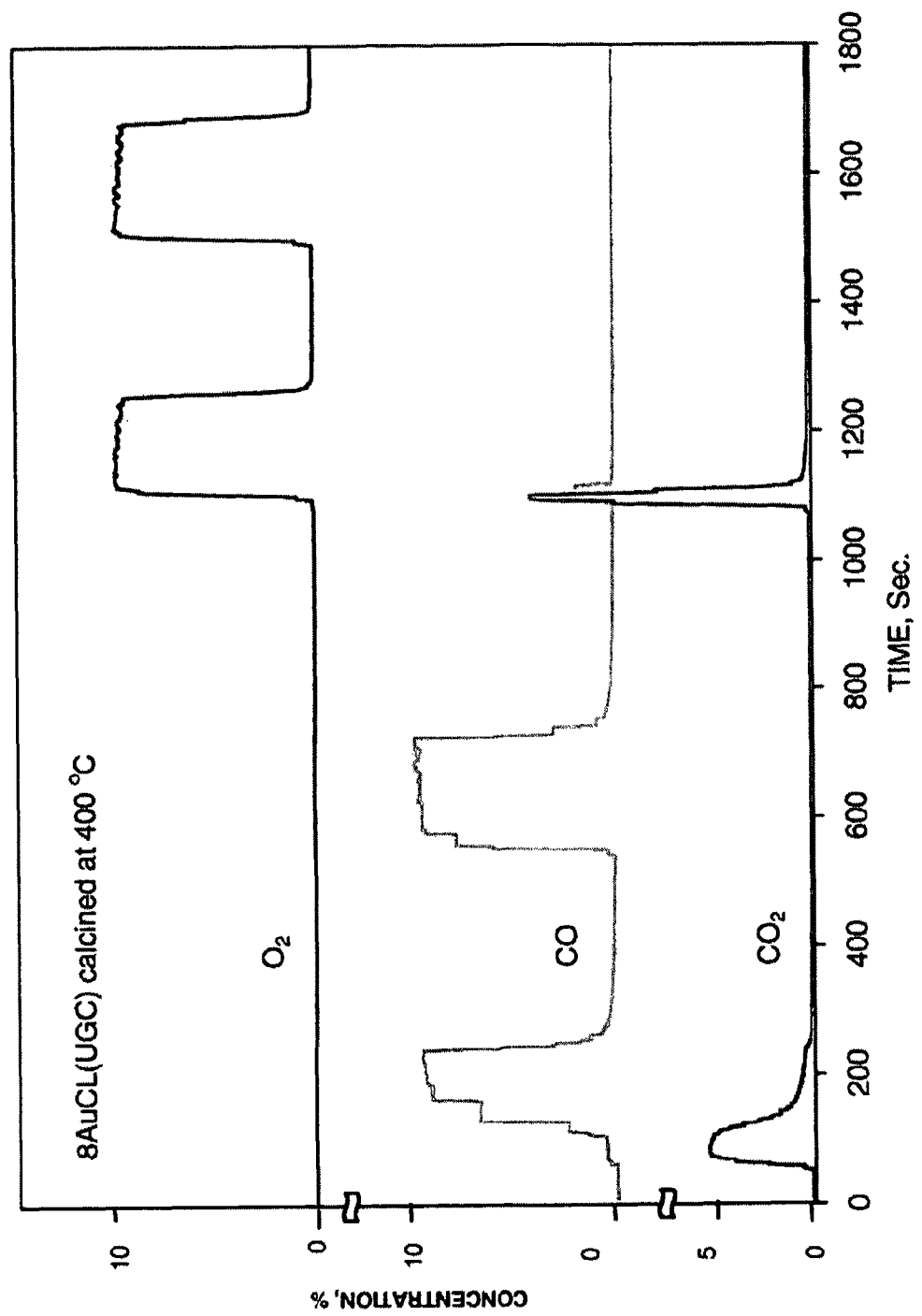
FIG. 21B is a diagram of oxygen storage capacity of gold-bearing ceria-based catalyst material as measured by a step pulse measurement technique, according to principles of the invention.

The effect of the presence of gold and copper on the OSC of ceria was examined. Results from step pulse measurements at 350° C. with 10% CO/He and 10% $O_2$/He at 50 cm$^3$/min flow rate are shown in FIG. 21A for CL (UGC) and in FIG. 21B for 8Au-CL (UGC) calcined at 400° C. The data have been corrected by subtraction of background signals. The preoxidized CL sample was exposed to two-step pulses of CO followed by two-step pulses of $O_2$. For the first CO step, a significant amount of $CO_2$, 284.4 μmol/$g_{cat}$ was formed. Over the Au-ceria sample, a much higher amount of $CO_2$ was measured during the first CO step (FIG. 21B). Negligible $CO_2$ was produced during the second step pulse of CO on either sample.

It is noted that three minutes in CO under these conditions are not enough to remove all available oxygen from ceria. The kinetics of the process at 350° C. is very slow. The $CO_2$ produced consists of a sharply rising edge due to rapid reaction of CO with the surface oxygen, followed by a plateau and a long decreasing edge, which is attributed to reaction of CO with the bulk oxygen of ceria whose availability is limited by diffusion. It should be noted that the straw color of stoichiometric ceria immediately changed into the dark blue-gray color of reduced cerium oxide upon exposure to CO. In the oxygen step pulse, over the reduced Au-ceria sample, a very sharp $CO_2$ spike of 348.5 μmol/$g_{cat}$ was observed (FIG. 21B). The small peak of CO seen during the $O_2$ step pulse is part of the fragmentation pattern of $CO_2$ in the mass spectrometer. The same observation was made by Sharma et al. in their OSC measurements of Pd-ceria. In that paper, the authors proposed that this $CO_2$ spike is due to desorption of $CO_2$ adsorbed during the initial CO step on $Ce^{3+}$ sites. This $CO_2$ is then displaced when ceria is reoxidized during the $O_2$ pulse. On the basis of this interpretation, the total amount of $CO_2$ formed in the CO step is the sum of the $CO_2$ formed in both events. However, other interpretations, such as the oxidation of carbon deposited from CO disproportionation, have also appeared in the literature.

Figure 22A:
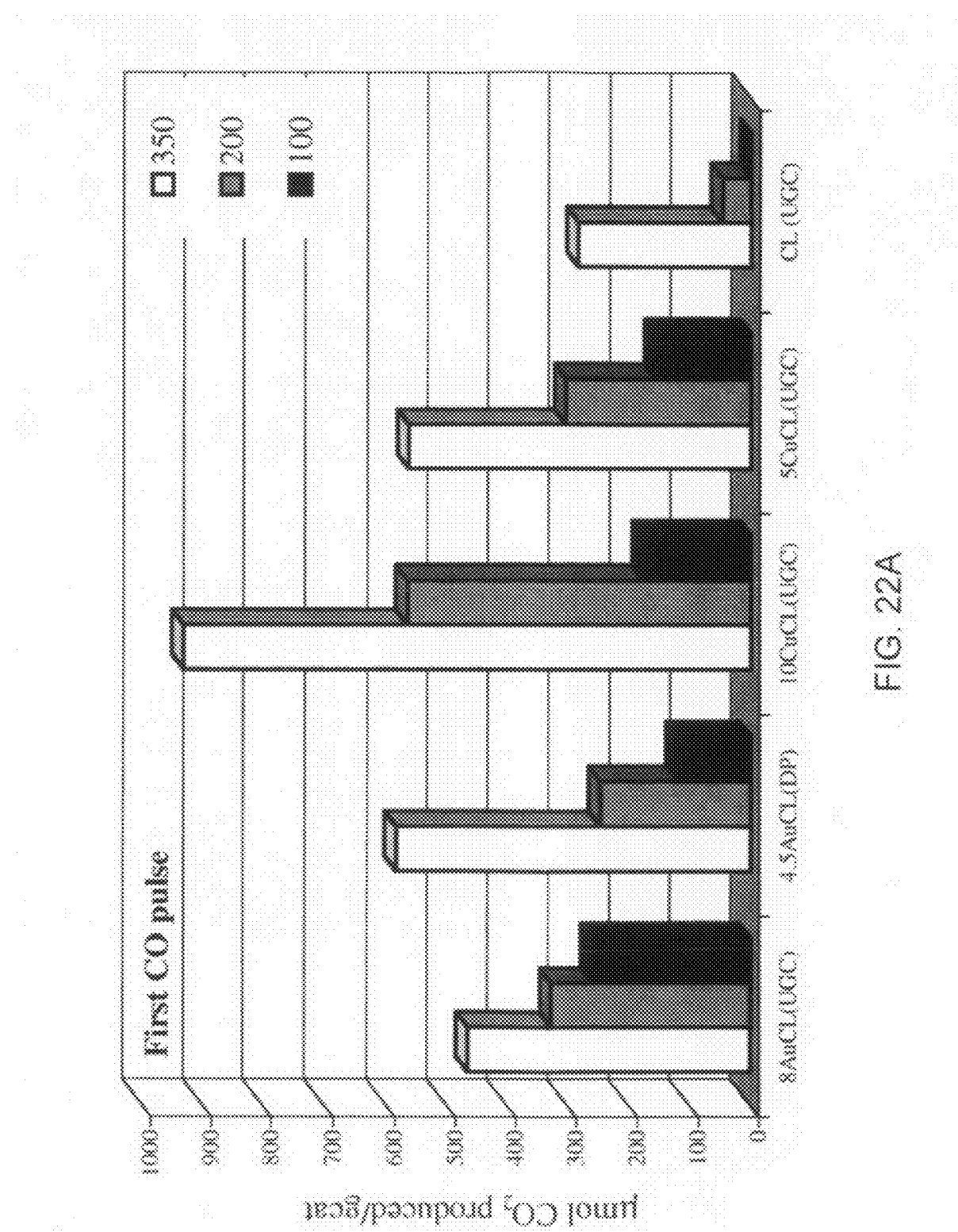
FIGS. 22A-22B are diagrams of histograms showing results of measurements of oxygen storage capacity of gold-bearing ceria-based catalyst material at three different temperatures by a step pulse measurement technique, according to principles of the invention.

FIG. 22A shows the $CO_2$ production measured at three different temperatures, i.e., 100, 200 and 350° C. during the first CO step for 8Au-CL (UGC), 5Cu-CL (UGC), 10Cu-CL (UGC), 4.5Au-CL (DP), and CL (UGC) samples. These samples were selected because they have similar surface areas (see Table VI). At 100° C., the OSC of 8Au-CL (UGC) is 259.6 μmol/$g_{cat}$, while that of CL and pure ceria is zero. At 200° C., the OSC of 8Au-CL (UGC) is to 327.6 μmol/gcat, while that of CL is 48.4 μmol/$g_{cat}$. Similarly, the OSC of the other catalysts is higher compared to that of CL at all three temperatures. As also found by $H_2$-TPR, the OSC measurements below 350° C. provide evidence that the surface oxygen of ceria is greatly weakened by the addition of gold and copper. The present data demonstrate the importance of the kinetics of oxygen incorporation and removal in the composite ceria structure.

Figure 22B:
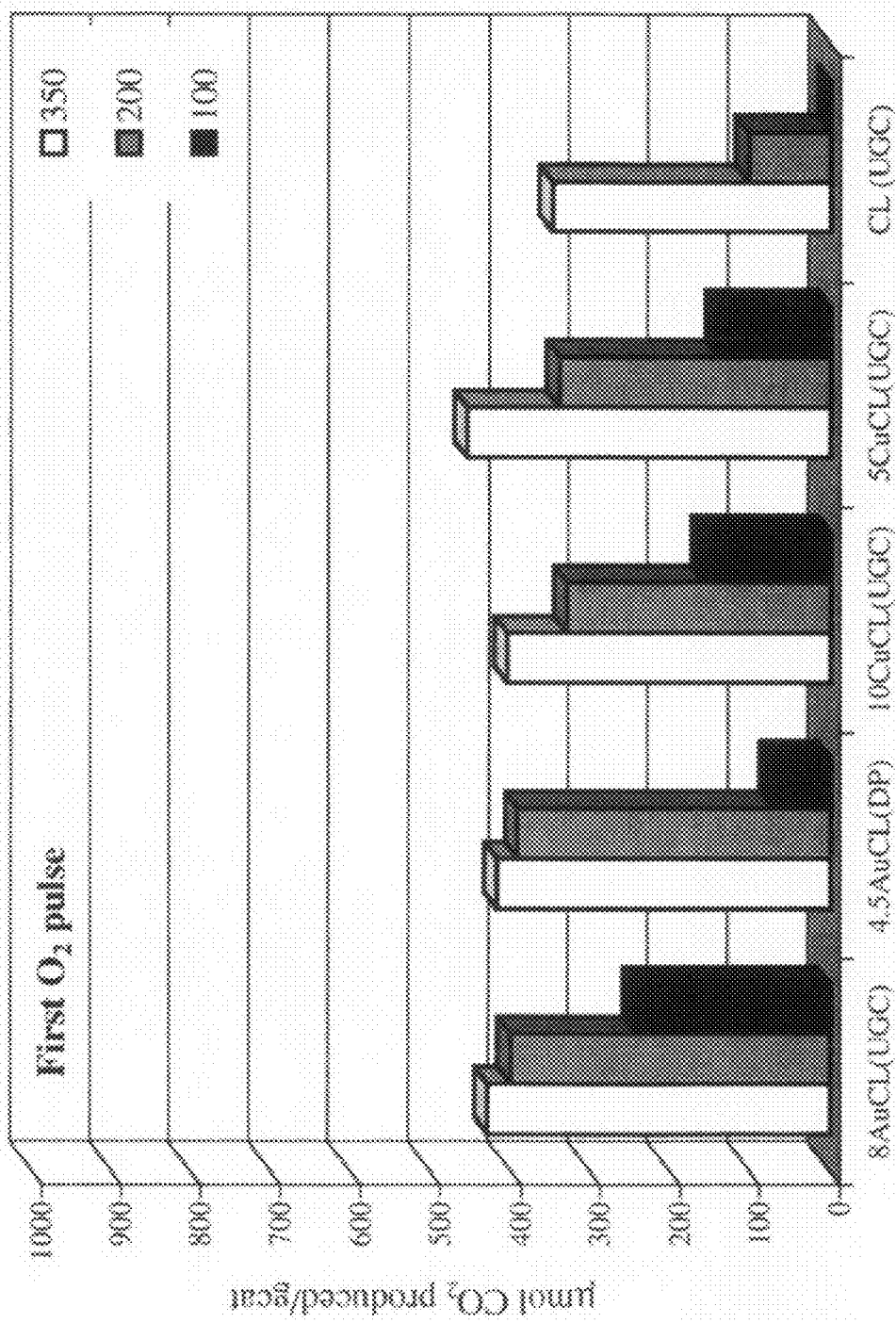

The $CO_2$ production during the first $O_2$ step is shown in FIG. 22B. All samples display this, including the metal-free ceria. The amount of $CO_2$ eluted at 350° C. is similar for all samples. At lower temperatures, however, the Au-ceria samples show the highest amount of $CO_2$. This may be viewed as a consequence of their more reduced state achieved during the preceding CO step.

Figure 23:
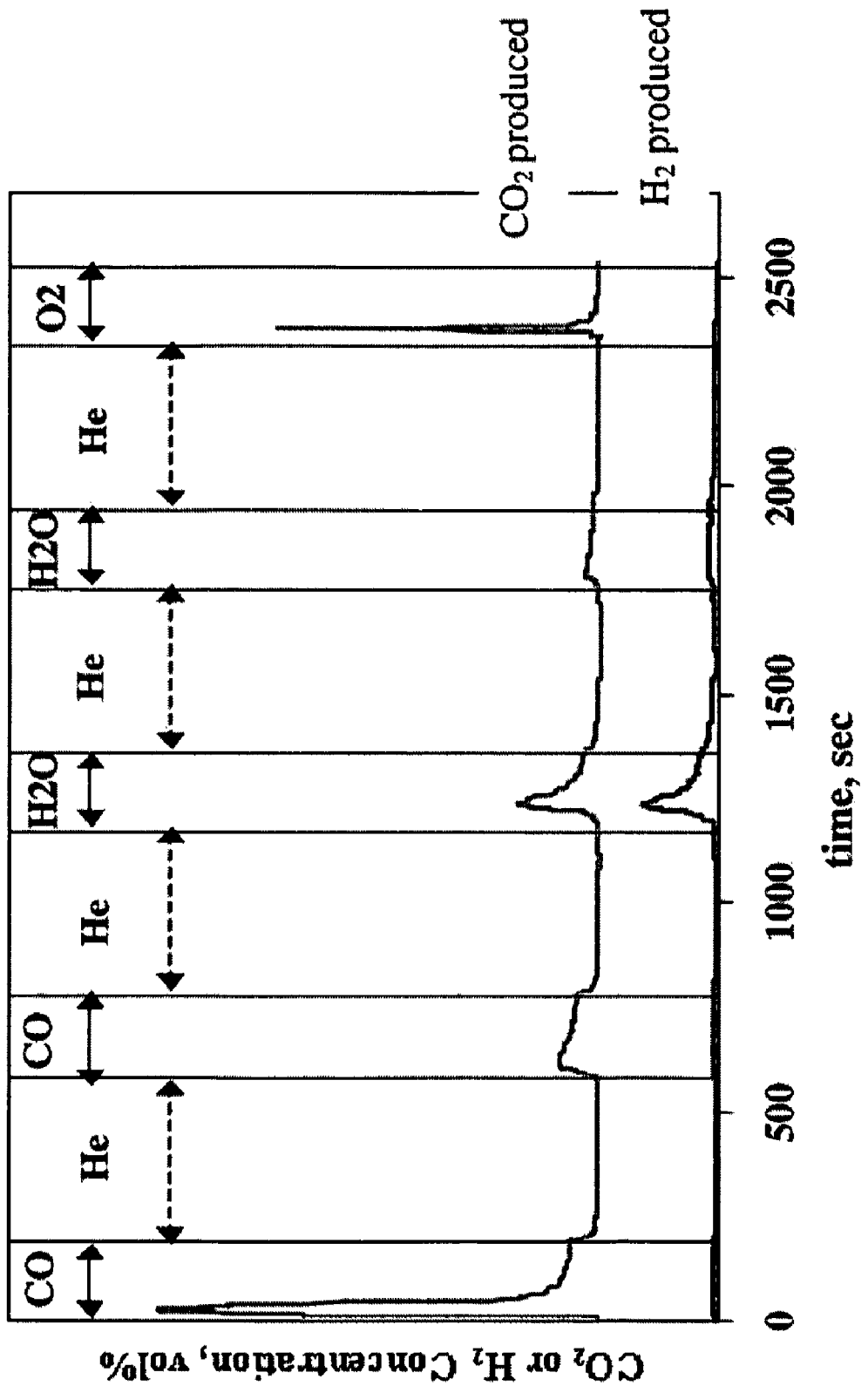
FIG. 23 is a diagram depicting the oxidation of reduced ceria by water, using a series of pulses comprising 10% CO/He in first and second steps, 3% $H_2O$/He in third and fourth steps, and 10% $O_2$/He in a fifth step, according to principles of the invention.

The oxidation of reduced ceria by water was examined at 350° C. on 4.5Au-CL (DP) as shown in FIG. 23. The conditions used in the measurements shown in FIG. 23 were 10% CO/He in first and second steps, 3% $H_2O$/He in third and fourth steps, and 10% $O_2$/He in a fifth step, flowing at 50 cm$^3$/min (NTP). An amount of 180.9 µmol/$g_{cat}$ $CO_2$ was produced during the first $H_2O$ step. This was accompanied by a similar amount of $H_2$ (180.3 µmol/$g_{cat}$). Thus, $H_2O$ is dissociated in the process. However, carbon-containing species cannot be fully removed by $H_2O$. Additional $CO_2$ (114.8 µmol/$g_{cat}$) is eluted in the subsequent $O_2$ step (FIG. 23). This finding may be used to explain why carbon-containing species were detected by FT-IR during in situ water-gas shift.

Figure 24:
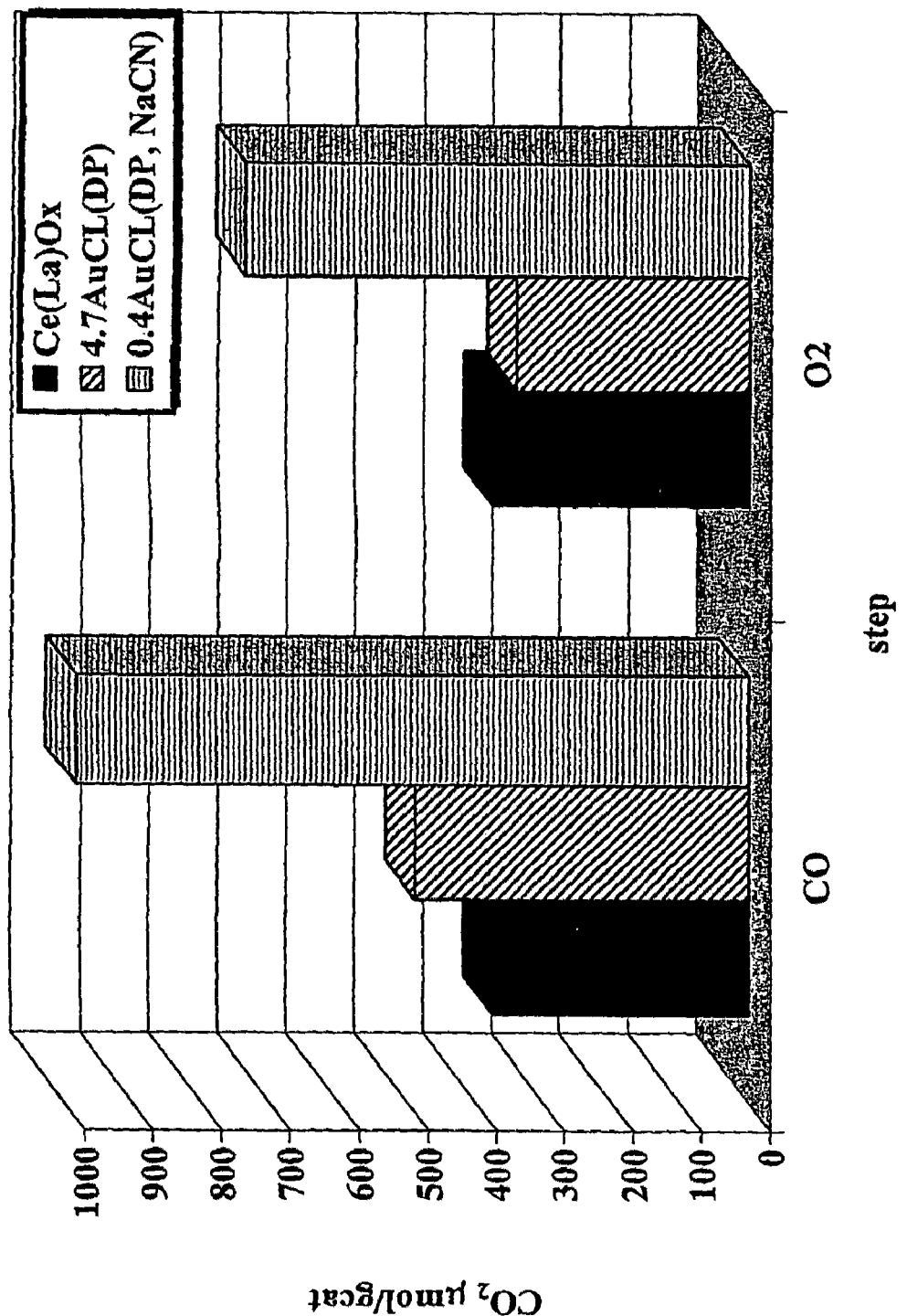
FIG. 24 is a diagram showing the oxygen storage capacity of as produced and of leached ceria based materials, calcined at 400° C., according to principles of the invention.

FIG. 24 is a diagram showing the oxygen storage capacity of as produced and of leached ceria based materials, calcined at 400° C. The materials were produced from ceria substrate material that was calcined at 400° C., gold was deposited, and the catalyst calcined at 400° C. for 10 hours. As indicated in FIG. 24, OSC measurements of leached Au-ceria samples identified a higher OSC in the leached material. The measurements were performed at 300° C. using 10% CO/He and 10% $O_2$/He, 50 cm$^3$/min (NTP). The leached sample exhibits greater $CO_2$ production during both CO and $O_2$ step, as compared to the as produced catalyst and substrate material that was not treated with gold. This is in agreement with the CO-TPR results of FIG. 6. Again, this was unexpected. It indicates that removal of the metallic nanoparticles by leaching, exposed more active Au—O-ceria sites to CO.

Activity Studies

Figure 25:
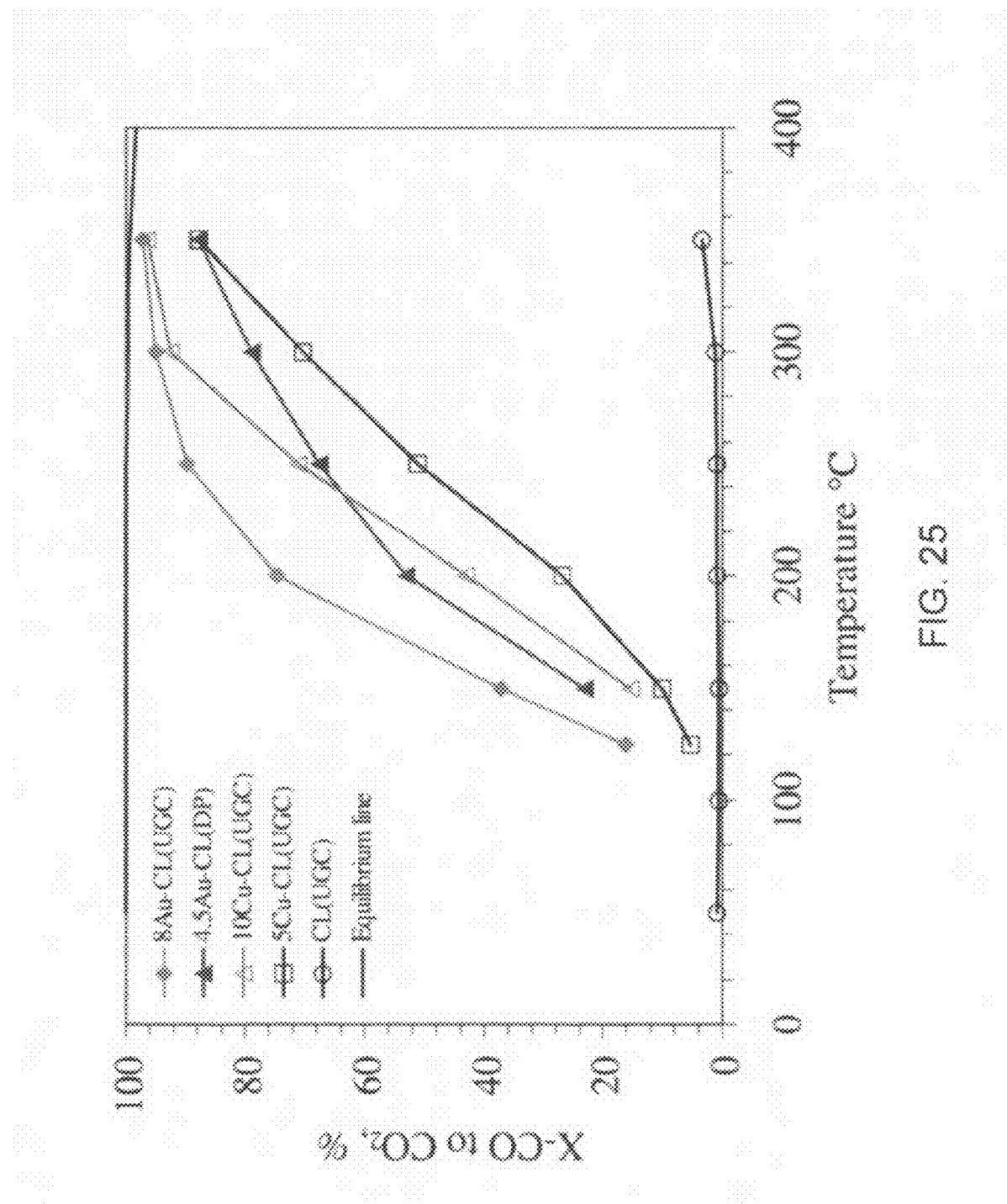
FIG. 25 is a diagram showing the steady state activity of various ceria-based materials as determined using the WGS reaction, according to principles of the invention.

FIG. 25 shows steady-state CO conversions over 8Au-CL (UGC), 10Cu-CL (UGC), 5Cu-CL (UGC), 4.5Au-CL (DP), and CL (UGC), calcined at 400° C., in a feed gas of 2% CO/10.7% $H_2O$/He, flowing at 0.09 g s/cm$^3$ (NTP) (GHSV=80,000 h.1). These are the same samples examined by $H_2$-TPR (FIG. 19B) and OSC measurements (FIG. 23), chosen on the basis of similar surface area. The WGS light-off temperature of all metal-modified ceria samples is below 120° C., while ceria itself is inactive below 300° C. At 200° C., the 8Au-CL (UGC) sample shows the highest reactivity, in agreement with the OSC data of FIG. 23. One may explain the lower activity of the 5Cu-CL (UGC) sample by the fact that it is only partially reduced at 200° C., as shown in FIG. 19B, and Table VII. However, the activity of 10Cu-CL (UGC) is not as high as what would be predicted on the basis of the TPR data. On the other hand, the OSC values, after subtraction of the CuO contribution, become much lower (617.2 µmol/gcat) than for the 8Au-CL (UGC) sample (FIG. 23). The extent of CuO reduction at each temperature is not known, however. Additional structural investigations are needed to elucidate further the metal-ceria interaction and its relevance to the WGS reaction.

During a 120 h long stability test of the 4.7Au-CL (DP) sample (footnote 'c' in Table VI), its catalytic activity remained the same in a reformate type gas mixture containing 7% CO/38% $H_2O$/11% $CO_2$/33% $H_2$/He at 300° C. (space velocity 6000 h$^{-1}$). No significant changes were observed in the conversion of CO (around 60%) during this test period. Catalyst characterization after this test, found that the ceria particle size increased only slightly, while the gold particle size grew to 6.7 nm (Table VI).

Particle Size Effects

Figure 26:
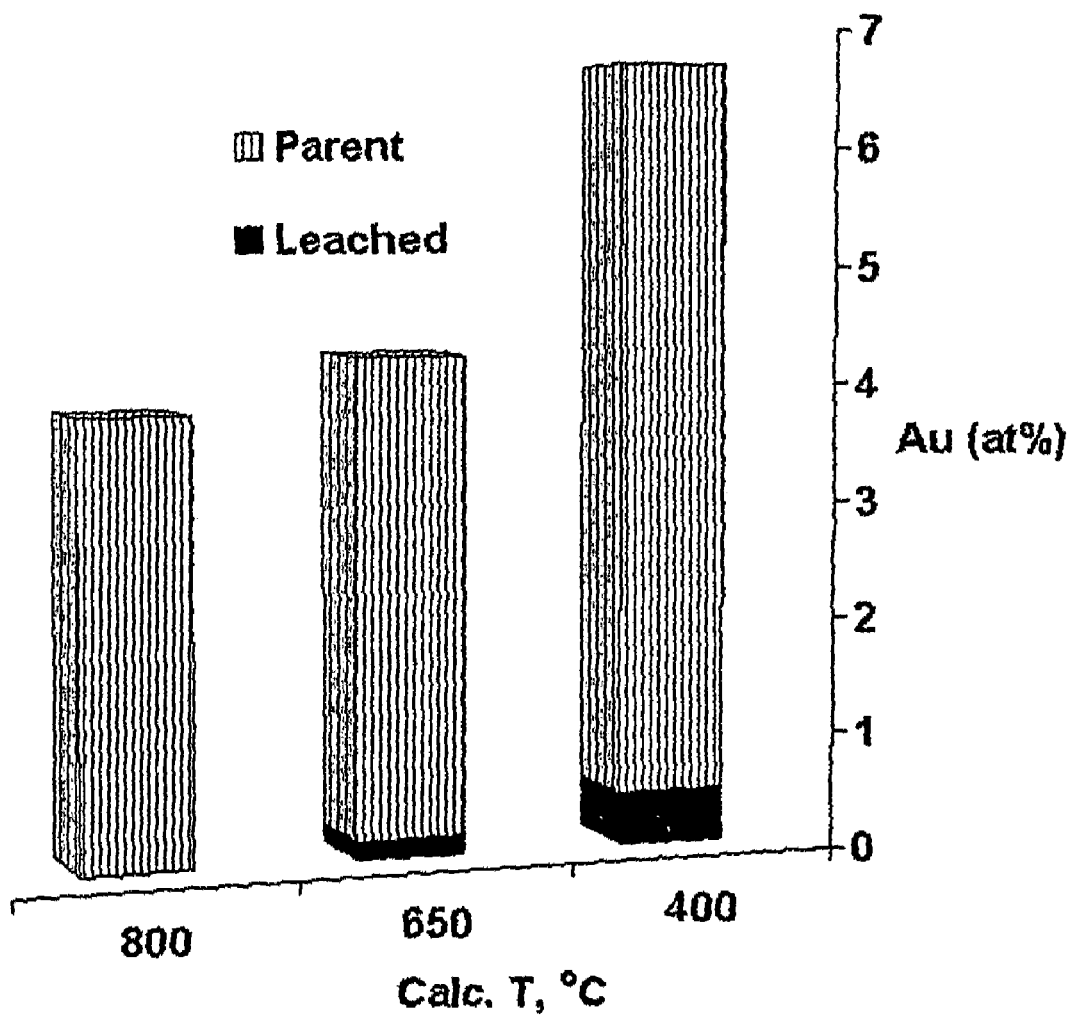
FIG. 26 is a diagram showing the amounts of gold deposited and remaining after leaching on ceria substrates calcined at different temperatures, according to principles of the invention.

FIG. 26 is a diagram showing the amounts of gold deposited and remaining after leaching on ceria substrates calcined at different temperatures, according to principles of the invention. Ceria support material was prepared by urea/gelation precipitation (UGC). Different batches of material were calcined at three different temperatures, 400° C., 650° C. and 800° C. The higher the calcination temperature, processing time being equal, the greater the size of the grains or particles of substrate material one would expect to see. In addition, higher calcination temperature would be expected to produce material having lower surface defect density as a result of greater mobility of atoms and ions at higher processing temperatures. Gold was then deposited on each substrate material by deposition-precipitation (DP), and then calcined at 400° C. for 10 h. The samples were nominally provided with a 5 at % gold loading. The actual as deposited gold loading is shown, as is the gold loading that remained after leaching with NaCN solution. Removal of gold by leaching from Au-ceria in which the ceria was pre-calcined at 800° C. was essentially complete. It appears that large-sized ceria particles do not retain gold after leaching. On the other hand, defective oxide surfaces having defects above a specific density permit the removal of the gold particles while maintaining catalytic activity.

Figure 27:
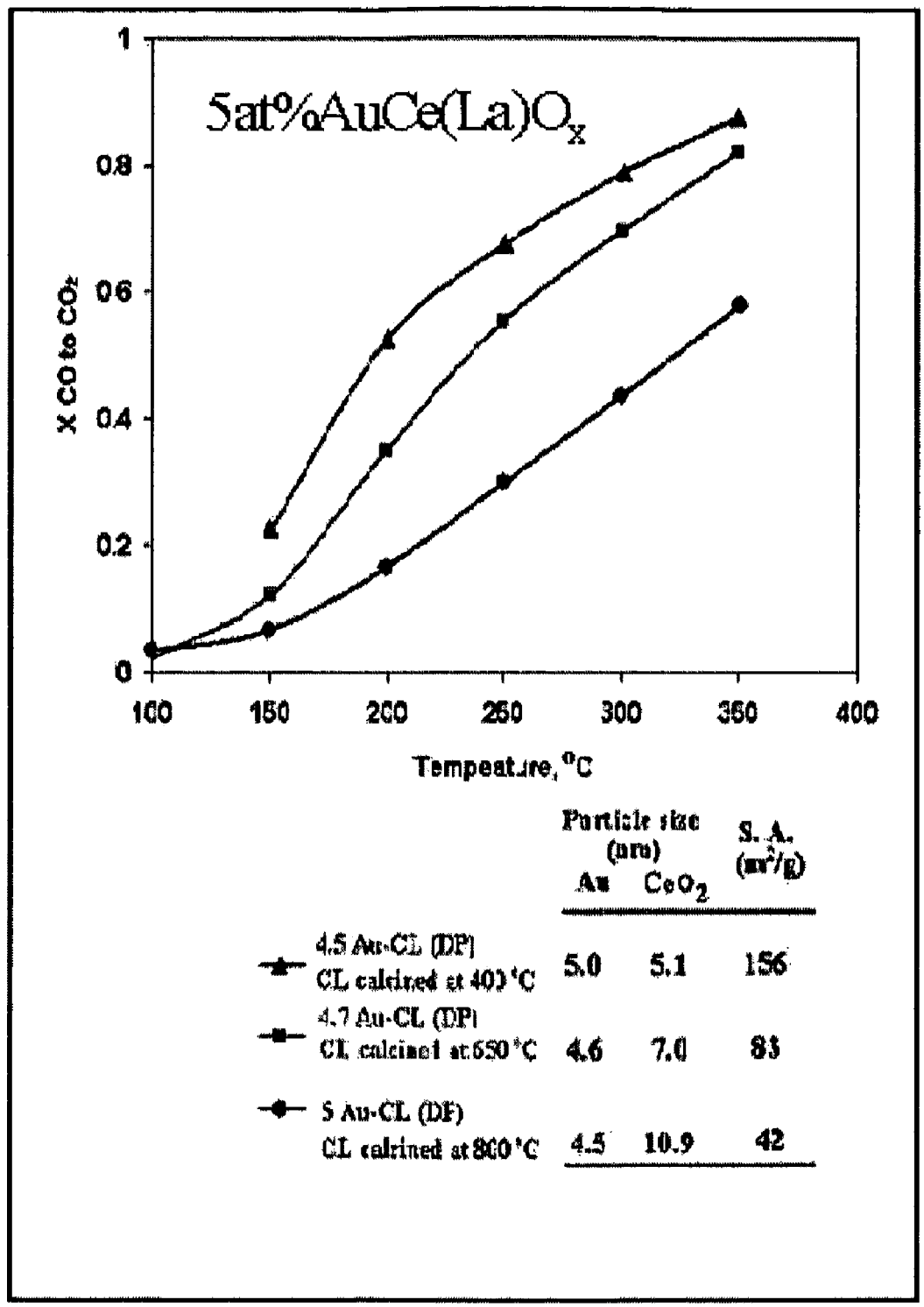
FIG. 27 is a diagram showing the temperature dependence for the conversion of CO to $CO_2$ as a function of particle size of the ceria substrate material, according to principles of the invention.

FIG. 27 is a diagram showing the temperature dependence for the conversion of CO to $CO_2$ as a function of particle size of the ceria substrate material, according to principles of the invention. As shown in FIG. 27, the WGS reaction using 2% CO-10% $H_2O$-remainder He at a contact time of 0.09 g.s/cm$^3$ was performed at varying temperature for three different catalyst materials. The curve denoted by solid triangles represents the percent CO conversion over a catalyst having a nominal 4.5 at % gold loading on ceria that was calcined at 400° C. This material has a measured gold nominal particle size of 5.0 nm and a ceria nominal particle size of 5.1 nm, with a surface area of 156 m$^2$/g. This material shows the highest conversion percentage at each temperature in the range of 150° C. to 350° C. The curve denoted by solid squares represents the percent CO conversion over a catalyst having a nominal 4.5 at % gold loading on ceria that was calcined at 650° C. This material has a measured gold nominal particle size of 4.6 nm and a ceria nominal particle size of 7.0 nm, with a surface area of 83 m$^2$/g. This material shows an intermediate conversion percentage at each temperature in the range of 150° C. to 350° C. The curve denoted by solid circles represents the percent CO conversion over a catalyst having a nominal 4.5 at % gold loading on ceria that was calcined at 800° C. This material has a measured gold nominal particle size of 4.5 nm and a ceria nominal particle size of 10.9 nm, with a surface area of 42 m$^2$/g. This material shows the lowest conversion percentage at each temperature in the range of 150° C. to 350° C.

FIG. 26 and FIG. 27 taken together strongly suggest that the presence of gold having a structure lacking crystallinity in association with a defect oxide is effective in providing catalytic activity.

In summary, Au-ceria is an active and stable catalyst for WGS reaction in the temperature range 150-350° C. Addition of Au increases the reducibility and the OSC of cerium oxide. The amount of surface oxygen available for reduction is controlled primarily by the crystal size of ceria. The presence of gold is crucial, however, in that it greatly weakens this oxygen and facilitates the interaction with CO at lower temperatures.

While the present invention has been explained with reference to the structure disclosed herein, it is not confined to the details set forth and this invention is intended to cover any modifications and changes as may come within the scope of the following claims.

TABLE I

Physical properties of ceria-based catalysts*

| Sample | Surface area (m²/g) | Surface metal content[†] (at %) Au or Pt | Bulk composition (at %)[‡] (Au or Pt) | Ce | La | Particle size[§] (nm) (Au or Pt) | CeO₂ <111> | <220> |
|---|---|---|---|---|---|---|---|---|
| 4.7Au-CL (DP) | 156.1 | 1.60 | 4.71 | 87.88 | 7.41 | 5.0 | 5.2 | 4.9 |
| 0.4Au-CL (DP) (NaCN) | 157.9 | 0.61 | 0.44 | 91.24 | 8.32 | ND | 5.2 | 4.9 |
| 2.8Au-CL (DP) | 159.2 | 1.58 | 2.81 | 89.16 | 8.03 | 4.7 | 5.0 | 4.9 |
| 0.2Au-CL (DP) (NaCN) | 162.2 | 0.43 | 0.23 | 93.10 | 6.67 | ND | 5.0 | 4.9 |
| 3.4Au-CeO₂[‖] (DP) | 25.9 | NM | 3.36 | 96.64 | 0 | 4.0 | 21.1 | 20.3 |
| 0.001Au-CeO₂ (DP)[‖] (NaCN) | 28.0 | NM | ~0.001 | ~99.999 | 0 | ND | 21.0 | 20.4 |
| CL (UGC) | 156.9 | — | 0 | 92.62 | 7.38 | — | 5.1 | 4.8 |
| 4.4Au-CL (CP) | 47.8 | 3.29 | 4.35 | 88.00 | 7.65 | 12.9 | 7.2 | 6.3 |
| 0.7Au-CL (CP) (NaCN) | 47.5 | 0.24 | 0.67 | 91.52 | 7.82 | ND | 7.0 | 6.0 |
| 3.7Pt-CL (IMP) | 129.8 | 1.63 | 3.67 | 88.83 | 7.50 | 2.5[¶] | 6.2 | 6.1 |
| 2.7Pt-CL (IMP, NaCN1) | 147.5 | 1.79 | 2.70 | 89.78 | 7.52 | ND | 6.2 | 6.1 |
| 1.5Pt-CL (IMP, NaCN2) | 103.2 | 0.82 | 1.50 | 90.86 | 7.64 | ND | 6.2 | 6.1 |

*All samples were calcined at 400° C.
CL is Ce(10% La)Oₓ, calcined at 400° C., 10 hours
NM: not measured
ND: non detectable
[†]The surface metal content was determined by XPS.
[‡]The bulk composition was determined by Inductively Coupled Plasma (ICP).
[§]The particle size was determined by XRD with the Scherrer equation.
[‖]CeO₂ was calcined at 800° C.
[¶]The particle size was determined by HRTEM.

TABLE II

Physical properties of ceria impregnated with NaAu(CN)₂ or NaCN leachate

| Sample[a] | Method[b] | S.A. m²/g | Bulk composition at % u | e | a | Comment |
|---|---|---|---|---|---|---|
| 1 | IMP with NaAu(CN)₂ | 166.8 | 1.1 | 4.7 | 4.2 | Ce(La)Oₓ uncalcined |
| 2 | IMP with NaAu(CN)₂ | 160.2 | 1.1 | 5.3 | 3.7 | Ce(La)Oₓ 400° C. 10 h |
| 3 | IMP with NaAu(CN)₂ + NaOH | 152.9 | 0.3 | 3.5 | 6.2 | Ce(La)Oₓ 400° C. 10 h |
| 4 | IMP with NaAu(CN)₂ + NaOH | 149.4 | 1.5 | 3.4 | 5.1 | Ce(La)Oₓ 400° C. 10 h |
| 5 | IMP with NaCN leachate | 150.6 | 1.2 | 5.3 | 3.5 | Ce(La)Oₓ uncalcined |
| 6 | IMP with NaCN leachate | 133.9 | 0.4 | 4.8 | 4.8 | Ce(La)Oₓ 400° C. 10 h |

[a]Support calcined at 400° C. for 10 h; catalyst calcined at 400° C. for 2 h.
[b]IMP represents the impregnation method.

TABLE III

Physical properties of Au-ceria after different thermal treatments

| Sample | Support Calcination Temp (° C.) | Catalyst Calcination Temp (° C.) | S.A. m²/g | Comments |
|---|---|---|---|---|
| 1 | 400° C., 10 h | 400° C., 10 h | 156.1 | 4.5% Au-CL (DP, parent) |
| 2 | 800 | | 25.9 | CeO₂ (UGC) |
| 3 | 800 | | 43.6 | Ce(La)Oₓ(UGC) |
| 4 | 400° C., 10 h | 800° C., 4 h | 61.1 | # 8 calcined at 800° C. 4 h |
| 5 | 400° C., 10 h | 200° C., 10 h | 160.3 | 4.5% Au-CL (DP, parent) |
| 6 | 400° C., 10 h | 800° C., 4 h | 44.3 | 4.5% Au-CL (DP, parent) |
| 7 | | 400° C., 2 h | 61.5 | leached from #6 |
| 8 | 400° C., 10 h | 400° C., 2 h | 157.9 | 0.44% Au-CL (DP, leached) leached from 4.7% Au-CL (DP, parent) in FIG. N1 |

TABLE IV

Surface area (m²/g) change of Au-ceria after use

| Sample | Fresh | Used for 100 hr |
|---|---|---|
| 4.7Au-CL(DP) | 156.1 | 131.1 |
| 0.44Au-CL(DP, NaCN) | 157.9 | 129.9 |

TABLE V

Physical properties of doped Au-ceria

| Sample | S.A. (m²/g) | Surface composition (at %)[†] Au | Ce | La | Bulk composition (at %)[‡] Au | Ce | La |
|---|---|---|---|---|---|---|---|
| 4.7Au-CL (DP) | 156.1 | 1.60 | 91.99 | 6.41 | 4.71 | 87.88 | 7.41 |
| 0.4Au-CL (DP) (NaCN) | 157.9 | 0.61 | 91.8 | 7.6 | 0.44 | 91.24 | 8.32 |
| 6.3Au-C30L (DP) | 152.5 | 5.3 | 73.41 | 21.29 | 6.31 | 68.77 | 24.92 |
| 0.8Au-C30L (DP) (NaCN) | 153.4 | 0.38 | 77.75 | 21.87 | 0.79 | 74.36 | 24.85 |

[†]The surface composition was determined by XPS.
[‡]The bulk composition was determined by Inductively Coupled Plasma (ICP) spectrometry.

TABLE VI

Physical properties of ceria-based materials[a]

| Sample | BET surface Area (m2/g) | Particle size[b] (nm) Au (1 1 1) | Ce (1 1 1) | Ce (2 2 0) |
|---|---|---|---|---|
| 8.3Au-CL (DP)[c] | 93.6 | 4.5 | 7.1 | 6.9 |
| 4.7Au-CL (DP)[c,d] | — | 9.2 | 7.1 | 6.9 |
| 4.7Au-CL (DP)[c] | 82.7 | 4.6 | 7.1 | 6.9 |
|  | 71.6[e] | 6.8 | 7.3 | 7.2 |
| 0.9Au-CL (DP)[c] | 96.7 | — | 7.1 | 6.9 |
| 4.5Au-CL (DP)[f] | 155.8 | 5.0 | 5.2 | 4.9 |
| 3.8Au-CL (CP) | 71.8 | 6.7 | 5.8 | 5.3 |
| 0.9Au-CL (CP) | 102.2 | NM[g] | NM | NM |
| 8Au-CL (UGC) | 158.1 | 49.1, 36.6[h] | 4.5 | 4.5 |
| 5Cu-CL (UGC)[d,i] | 89.1 | — | 5.2 | 4.9 |
| 5Cu-CL (UGC)[i] | 187.1 | — | 4.0 | 3.5 |
| 10Cu-CL (UGC)[i] | 200.3 | — | 3.5 | 3.1 |
| CL (CP) | 72.2 | — | 7.4 | 7.0 |
| CL (CP)[c] | 48.0 | — | 11.6 | 9.9 |
| CL (UGC) | 161.6 | — | 5.1 | 4.8 |
| CL (UGC)[c] | 93 | — | 7.1 | 6.9 |
| CeO$_2$[j] | 78.6 | NM | NM | NM |

[a]All materials were calcined at 400 C. for 10 h, unless otherwise noted.
[b]Determined by XRD using Scherrer equation.
[c]CL calcined at 650 C. in air.
[d]Sample calcined at 650 C. in air.
[e]Used in 7% CO—38% H$_2$O—11% CO$_2$—33% H$_2$—He for 120 h.
[f]CL calcined at 400 C. in air.
[g]Not measured.
[h]Au(2 0 0).
[i]No copper compounds detected by XRD.
[j]La-free, precipitated with ammonium carbonate.

TABLE VII

H$_2$-TPR of ceria-based materials[a]

| Sample | H$_2$ consumption (μmol/g$_{cat}$) Peak 1 (T, C.) | Peak 2 (T, C.) | Peak 3 (T, C.) | "x" in CeO$_x$ (H$_2$ consumption up to 500 C.) |
|---|---|---|---|---|
| 0.9Au-CL (DP)[b] | 165 (69) | 329 (109) |  | 1.90 |
| 4.7Au-CL (DP)[b] | 213 (51) | 198 (68) |  | 1.92 |
| 4.7Au-CL (DP)[b,c] | 132 (84) | 289 (107) |  | 1.91 |
| 8.3Au-CL (DP)[b] | 98 (40) | 306 (59) |  | 1.91 |
| 4.5Au-CL (DP)[d] | 560 (55) | 192 (79) |  | 1.85 |
| 3.8Au-CL (CP) | 803 (96) |  |  | 1.84 |
| 0.9Au-CL (CP) | 672 (160) |  |  | 1.87 |
| 8Au-CL (UGC) | 903 (110) |  |  | 1.81 |
| 5Cu-CL (UGC)[c,e] | 275 (126) | 282 (132) | 175 (145) | 1.92 |
| 5Cu-CL (UGC)[e] | 633 (150) | 396 (224) | 39 (246) | 1.85 |
| 10Cu-CL (UGC)[e] | 334 (97) | 312 (117) | 730 (140) | 1.85 |
| CL (CP) | 431 (310) | 455 (497) |  | 1.83[f] |
| CL (UGC) | 706 (487) |  |  | 1.87[f] |
| CL (UGC)[b] | 425 (437) |  |  | 1.92[f] |
| CeO$_2$[g] | 782 (405) |  |  | 1.87[f] |

[a]In 20% H$_2$/N$_2$ gas mixture (50 cm3/min (NTP)), 5 C./min; all materials were calcined at 400 C., 10 h, unless otherwise noted.
[b]CL calcined at 650 C. in air.
[c]Sample calcined at 650 C. in air.
[d]CL calcined at 400 C. in air.
[e]x is calculated after subtracting the oxygen from CuO reduction to Cu.
[f]H$_2$ consumption up to 580 C.
[g]La-free, precipitated with ammonium carbonate.

What is claimed is:

1. A catalyst material prepared according to the steps of:
providing a substrate component having a surface;
producing on said surface of said substrate component a second component having metallic crystalline particles and a structure lacking crystallinity; and
removing selectively from said surface of said substrate component at least some of said metallic crystalline particles, leaving associated with said substrate component at least a portion of said structure lacking crystallinity;
whereby said remaining structure lacking crystallinity associated with said substrate component exhibits catalytic activity.

2. The catalyst material of claim 1, wherein said structure lacking crystallinity comprises a metal selected from the group consisting of Au, Pt, Cu, Rh, Pd, Ag, Fe, Mn, Ni, Co, Ru, and Ir.

3. The catalyst material of claim 1, wherein said substrate component comprises a microcrystalline substance.

4. The catalyst material of claim 1, wherein said substrate component comprises an oxide.

5. The catalyst material of claim 1, wherein said substrate component comprises a selected one of a zeolite, a carbide, a nitride, a sulfate, and a sulfide.

6. The catalyst material of claim 1, wherein said metallic component is Au and said substrate component is lanthanum-doped cerium oxide.

7. The catalyst material of claim 6, wherein the Au has a concentration in the range of one atomic percent to one one-hundredth of an atomic percent, wherein the atomic percentage is computed according to the expression [100×grams Au/(atomic mass of Au)]/[grams Au/(atomic mass of Au)+grams Ce/(atomic mass of Ce)+grams La/(atomic mass of La)], based on a chemical composition of the catalytic material.

8. The catalyst material of claim 6, wherein the Au has a concentration in the range of one-half of an atomic percent to one-tenth of an atomic percent, wherein the atomic percentage is computed according to the expression [100×grams Au/(atomic mass of Au)]/[grams Au/(atomic mass of Au)+grams Ce/(atomic mass of Ce)+grams La/(atomic mass of La)], based on a chemical composition of the catalytic material.

9. The catalyst material of claim 6, wherein the Au has a concentration in the range of 0.44 atomic percent to 0.23 atomic percent, wherein the atomic percentage is computed according to the expression [100×grams Au/(atomic mass of Au)]/[grams Au/(atomic mass of Au)+grams Ce/(atomic mass of Ce)+grams La/(atomic mass of La)], based on a chemical composition of the catalytic material.

10. The catalyst material of claim 1, wherein said catalyst material is a catalyst for a water shift reaction.

11. The catalyst material of claim 1, wherein said catalyst material is a catalyst for a steam reforming reaction.

12. The catalyst material of claim 1, wherein said catalytic activity of said remaining structure lacking crystallinity and said substrate component is substantially equal to a catalytic activity exhibited by said catalyst material prior to said selective removal of crystalline particles.

13. The catalyst material of claim 1, wherein the step of providing said substrate component comprises forming said substrate by a gelation/coprecipitation process followed by calcining.

14. The catalyst material of claim 1, wherein the step of producing on said surface of said substrate component a metallic component comprises applying said metallic component by a process selected from precipitation, co-precipitation, gelation, evaporation, a deposition-precipitation process, an impregnation process, adsorption of molecules followed by decomposition, ion implantation, chemical vapor deposition, and physical vapor deposition.

15. The catalyst material of claim 1, wherein said substrate component is sintered at a temperature of approximately 400° C.

16. The catalyst material of claim 1, wherein said substrate component comprises a selected one of a rare-earth-, an alkaline earth-, a Sc- or a Y-doped cerium oxide.

17. The catalyst material of claim 16, wherein said rare-earth is lanthanum.

18. The catalyst material of claim 1, wherein said removal step comprises a process selected from the group consisting of leaching, etching, and dissolving.

19. The catalyst material of claim 1, wherein said removal step comprises leaching with a solution of NaCN.

20. The catalyst material of claim 19, wherein said removal step comprises leaching with an aqueous solution of 2 mole percent NaCN having a pH of at least 8.

21. The catalyst material of claim 1, wherein said removal step removes at least 10% of the original quantity of said metallic component.

22. The catalyst material of claim 1, wherein said removal step removes at least 25% of the original quantity of said metallic component.

23. The catalyst material of claim 1, wherein said removal step removes at least 50% of the original quantity of said metallic component.

24. The catalyst material of claim 1, wherein said removal step removes at least 90% of the original quantity of said metallic component.

25. The catalyst material of claim 1, wherein said substrate comprises a crystalline defect solid that provides oxygen to a reaction.

* * * * *